US007085237B1

(12) United States Patent
Teodorescu

(10) Patent No.: US 7,085,237 B1
(45) Date of Patent: *Aug. 1, 2006

(54) METHOD AND APPARATUS FOR ROUTING ALARMS IN A SIGNALING SERVER

(75) Inventor: Val Teodorescu, Plano, TX (US)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,308

(22) Filed: Mar. 31, 2000

(51) Int. Cl.
*H04J 1/16* (2006.01)
*H04J 3/04* (2006.01)
(52) U.S. Cl. .................... 370/242; 370/254; 370/539
(58) Field of Classification Search ............ 370/241, 370/242, 244, 250, 254, 255, 408, 503, 510, 370/539; 713/400, 401, 500, 503
See application file for complete search history.

(56) References Cited

U.S. PATENT DOCUMENTS

| 4,228,496 | A | | 10/1980 | Katzman et al. | |
|---|---|---|---|---|---|
| 4,389,720 | A | | 6/1983 | Baxter et al. | |
| 4,495,614 | A | | 1/1985 | Aro et al. | |
| 5,058,104 | A | * | 10/1991 | Yonehara et al. | 370/242 |
| 5,315,488 | A | | 5/1994 | Le Gallo et al. | |
| 5,367,520 | A | | 11/1994 | Cordell | |
| 5,499,341 | A | | 3/1996 | Wilson et al. | |
| 5,515,515 | A | | 5/1996 | Kennedy et al. | |
| 5,526,349 | A | | 6/1996 | Diaz et al. | |
| 5,668,484 | A | | 9/1997 | Nomura | |
| 5,734,685 | A | | 3/1998 | Bedell | |
| 5,740,211 | A | | 4/1998 | Bedrosian | |
| 5,812,882 | A | | 9/1998 | Raji et al. | |

(Continued)

FOREIGN PATENT DOCUMENTS

EP 0674274 A 9/1995

OTHER PUBLICATIONS

Force Computers, "Compact vs Industrial PC's", Jan. 1997 pp. 1-19.

(Continued)

*Primary Examiner*—Seema S. Rao
*Assistant Examiner*—Robert C. Scheibel, Jr.
(74) *Attorney, Agent, or Firm*—Jessica W. Smith; V. Lawrence Sewell

(57) ABSTRACT

An alarm collection and routing method using a multi-stage clock distribution scheme in a signaling server organized into a plurality of uniquely addressable shelves. The signaling server includes a system timing generator, one or more clock distribution modules arranged in a nested hierarchical manner, and a plurality of bus control modules, wherein each bus control module interfaces with at least a portion of line cards disposed in a shelf. The system timing generator provides a framed serial control signal, SFI, for controlling the operation of the multi-stage clock distribution scheme, which encodes the IDs of the clock distribution modules and bus control modules. Each bus control module generates a Status signal, encoding it with alarm data and line card status information. The Status signals from the bus control modules are received by the clock distribution modules connected thereto and are multiplexed into a serial TDM bitstream (EAS signal) by each clock distribution module based on its ID. Multiplexed EAS signals are successively provided to higher levels of clock distribution modules, if any, in the nested hierarchy, each of which multiplexes the received EAS signals into a TDM bitstream having an aggregation of lower level alarm/status data as well as alarms produced at that level. The TDM EAS signal is ultimately provided to the system timing generator for appropriate action under the control of a suitable computing element.

14 Claims, 40 Drawing Sheets

U.S. PATENT DOCUMENTS

| | | | |
|---|---|---|---|
| 5,892,812 A * | 4/1999 | Pester, III | 379/32.02 |
| 5,907,559 A * | 5/1999 | Shuman et al. | 370/539 |
| 5,936,942 A * | 8/1999 | McNeley et al. | 370/244 |
| 5,946,373 A * | 8/1999 | Harris | 379/14.01 |
| 6,000,020 A | 12/1999 | Chin et al. | |
| 6,002,683 A | 12/1999 | Madonna | |
| 6,009,468 A | 12/1999 | Lau et al. | |
| 6,014,319 A | 1/2000 | Kuchta et al. | |
| 6,018,456 A | 1/2000 | Young et al. | |
| 6,018,529 A | 1/2000 | Tooh | |
| 6,041,066 A | 3/2000 | Meki et al. | |
| 6,112,276 A | 8/2000 | Hunt et al. | |
| 6,167,062 A | 12/2000 | Hershey et al. | |
| 6,198,753 B1 | 3/2001 | Virdee et al. | |
| 6,229,822 B1 | 5/2001 | Chow et al. | |
| 6,240,087 B1 | 5/2001 | Cummings et al. | |
| 6,269,081 B1 | 7/2001 | Chow et al. | |
| 6,282,599 B1 | 8/2001 | Gallick et al. | |
| 6,285,673 B1 | 9/2001 | Blackburn et al. | |
| 6,289,376 B1 | 9/2001 | Taylor et al. | |
| 6,293,636 B1 | 9/2001 | Le et al. | |
| 6,359,895 B1 * | 3/2002 | Yamanaka | 370/408 |
| 6,363,452 B1 | 3/2002 | Lach | |
| 6,389,499 B1 | 5/2002 | Frank et al. | |
| 6,397,374 B1 | 5/2002 | Pasqualini | |
| 6,643,791 B1 * | 11/2003 | Teodorescu | 713/500 |
| 6,707,795 B1 * | 3/2004 | Noorhosseini et al. | 370/242 |
| 6,717,940 B1 | 4/2004 | McGrew | |
| 6,763,016 B1 | 7/2004 | Teodorescu | |

OTHER PUBLICATIONS

Fischer, Wayne, "Compact PCI-Next Generation Bus Architecture", Feb. 1998, pp. 106-109.

PCT Industrial Computers, "Compact PCI Specification" Oct. 1999, pp. 9-61.

* cited by examiner

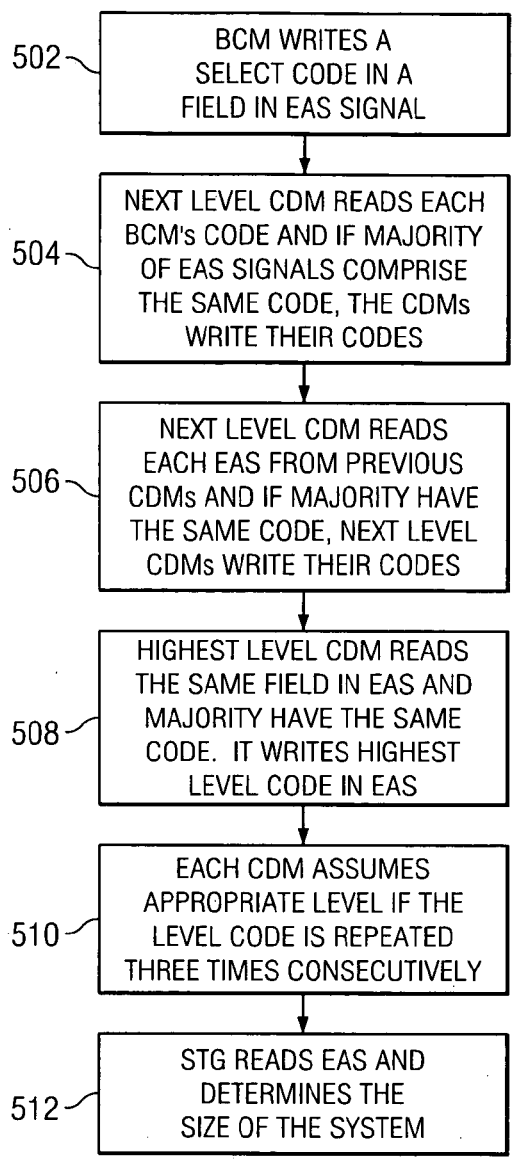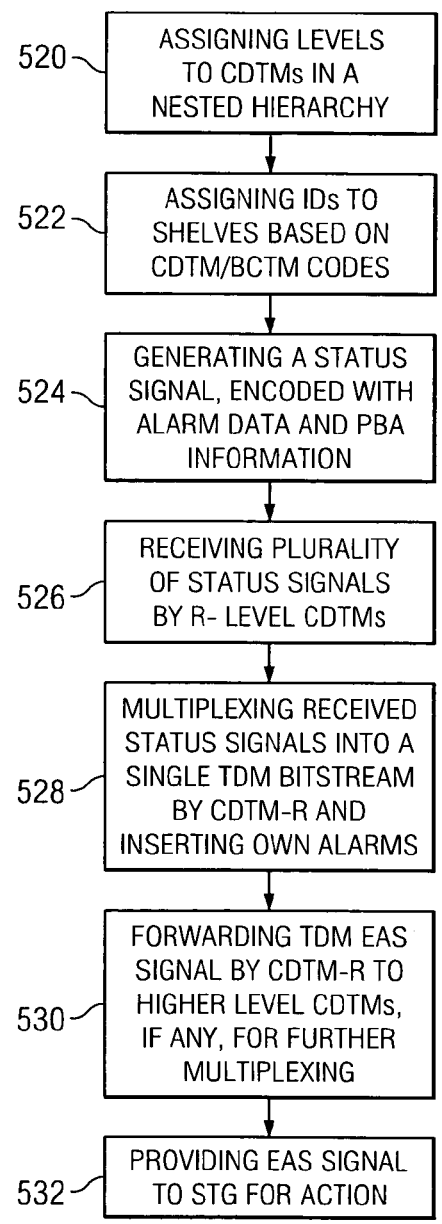

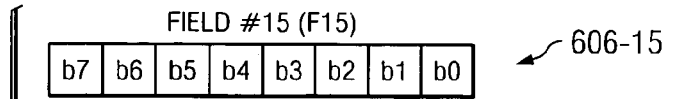

FIG. 19G b7: INDICATE THAT A CLOCK IS SELECTED BY THE CDTM HIGHEST LEVEL
b7 = 0 (NO CLOCK SELECTED)
b7 = 1 (ONE OF 12 CLOCKS SELECTED)
b6 TO b3: THE CODE OF THE PORT SELECTED (0000 TO 1011)
b2 = BIT SET TO FORCE THE ALARMS
b1, b0 = RESERVED

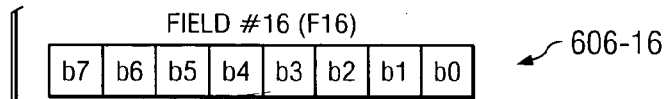

FIG. 19H b7: INDICATE THAT A CLOCK IS SELECTED BY THE CDTM MIDDLE LEVEL
b7 = 0 (NO CLOCK SELECTED)
b7 = 1 (ONE OF 8 CLOCKS SELECTED)
b6 TO b3: THE CODE OF THE PORT SELECTED (0000 TO 0111)
b2 = BIT SET TO FORCE THE ALARMS
b1, b0 = RESERVED

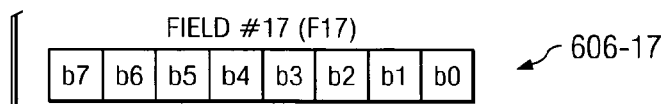

FIG. 19I b7: INDICATE THAT A CLOCK IS SELECTED BY THE CDTM LOWEST LEVEL
b7 = 0 (NO CLOCK SELECTED)
b7 = 1 (ONE OF 12 CLOCKS SELECTED)
b6 TO b3: THE CODE OF THE PORT SELECTED (0000 TO 1011)
b2 = BIT SET TO FORCE THE ALARMS
b1, b0 = RESERVED

F1 = 1 BYTE ALLOCATED FOR ALLIGNMENT PATTERN
F2 = 1 BYTE ALLOCATED FOR MISC SIGNALS
F3 = 2 BYTES ALLOCATED FOR STATUS LOA
F4 = 2 BYTES ALLOCATED FOR INBOUND ERRORS (ONE BIT PER PORT)
F5 = 1 BYTE ALLOCATED FOR CLOCK SELECTION
F6 = 4 BITS ALLOCATED FOR BIP-4
F7 = 7.5 BYTES RESERVED
F8 = 1.5 BITS EMPTY FIELD (FORCED TO "0")

NOTE: ALL FRAMES # N x 64 (N = 1 TO 11) ARE EMPTY

FIG. 20C

FRAME #0
FIELD F1

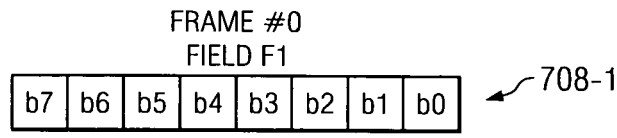

708-1 b7 TO b0 = "00111100" : PATTERN GENERATED BY EACH CDTM AND BCTM CARDS

FIELD F2

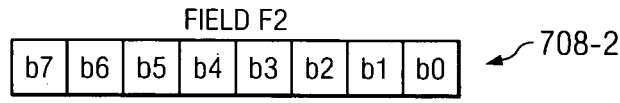

708-2 b7, b6 = RESERVED
b5 = BIT SET WHEN OUTBOUND SFI ERRORS ARE DETECTED
NOTE:OUTBOUND ERRORS:"TWO BITS VIOLATIONS" OR BIP-8 ONLY FOR FRAME #0 OF THE SFI
b4 = BIT SET WHEN ONE OF THE STATUS SIGNAL IS IN LOS (EXCEPT FOR THE UNUSED PORTS)
b3 = BIT SET WHEN THE SELECTED 8KHz IS IN LOC
b2, b1 = BIT ASSIGNED TO INDICATE THE LEVEL OF THE CDTM (11 FOR L1, 10 FOR L2 AND 01 FOR L3)
b0 = BIT ASSIGNED TO INDICATE THE PLANE (0 FOR A AND 1 FOR B)

FIELD F3 (BYTE#1)

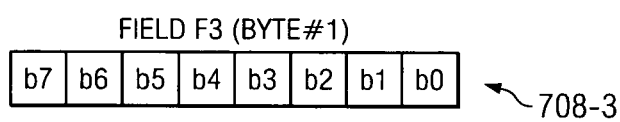

708-3 b7 TO b0 = BITS ASSIGNED TO INDICATE STATUS LOA PORTS #0 TO 7

FIELD F3 (BYTE #2)

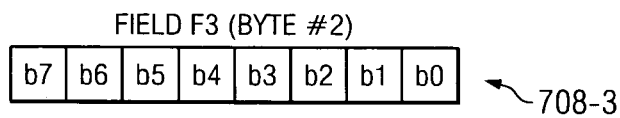

708-3 b3 TO b0 = BITS ASSIGNED FOR STATUS LOA #8 TO 12
b7 TO b4 = BITS ALLOCATED FOR CDTM LEVEL ASSIGNMENT

FIG. 20D

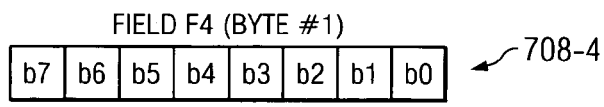

FIELD F4 (BYTE #1) — 708-4 b7 TO b0 = BITS ASSIGNED TO INDICATE STATUS LOS ON PORTS #0 TO 7

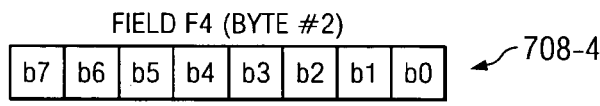

FIELD F4 (BYTE #2) — 708-4 b7 TO b0 = BITS ASSIGNED TO INDICATE STATUS LOS ON PORTS #8 TO 12

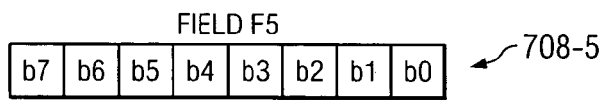

FIELD F5 — 708-5 b7 = BIT SET WHEN AN 8 KHz INPUT WAS SELECTED
b6, b5, b4, b3 = BITS ASSIGNED TO INDICATE WHICH 8KHz PORT WAS SELECTED
b2 = BIT SET WHEN A FORCED ALARM BIT WAS RECEIVED
b1 = BIT ASSERTED BY CDTM HIGHEST LEVEL TO INDICATE THAT A SYSTEM ALARM HAS OCCURED IN THE PREVIOUS EAS
b0 = ASSERTED BY CSTG IF A BIP-4 ERROR WAS DETECTED

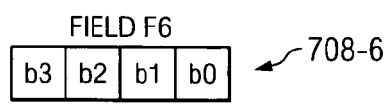

FIELD F6 — 708-6 b3 TO b0 = BITS ASSIGNED FOR BIP-4

FIG. 20E

FRAME #1 + 64 x N (N = 0 TO 11) : THESE FRAMES
ARE ALLOCATED FOR CDTM MIDDLE LEVEL
FRAME #1 + 8 x N (N = 0 TO 95) :THESE FRAMES
ARE ALLOCATED FOR CDTM LOWEST LEVEL

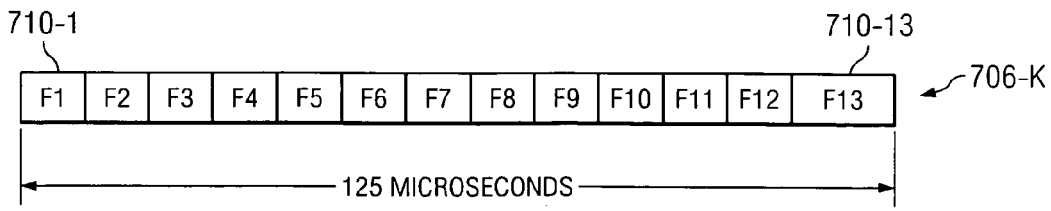

CDTM MIDDLE LEVEL

F1 = 1 BYTE ALLOCATED FOR MISC SIGNALS
F2 = 1 BYTE FOR CARD ID
F3 = 2 BYTES ALLOCATED FOR STATUS LOA
F4 = 2 BYTES ALLOCATED FOR INBOUND ERRORS (ONE BIT PER PORT)
F5 = 1 BYTE ALLOCATED FOR CLOCK SELECTION
F6 = 4 BYTES ALLOCATED FOR BIP-4

CDTM LOWEST LEVEL

F7 = 1 BYTE ALLOCATED FOR MISC SIGNALS
F8 = 1 BYTE FOR CARD ID
F9 = 2 BYTES ALLOCATED FOR STATUS LOA
F10 = 2 BYTES ALLOCATED FOR INBOUND ERRORS
F11 = 1 BYTE ALLOCATED FOR CLOCK SELECTION
F12 = 4 BITS ALLOCATED FOR BIP-4
F13 = 1.5 BITS EMPTY FIELD (FORCED TO "0")

FIG. 20F

FRAME #1 + 64 x N (N = 0 TO 11) : THESE FRAMES
ARE ALLOCATED FOR CDTM MIDDLE LEVEL

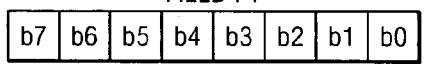

b7 = RESERVED
b6 = RESERVED
b5 = BIT SET WHEN OUTBOUND SFI ERRORS ARE DETECTED
NOTE:OUTBOUND ERRORS: "TWO BITS VIOLATIONS" OR BIP-8 ONLY FOR FRAME #0
OF THE SFI
b4 = BIT SET WHEN ONE OF THE STATUS SIGNAL IS IN LOS (EXCEPT FOR THE
UNUSED PORTS)
b3 = BIT SET WHEN THE SELECTED 8KHz IS IN LOC
b2, b1 = BIT ASSIGNED TO INDICATE THE LEVEL OF THE CDTM (11 FOR L1, 10 FOR
L2 AND 01 FOR L3)
b0 = BIT ASSIGNED TO INDICATE THE PLANE (0 FOR A AND 1 FOR B)

FIG. 20J

FRAME# 1 + 8 x N (N = 0 TO 95) : THESE FRAMES ARE ALLOCATED FOR CDTM LOWEST LEVEL

FIELD F7 — 710-7

| b7 | b6 | b5 | b4 | b3 | b2 | b1 | b0 | b7 = RESERVED
b6 = RESERVED
b5 = BIT SET WHEN OUTBOUND SFI ERRORS ARE DETECTED
NOTE:OUTBOUND ERRORS: "TWO BITS VIOLATIONS" OR BIP-8 ONLY FOR FRAME #0 OF THE SFI
b4 = BIT SET WHEN ONE OF THE STATUS SIGNAL IS IN LOS (EXCEPT FOR THE UNUSED PORTS)
b3 = BIT SET WHEN THE SELECTED 8KHz IS IN LOC
b2, b1 = BIT ASSIGNED TO INDICATE THE LEVEL OF THE CDTM (11 FOR L1, 10 FOR L2 AND 01 FOR L3)
b0 = BIT ASSIGNED TO INDICATE THE PLANE (0 FOR A AND 1 FOR B)

FIG. 20K

FIELD F8 — 710-8

| b7 | b6 | b5 | b4 | b3 | b2 | b1 | b0 | b7 TO b0 = BITS ASSIGNED FOR CDTM ID

FIELD F9 (BYTE #1) — 710-9

| b7 | b6 | b5 | b4 | b3 | b2 | b1 | b0 | b7 TO b0 = BITS ASSIGNED TO INDICATE STATUS LOA PORTS #0 TO 7

FIELD F9 (BYTE #2) — 710-9

| b7 | b6 | b5 | b4 | b3 | b2 | b1 | b0 | b7 TO b0 = BITS ASSIGNED TO INDICATE STATUS LOA PORTS #8 TO 15

BCTM (A)
FIELD F1 (BYTE #1)            714-1

| b7 | b6 | b5 | b4 | b3 | b2 | b1 | b0 | b7, b6 = BITS ALLOCATED FOR PSU #1 (A) ALARM
b5, b4 = BITS ALLOCATED FOR PSU #2 (B) ALARM
b3, b2 = BITS ALLOCATED FOR TWO FAN ALARMS
b1, b0 = BITS ALLOCATED FOR ESWT PWR ALARM

FIELD F1 (BYTE #2)            714-1

| b7 | b6 | b5 | b4 | b3 | b2 | b1 | b0 | b7 = BITS ALLOCATED FOR BREAKER PANEL ALARM
b6 = BIT ALLOCATED FOR TEMP CONTROL
b5 = BIT ALLOCATED TO INDICATE PLANE A LOST (LOC, LOS, SFI LOF)
b4 = BIT ALLOCATED TO INDICATE PLANE B LOST (LOC, LOS, SFI LOF)
b3 = BIT ALLOCATED TO INDICATE "TWO BITS VIOLATION" OR BIP-8 ERRORS PLANE A (ONLY FOR THE FRAME ALLOCATED FOR THAT PARTICULAR RACK)
b2 = BIT ALLOCATED TO INDICATE "TWO BITS VIOLATION" OR BIP-8 ERRORS PLANE B (ONLY FOR THE FRAME ALLOCATED FOR THAT PARTICULAR RACK)
b1 = ONE BIT TO INDICATE THAT A FORCED ALARM BIT WAS RECEIVED
b0 = RESERVED

*FIG. 20O*

FIELD F2 (BYTE #1)            714-2

| b7 | b6 | b5 | b4 | b3 | b2 | b1 | b0 | b7 TO b0 = HIGHER 8 BITS OF THE BCTM ID

FIELD F2 (BYTE #2)            714-2

| b7 | b6 | b5 | b4 | b3 | b2 | b1 | b0 | b7 TO b4 = LOWER 4 BITS OF THE BCTM ID
b3 = BIT SET TO INDICATE THAT AN 8 KHz CLOCK WAS SELECTED
b2 TO b0 = BITS ALLOCATED TO INDICATE WHICH CLOCK WAS SELECTED

FIELD F3            714-3

| b7 | b6 | b5 | b4 | b3 | b2 | b1 | b0 | b7 TO b0 = BITS ALLOCATED TO INDICATE PBA "HEALTH" FROM SLOT #0 TO SLOT #7

FIELD F4 — 714-4

| b7 | b6 | b5 | b4 | b3 | b2 | b1 | b0 | b7 TO b0 = BITS ALLOCATED TO INDICATE PBA "PRESENCE" FROM SLOT #0 TO SLOT #7

FIELD F5 — 714-5

| b7 | b6 | b5 | b4 | b3 | b2 | b1 | b0 | b7 = BIT SET TO INDICATE THAT A MISMATCH PLANE ASSIGNMENT WAS DETECTED
b6, b5 = BITS ALLOCATED TO INDICATE WHICH PLANE WAS SELECTED (A OR B)
b4 = BIT SET TO INDICATE THAT A "SYSTEM SLOT INSTALLED" BIT WAS RECEIVED
b3 = BIT SET TO INDICATE THAT SFI PLANES ALIGNMENT ERRORS ARE GENERATED
b2 = BIT SET TO INDICATE THAT THE SELECTED 8 KHz IS LOST
b1 = BIT SET TO INDICATE AN OR -ED FUNCTION OF ALL BCTM (A) ALARMS
b0 = BIT ASSERTED BY CSTG TO INDICATE THAT A BIP-4 ERROR WAS DETECTED

FIELD F6 — 714-6

| b3 | b2 | b1 | b0 | b3 TO b0 = BITS ALLOCATED FOR BIP-4

FIG. 20R

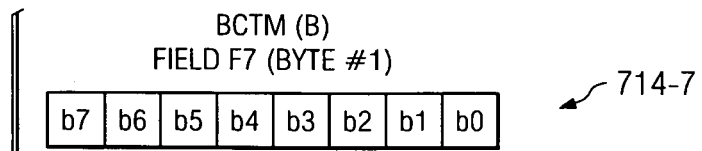

BCTM (B)
FIELD F7 (BYTE #1)   714-7 b7, b6 = BITS ALLOCATED FOR PSU #1 (A) ALARM
b5, b4 = BITS ALLOCATED FOR PSU #2 (B) ALARM
b3, b2 = BITS ALLOCATED FOR TWO FAN ALARMS
b1, b0 = BITS ALLOCATED FOR ESWT PWR ALARM

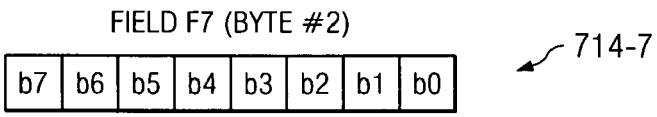

FIELD F7 (BYTE #2)   714-7 b7 = BIT ALLOCATED FOR BREAKER PANEL ALARM
b6 = BIT ALLOCATED FOR TEMP CONTROL
b5 = BIT ALLOCATED TO INDICATE PLANE A LOST (LOC, LOS, SFI LOF)
b4 = BIT ALLOCATED TO INDICATE PLANE B LOST (LOC, LOS, SFI LOF)
b3 = BIT ALLOCATED TO INDICATE "TWO BITS VIOLATION" OR BIP-8 ERRORS PLANE A (ONLY FOR THE FRAME ALLOCATED FOR THAT PARTICULAR RACK)
b2 = BIT ALLOCATED TO INDICATE "TWO BITS VIOLATION" OR BIP-8 ERRORS PLANE B (ONLY FOR THE FRAME ALLOCATED FOR THAT PARTICULAR RACK)
b1 = ONE BIT TO INDICATE THAT A FORCED ALARM BIT WAS RECEIVED
b0 = RESERVED

FIG. 20S

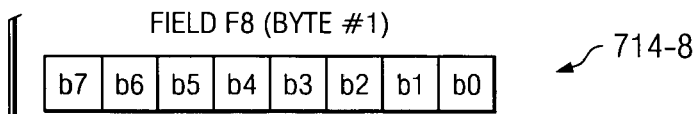

FIELD F8 (BYTE #1)   714-8 b7 TO b0 = HIGHER 8 BITS OF THE BCTM ID

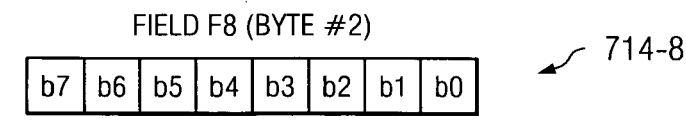

FIELD F8 (BYTE #2)   714-8 b7 TO b4 = LOWER 4 BITS OF THE BCTM ID
b3 = BIT SET TO INDICATE THAT AN 8 KHz CLOCK WAS SELECTED
b2 TO b0 = BITS ALLOCATED TO INDICATE WHICH CLOCK WAS SELECTED

METHOD AND APPARATUS FOR ROUTING ALARMS IN A SIGNALING SERVER

CROSS-REFERENCE TO RELATED APPLICATIONS

This application discloses subject matter related to the subject matter disclosed in the following co-assigned patent applications: (1) "Clock Distribution Scheme in a Signaling Server," filed Mar. 31, 2000, Ser. No. 09/541,002 now U.S. Pat. No. 6,643,791 issued Nov. 4, 2003 in the name(s) of: Val Teodorescu; (2) "Card Design Having Tape and Disk Drives," filed Mar. 31, 2000, Ser. No. 09/539,759 now U.S. Pat. No. 6,636,917 issued Oct. 21, 2003 in the name(s) of: Ignacio Linares and Serge Fourcand; (3) "Bus Control Module for a Multi-Stage Clock Distribution Scheme in a Signaling Server," filed Mar. 31, 2000, Ser. No. 09/540,591 now U.S. Pat. No. 6,847,652 issued Jan. 25, 2005 in the name(s) of: Serge Fourcand, Curt McKinley, and Val Teodorescu; and (4) "Bus Control Module with System Slot Functionality in a Compact Peripheral Component Interconnect Bus System," filed Mar. 31, 2000, Ser. No. 09/540,594 in the name(s) of: Serge Fourcand, Curt McKinley, and Val Teodorescu.

BACKGROUND OF THE INVENTION

1. Technical Field of the Invention

The present invention relates to alarm collection schemes in telecommunications equipment and, more particularly, to a scalable architecture for collecting alarms using a multi-stage clock distribution scheme deployed in a network platform (e.g., a Next Generation Signaling Transfer Point (STP)) for use in Signaling System No. 7 (SS7) networks.

2. Description of Related Art

Out-of-band signaling establishes a separate channel for the exchange of signaling information between call component nodes in order to set up, maintain and service a call in a telephony network. Such channels, called signaling links, are used to carry all the necessary signaling messages between the nodes. Thus, for example, when a call is placed, the dialed digits, trunk selected, and other pertinent information are sent between network switches using their signaling links, rather than the trunks which will ultimately carry the bearer traffic, i.e., conversation.

Out-of-band signaling has several advantages that make it more desirable than traditional in-band signaling. First, it allows for the transport of more data at higher speeds than multi-frequency (MF) outpulsing used in the telephony networks of yore. Also, because of separate trunks and links, signaling can be done at any time in the entire duration of the call, not just at the beginning. Furthermore, out-of-band signaling enables signaling to network elements to which there is no direct trunk connection.

SS7 packet signaling has become the out-of-band signaling scheme of choice between telephony networks and between network elements worldwide. Three essential components are defined in a signaling network based on SS7 architecture. Signal Switching Points (SSPs) are basically telephone switches equipped with SS7-capable software that terminate signaling links. They generally originate, terminate, or switch calls. Signal Transfer Points (STPs) are the packet switches of the SS7 network. In addition to certain specialized functions, they receive and route incoming signaling messages towards their proper destination. Finally, Signal Control Points (SCPs) are databases that provide information necessary for advanced call-processing and Service Logic execution.

As is well known, SS7 signaling architecture is governed by several multi-layered protocols standardized under the American National Standards Institute (ANSI) and the International Telecommunications Union (ITU) to operate as the common "glue" that binds the ubiquitous autonomous networks together so as to provide a "one network" feel that telephone subscribers have come to expect.

The exponential increase in the number of local telephone lines, mobile subscribers, pages, fax machines, and other data devices, e.g., computers, Information Appliances, etc., coupled with deregulation that is occurring worldwide today is driving demand for small form factor, high capacity STPs which must be easy to maintain, provide full SS7 functionality with so-called "five nines" operational availability (i.e., 99.999% uptime), and provide the capability to support future functionality or features as the need arises. Further, as the subscriber demand for more service options proliferates, an evolution is taking place to integrate Intelligent Network (IN)-capable SCP functionality within STP nodes.

While it is generally expected that a single platform that supports large-database, high-transaction IN services as well as high-capacity packet switching (hereinafter referred to as a signaling server platform) will reduce equipment costs, reduce network facility costs and other associated costs while increasing economic efficiency, those skilled in the art should readily recognize that several difficulties must be overcome in order to integrate the requisite functionalities into a suitable network element that satisfies the stringent performance criteria required of telecommunications equipment. Daunting challenges arise in designing a compact enough form factor that is efficiently scalable, ruggedized, and modularized for easy maintenance, yet must house an extraordinary constellation of complex electronic circuitry, e.g., processors, control components, timing modules, I/O, line interface cards which couple to telephony networks, etc., that is typically required for achieving the necessary network element functionality. Whereas the electronic components may themselves be miniaturized and modularized into cards or boards, interconnecting a large number of such cards via suitable bus systems and controlling such interconnected systems poses many obstacles.

The existing interconnecting schemes used in today's telecommunications equipment are beset with numerous deficiencies and drawbacks in this regard, which rely on hardwiring of the cards for coding card locations, etc. (i.e., strapping) in the equipment's housing that is typically compartmentalized into a number of shelves. Because of hard-coded locations, card replacement in such systems becomes an unwieldy exercise in memorization of locations of virtually hundreds of cards disposed in a system. It should be apparent that such an arrangement is not only hard on service technicians called upon to replace malfunctioning or defective cards, but upgradeability and scalability of the system are also hampered thereby. Moreover, the problem is particularly compounded especially where the cards may have to be arranged in some hierarchical fashion, because both card locations and card levels in the hierarchy are hard-coded. In addition, beyond the physical difficulties relating to maintenance, card replacement and repair, et cetera, providing tightly controlled internal clock signals (i.e., telecommunication clocks) in a reliable manner to the cards for synchronization (which is an essential aspect of the operation of a telecommunications switching/routing device) becomes a formidable task in the state-of-the-art solutions when a highly scalable architecture is required.

Further, as those skilled in the art should readily appreciate, current techniques for collecting alarm and status data from a huge number of sources (typically the cards themselves) in telecommunications equipment are inadequate because they require running separate cables from each alarm source to a centralized controller of the system. Clearly, with thousands of cards that may be needed for achieving the necessary network element functionality, such an arrangement creates an unmanageable cabling problem with attendant potential reliability hazards. Moreover, such concerns are heightened when small form factor requirements are imposed.

SUMMARY OF THE INVENTION

Accordingly, the present invention is, in one aspect, directed to a method of routing alarm signals in a signaling server disposed in a telecommunications network, wherein the signaling server includes a plurality of cards organized into multiples stages having a tree configuration. The method commences with generating alarm data by cards disposed at a select stage in the tree configuration. Thereafter, the alarm data is transmitted by the cards to cards disposed at a subsequent stage in the tree configuration. The received alarm data is then multiplexed by the cards disposed at the subsequent stage into a serial bitstream having multiple frames by allotting predetermined time slots to the alarm data. The serial bitstream is forwarded thereafter by each of the cards disposed at the subsequent stage through the tree configuration for successively multiplexing the serial bitstreams into a single multiplexed bitstream at a trunk of the tree configuration.

In another aspect, the present invention is directed to an apparatus for collecting alarm signals in a signaling server disposed in a telecommunications network. A system timing generator (STG) is provided which includes circuitry for producing a serial control signal for controlling the alarm collection process. A plurality of clock distribution modules (CDMs) are organized into at least one level in a nested hierarchy which is coupled to the system timing generator. A plurality of bus control modules (BCMs) are coupled to the lowest level of CDMs in the nested hierarchy, wherein each BCM is provided for interfacing with a plurality of printed board assembly (PBA) cards disposed on a bus segment. Each BCM includes circuitry for generating a status signal encoded with alarm data towards a CDM to which it is coupled. Multiplexing circuitry is provided in each CDM to multiplex received status signals from a level immediately beneath it in the nested hierarchy or the plurality of BCMs as the case may be into a serial bitstream having multiple frames by assigning predetermined time slots to the received alarm data based on control information provided in the serial control signal.

In yet another aspect, the present invention is directed to an alarm collection method using a multi-stage clock distribution system in a signaling server organized in a plurality of racks, wherein each rack includes a plurality of shelves. The multi-stage clock distribution system includes an STG, at least one CDM, and a plurality of BCMs. Upon determining the size of the signaling server system by ascertaining the number of racks, the CDMs are assigned levels in a nested hierarchy. When only one rack is provided, a single-level CDM hierarchy is present and, accordingly, an R-Level is assigned to the CDMs connected to the STG. If the signaling server system comprises between 2 and 8 racks, inclusive, the nested hierarchy is provided with two levels of CDMs. The CDMs connected to the STG are assigned L-Level and the CDMs coupled to the L-Level CDMs are assigned R-Level. If more than 8 racks are included in the system, a three-level nested hierarchy of the CDMs is provided: C-Level CDMs coupled to the STG, L-Level CDMs coupled to the C-Level CDMs, and R-Level CDMs coupled to the L-Level CDMs. Ultimately, the BCMs are coupled to the R-Level CDMs in this multi-stage distribution system. Without having to use hardwired strapping options, unique IDs are assigned to the shelves wherein the ID includes a redundancy Plane code, a Group code, a Rack code for a rack within a particular Group of racks, and a Shelf code for a shelf within a particular rack. The STG generates a framed serial control signal containing unique shelf ID information and CDM level information in order to control the alarm multiplexing process. Each BCM generates a status signal encoded with alarm data which is successively multiplexed towards the STG through the nested hierarchy of CDMs into a serial bitstream having multiple frames. The CDMs assign predetermined time slots to the received alarm data based on control and ID information provided in the framed serial control signal.

BRIEF DESCRIPTION OF THE DRAWINGS

A more complete understanding of the present invention may be had by reference to the following Detailed Description when taken in conjunction with the accompanying drawings wherein:

FIG. 17B is a flow chart of another exemplary embodiment of a method for assigning levels in an multi-level distribution scheme based on the number of the signaling server racks;

FIG. 18 is a flow chart of the steps involved in an exemplary alarm collection method for routing alarms in the signaling server;

FIGS. 19A–19M depict the signal protocol of the framed SFI signal used in the multi-stage distribution scheme of the present invention.

DETAILED DESCRIPTION OF THE DRAWINGS

Figure 1:
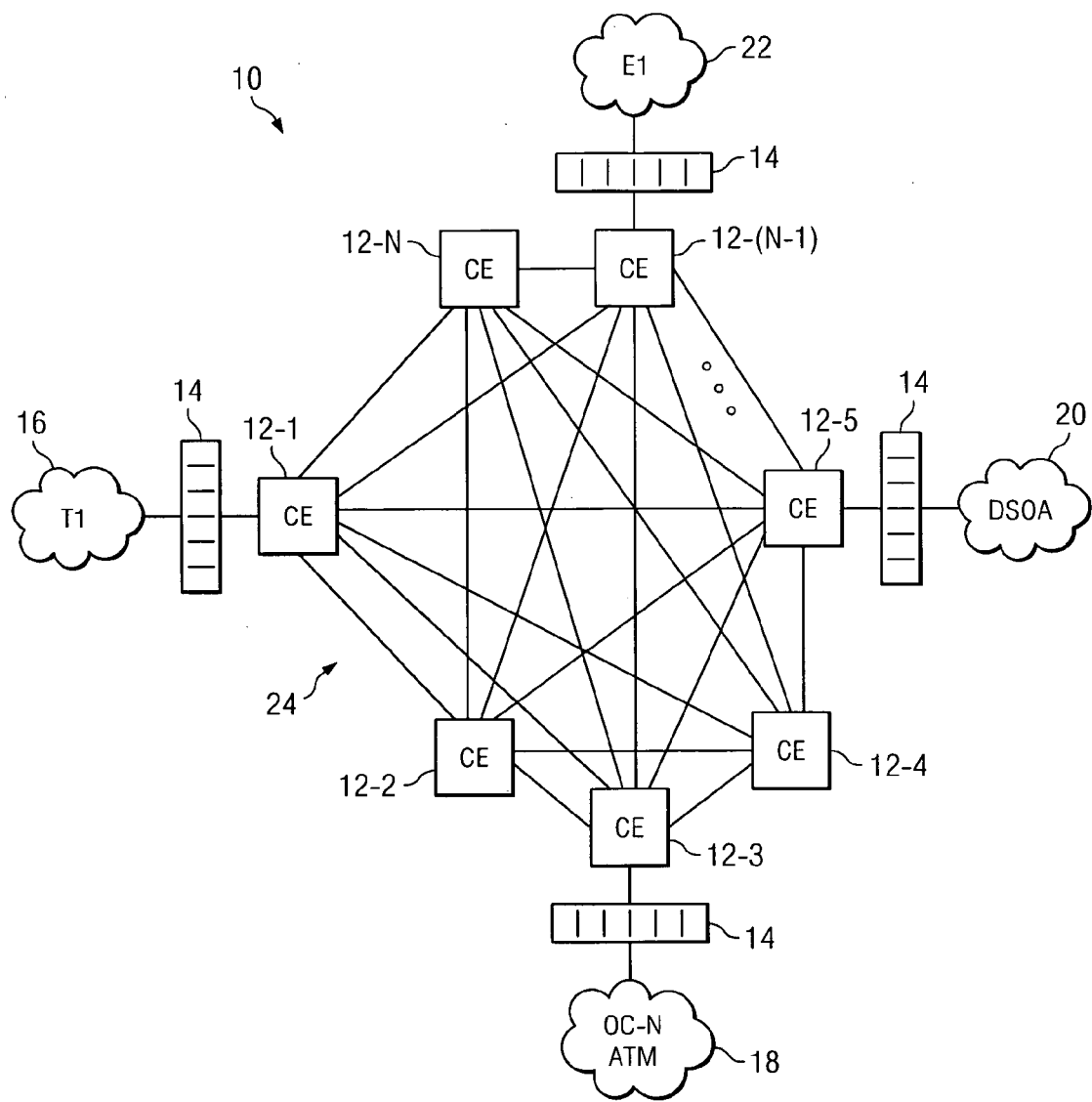
FIG. 1 depicts a high-level architectural view of a signaling server where an alarm collection scheme provided in accordance with the teachings of the present may be advantageously deployed.

In the drawings, like or similar elements are designated with identical reference numerals throughout the several views thereof, and the various elements depicted are not necessarily drawn to scale. Referring now to FIG. 1, depicted therein is a high-level architectural view of a telecommunications network node disposed in a heterogeneous network environment, e.g., a signaling server 10 having enhanced STP functionality, wherein an alarm collection system provided in accordance with the teachings of the present invention may be advantageously utilized. The signaling server 10 is preferably based on a distributed architecture of loosely coupled computing/control elements (CEs) or processors, e.g., reference numerals 12-1 through 12-N, networked together via a high-speed switching fabric 24. Each processor performs discrete functions in the control and maintenance of particular devices (not shown in this FIG.) and in the control of signaling, administrative, and/or maintenance functions. For example, one or more CEs are responsible for controlling the interfacing with the heterogeneous telecommunications network environment within which the signaling server 10 is disposed for providing the signaling/switching services. In the exemplary architecture shown in FIG. 1, a T1 network 16 operating at 1.544 megabits per second (Mbps) (equivalent to 24 voice channels) is linked to the signaling server 10 via a plurality of ports 14 controlled by CE 12-1. Similarly, an Asynchronous Transfer Mode (ATM) network 18 capable of operating at a particular rate, e.g., Optical Carrier (OC)-3, OC-12, OC-48, OC-N etc., is linked to the signaling server 10 via ports 14 controlled by CE 12-3. In analogous fashion, a DS-0A network 20 operating at 64 kilobits per second (Kbps) and an E1 network 22 operating at 2.048 Mbps are also exemplified herein. It should be apparent to those skilled in the art that networks operating with other standards and protocols, e.g., Synchronous Optical Network (SONET) and its companion Synchronous Digital Hierarchy (SDH), Internet Protocol (IP), etc., may also be linked to the signaling server 10 in certain implementations.

Figure 2:
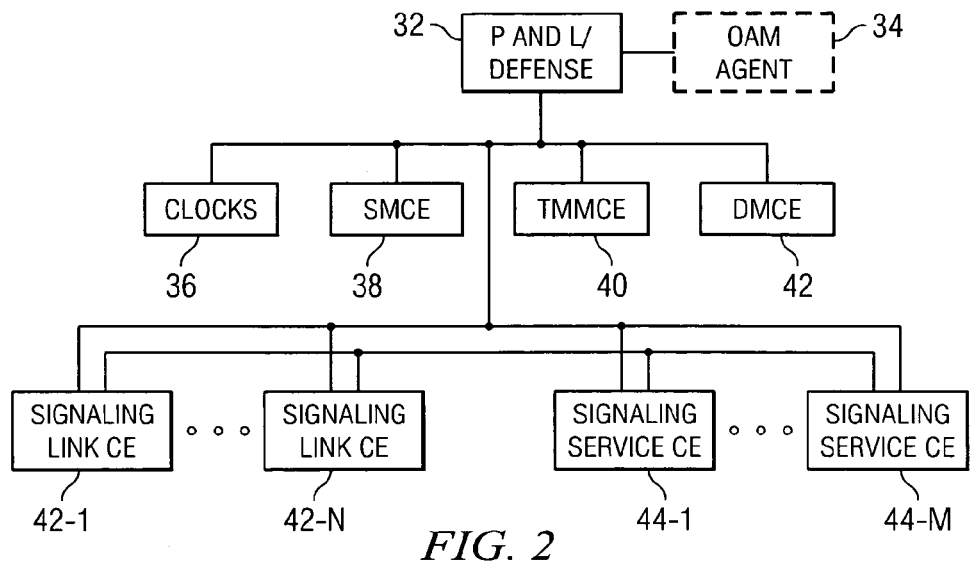
FIG. 2 depicts a functional block diagram of an exemplary embodiment of a signaling server.

FIG. 2 depicts a functional block diagram of an exemplary embodiment of the signaling server 10 wherein the plurality of CEs are grouped together based on their functionality as follows: Peripheral and Load CEs (PLCE) 32 coupled to an Operations, Administration and Maintenance (OAM) Agent 34 which is responsible for performing Operation Support System (OSS) interfaces; Signaling Management CEs (SMCE) 38; Database Management CEs (DMCE) 42; Traffic Metering and Measurement CEs (TMMCE) 40; and, depending upon the number of network link interfaces and their type, a plurality of Signaling Link CEs (SLCE) 42-1 through 42-N and a plurality of Signaling Service CEs (SSCE) 44-1 through 44-M. A plurality of clocks 36 are also provided under the control of PLCE 32 for furnishing the various time base signals required for the operation of the signaling server.

The PLCE 32 is provided as the logical master CE of the signaling server and controls the following functionality:

System initialization and loading: Provides loading segment sources upon power-up for all processors and devices of the system, except for the OAM Agent 34 and a Local Service Control Point (not depicted in FIG. 2);

Command handlers: Processes user commands (i.e., commands generated by the SS7 network operator that operates and maintains the signaling server) and dispatches them to proper subsystems;

Centralized configuration management: Provides maintenance processing on processors and devices;

Centralized fault handling: Receives and processes faults detected in the signaling server system. Coordinates with configuration management to remove faulty devices from the system;

Centralized test management: Processes all test requests for processors and devices. Coordinates between different processors/devices for tests that span multiple devices;

Event reporting: Handles processing events output to the user;

Alarm handling: Processes alarms presented to the user;

Core/Crash management: Processes data from processor crashes;

Clock management: Controls the system timing generator(s) (STG) which are responsible for generating appropriate system clock and control signals used in a multi-stage clock distribution system which operates as a platform for the alarm collection scheme of the present invention; and System Alarm Card: Sends alarm information to customer equipment.

The OAM Agent 34 operates in conjunction with the PLCE 32 as a co-master of the signaling server system and shares the OAM functionality therewith. The OAM Agent 34 is responsible for providing user interfaces (preferably Web-based graphic user interfaces) and includes local service management, reset controller management, No. 2 Switching Control Center System (SCCS) functionality, and Signaling Engineering and Administration System (SEAS) functionality.

Continuing to refer to FIG. 2, the TMMCE 40 contains a centralized collection mechanism for all measurements data collected in the signaling server system. The SMCE 38 manages the SS7 subsystem which comprises the following: SS7 route management; SS7 traffic management; SS7 provisioning; and Signaling Connection Control Part (SCCP) management. Each SLCE (e.g., reference numeral 42-1) controls SS7 link hardware and contains up to and through Message Transfer Part (MTP) Level 3 and SCCP functionality. The SLCE is responsible, accordingly, for the following: MTP Levels 2 and 3; SS7 link management; SCCP with Global Title Translation (GTT); and gateway screening.

The SSCE (e.g., SSCE 44-1), which controls no SS7-related hardware, contains logical database and screening service functionality for the SS7 subsystem. Its functionality includes: Local Number Portability (LNP) services; SCCP with GTT; gateway screening; and MTP buffering and routing. The DMCE 42 also controls no SS7-related hardware and provides the LNP and Application Location Register (ALR) functionality for the SSCEs.

Figure 3:
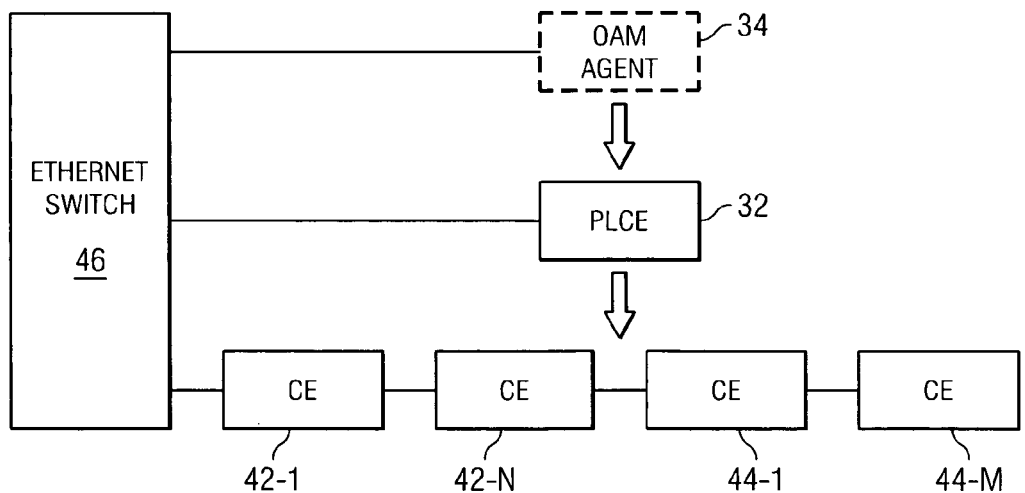
FIG. 3 depicts a hierarchical functional block diagram of an exemplary embodiment of a signaling server.

Referring now to FIG. 3, depicted therein is a hierarchical functional block diagram of a presently preferred exemplary embodiment of the signaling server which uses a high-speed Ethernet switching fabric (ESWT) 46 for internal transport among the various CE components described in greater detail hereinabove. The OAM Agent 34 and PLCE 32, which share the system master functionality, control the remaining CEs of the system wherein each CE runs a copy of Operating System Nucleus (OSN) for performing its assigned functionality.

Figure 4:
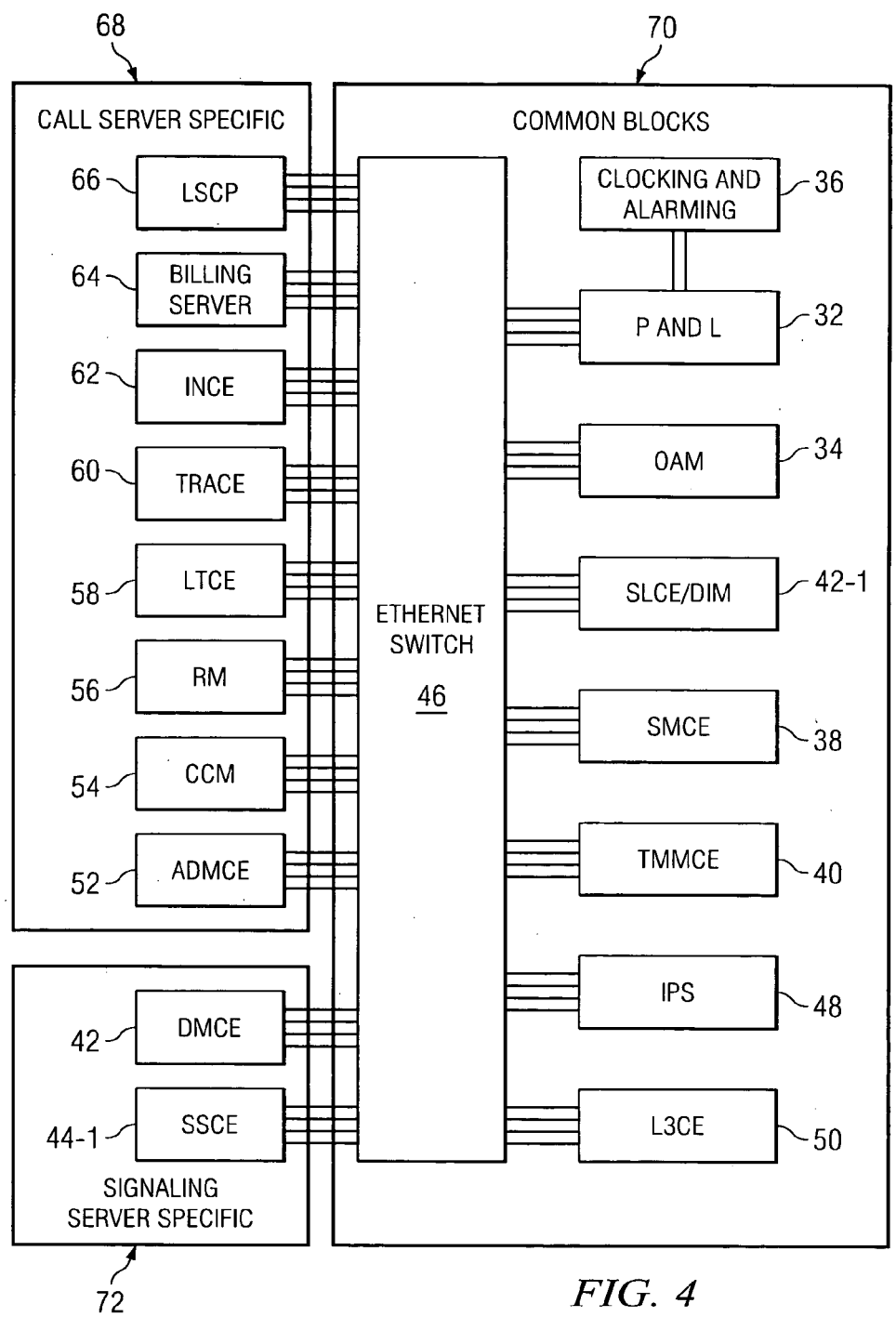
FIG. 4 depicts a functional block diagram of another exemplary embodiment of a signaling server having additional functionality.

FIG. 4 depicts a functional block diagram of another presently preferred exemplary embodiment of the signaling server which includes a Local Service Control Point (LSCP) 66 for locally providing a suitable Service Logic environment with respect to subscriber services, as well as a plurality of functional blocks to provide call server functionality. As can be readily seen in this FIG., the enhanced functionality of the signaling server node comprises a call-server-specific block 68, a signaling-server-specific block 72, and a common functional block 70 which comprises the CE components set forth above in addition to an IP signaling node (IPS) 48 and a separate MTP Level 3 Control Element 50.

The call-server-specific block 68, which provides basic call setup/control and local services, includes the following: LSCP 66, a billing server 64, an Intelligent Network Control Element (INCE) 62, a Trunk Resource Allocator Control Element (TRACE) 60, a Line/Trunk Control Element (LTCE) 58, a Resource Manager (RM) 56, a Connection Control Manager (CCM) 54, and an Administration Control Element (ADMCE) 52.

Figure 5A:
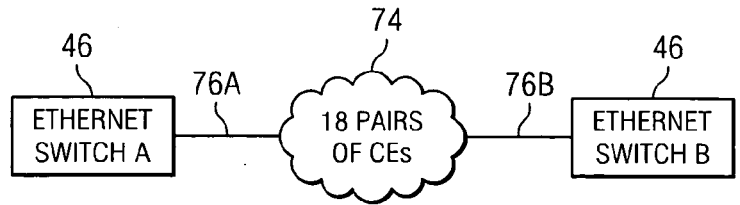
FIGS. 5A and 5B illustrate two scalable, redundant interconnect (switch fabric) architectures of an exemplary signaling server of the present invention.
Figure 5B:
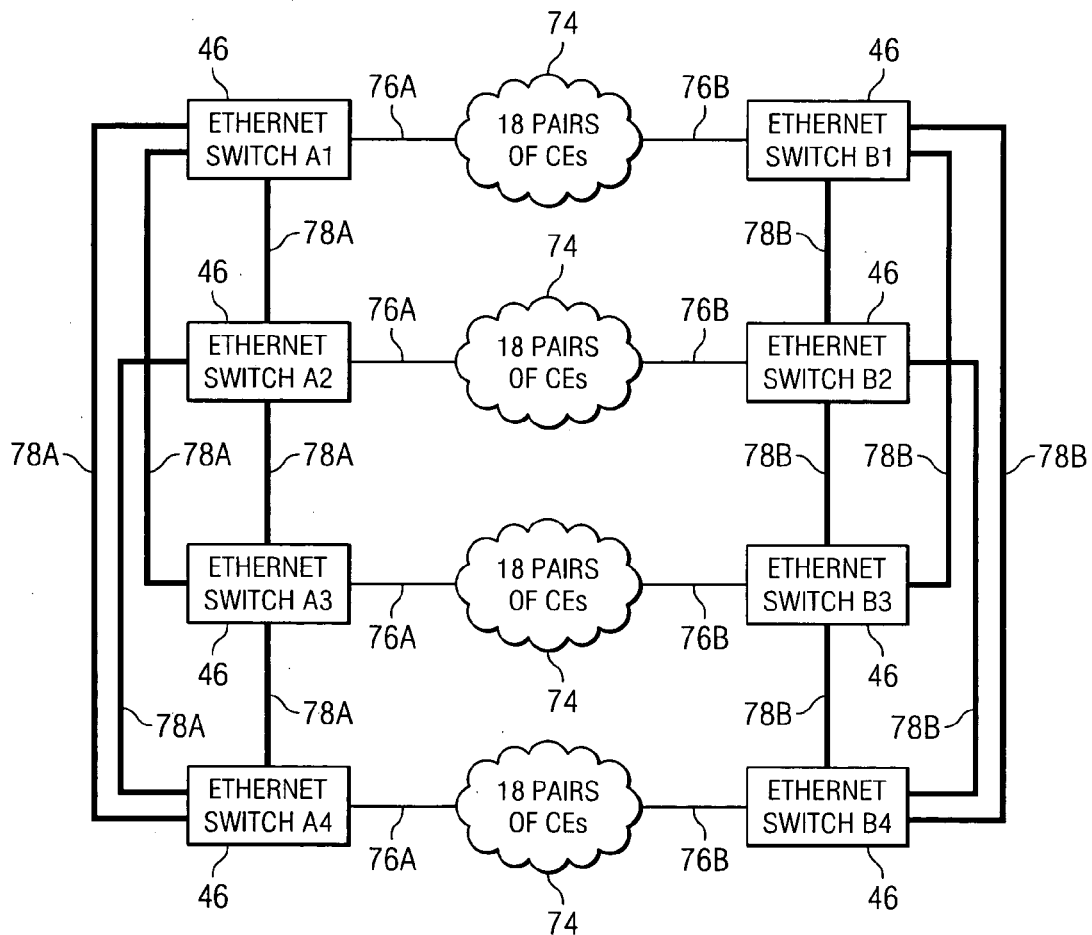

FIGS. 5A and 5B illustrate two scalable Ethernet switch fabric architectures having redundancy for providing the signaling server's internal messaging backbone. Preferably, the Ethernet switches 46 are capable of providing full wireline switching at 100 base-T speed. As exemplified in the basic configuration depicted in FIG. 5A, the switching network 46 comprises two separate switching fabrics, an A-side fabric and a B-side fabric, in order to support full redundancy. Each CE in the CE constellation 74 (forming the signaling server's functional blocks set forth herein-above) is provided with two 100 Mbps Ethernet connections, one on the A-side and the other on the B-side of the switching network.

In the basic configuration of FIG. 5A, two Ethernet switches are provided which can connect up to a maximum number of CEs based on the number of ports available on each Ethernet switch. For example, if each switch has 36 ports, then a maximum raw connectivity for 36 CEs (or 18 pairs of CEs) is available. The connection paths 76A and 76B exemplify the 100 Mbps links between the Ethernet switch ports and CEs.

Larger configurations of the signaling server are accomplished by adding more Ethernet switches into each side of the switching network, thus providing additional CE connectivity. Further, each switch in the internal switching network is preferably connected to every other switch using a gigabit link (1 Gbps or 1000 Mbps). FIG. 5B exemplifies a switching fabric for connecting 144 CEs (or 72 pairs) using four pairs of 36-port Ethernet switches. The inter-switch gigabit links are exemplified by six connection paths 78A on the A-side of the switching fabric and six connection paths 78B on the B-side of the switching fabric.

Figure 6:
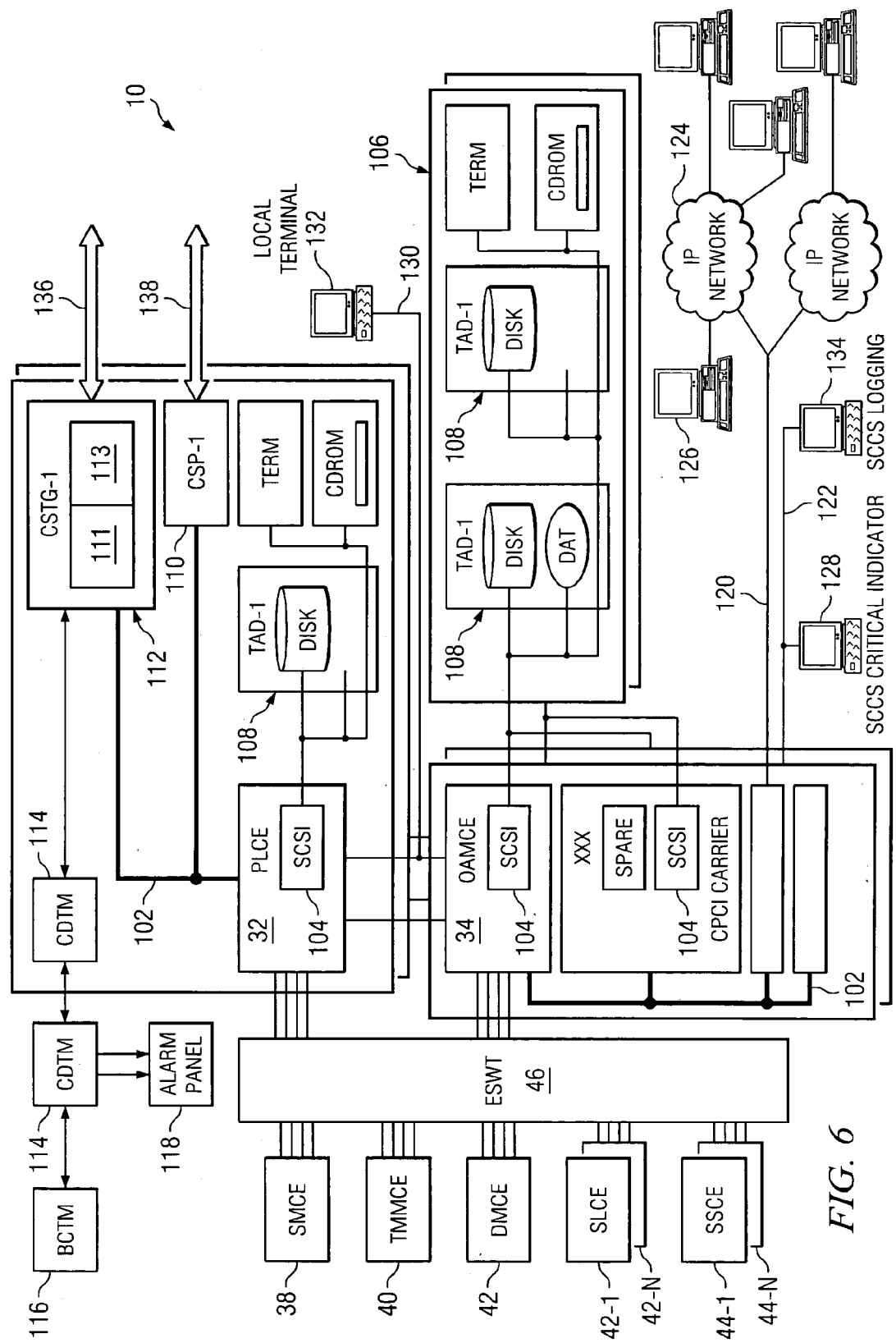
FIG. 6 depicts a hardware architectural block diagram of an exemplary signaling server having a multi-stage clock distribution scheme which operates as a platform for the collection of alarms in accordance with the teachings of the present invention.

FIG. 6 depicts a hardware architectural block diagram of a presently preferred exemplary embodiment of the signaling server 10 which includes the alarm collection scheme of the present invention. The signaling server's CE components such as SLCE 42-1 through 42-N, SMCE 38, SSCE 44-1 through 44-M, TMMCE 40, OAMCE 34, PLCE 32, and DMCE 42 are connected to the redundancy-based Ethernet switching fabric 46 as explained hereinabove. A plurality of computers, e.g., PC 126, are coupled to the OAMCE 34 via a suitable IP network 124 and IP-compatible path 120 for providing Web-based user interfacing with the signaling server with respect to the SEAS and SCCS functionality. Similarly, SCCS terminals 128 and 134 are coupled to the OAMCE 34 via an RS-232 path 122. One or more Small Computer System Interface (SCSI) modules 104 are included in the OAMCE block 34 for preferably providing connectivity to a plurality of I/O cards 106 having tape and disk (TAD) modules 108.

A SCSI module 104 is also included in the PLCE block 32 for providing connectivity to associated TAD module 108. A Control and Sense Point (CSP) 110 is coupled to the PLCE component 32 for providing the capability to receive and process customer alarm control points and alarm sense points via interface 138. A system timing generator (STG) module 112 having a clock 113 of a particular Stratum stability standard and an on-board computer (OBC) 111 is coupled to the PLCE component 32. The STG module 112, which will be described in greater detail hereinbelow, forms the first stage of a multi-stage clock distribution system which operates as a platform for alarm routing in accordance with the teachings of the present invention. Accordingly, the components of the alarm collection scheme will be described in the context of the multi-stage distribution system first.

Continuing to refer to FIG. 6, the STG module 112 preferably receives a plurality of external reference clocks and generates appropriate composite clock outputs via a signal interface 136. Further, the STG module 112 also collects system alarms and Status signals as set forth below. A clock distribution module (CDM) 114 coupled to the STG module 112 is provided as the distribution point (second stage) in the multi-stage clock distribution scheme. Multiple levels of CDMs may be provided in a cascaded chain in accordance with the teachings of the present invention for performing the clock distribution and alarm aggregation function depending on the size of the signaling server 10. Essentially, the CDM 114 receives its system clock input from the STG module 112 and generates a predetermined number of copies of the same so as to drive them to the downstream modules in the cascaded chain. Further, the CDM module receives a framed control signal called Super Frame Indicator (SFI) signal from the STG module 112 which is encoded along the cascaded chain for controlling the proper distribution of clock signals, and for collecting alarm signals and Status information in accordance with the teaching of the present invention.

In addition to the clock distribution function, the CDM 114 commands and controls a system alarm panel 118 which provides visual and audible indicators for preferably three types of alarms: critical, major, and minor. The alarm panel 118 is controlled by the PLCE component 32 via memory-mapped I/O operations to the STG 1112. The alarm functionality information is placed in appropriate fields of the SFI signal and transferred to the CDM 114, which is then extracted to drive the audible/visual alarm indicators.

The CDM 114 is connected to a bus control module (BCM) 116 downstream which forms the third stage in the multi-stage clock distribution scheme of the present invention. As will be described in greater detail hereinbelow, the BCM 116 receives its clock inputs from the upstream CDM 114 and, as part of the redundancy scheme, its mate on that level. The BCM 116 then selects one of the two clock inputs and distributes a copy of the clock to a plurality of boards or Printed Board Assemblies (PBAs) it controls on a bus backplane.

Those skilled in the art should realize upon reference hereto that the various CE blocks and associated devices described hereinabove may be advantageously provided as highly modularized PBAs disposed on a suitably segmented high performance bus system that affords a rugged mechanical form factor in addition to hot swappability, to increase system reliability and availability. Accordingly, the Compact Peripheral Component Interconnect (CPCI) bus system which has emerged as the bus system of choice for ruggedized applications requiring stringent form factors while still maintaining electrical compatibility with the PCI bus standard in terms of its high performance, is preferably utilized for interconnecting the various PBAs of the signaling server. As is well known, although the CPCI standard is identical to the PCI standard used in PCs in terms of electrical performance, it offers a more connectorized card form factor and uses a vertically mounted backplane that is not only highly robust, but also provides access from both sides of the backplane. Furthermore, in addition to facilitating the mechanical aspects of live insertion/removal of cards quickly and efficiently (i.e., hot swappable), the vertical layout provides for better cooling in the backplane chassis, an essential consideration in heat intensive applications.

Still continuing to refer to FIG. 6, a CPCI bus segment 102 is therefore preferably provided as the interconnect means between the various components of the OAMCE block 34 and between the PLCE 32 and STG 112. Because the various hardware components of the clock distribution scheme are provided as CPCI-compatible boards or cards, their nomenclature may be suitably modified to reflect this condition. For example, the STG 112 may be interchangeably referred to as CPCI STG or CSTG hereinafter. Moreover, as the CPCI standard allows for efficient connecterization utilizing both the front and back of a backplane to attach multiple components, the CDMs and BCMs of the clock distribution scheme are preferably provided as the rear panel boards known as transition modules (TMs). Accordingly, hereinafter, the CDM 114 may be interchangeably referred to as Clock Distribution Transition Module (CDTM) and the BCM 116 as Bus Control Transition Module (BCTM).

As briefly alluded to in the foregoing, the CDM/CDTM stage which forms the second stage of the multi-stage clock distribution scheme may be provided as a multi-level clock distribution point based on the size of the signaling server 10. It should be apparent to those skilled in the art that the signaling server's size is typically contingent upon the number of telecommunications network links it is designed to service in addition to the volume/type of signaling loads received thereat. Accordingly, the hardware architecture of the signaling server 10 is preferably provided to be scalable and redundant. Furthermore, the housing frame of the signaling server which is highly modularized for easy maintenance is amenable to clustering several basic housing units in inter-connected groups operating together as a single signaling server node.

Figure 7:
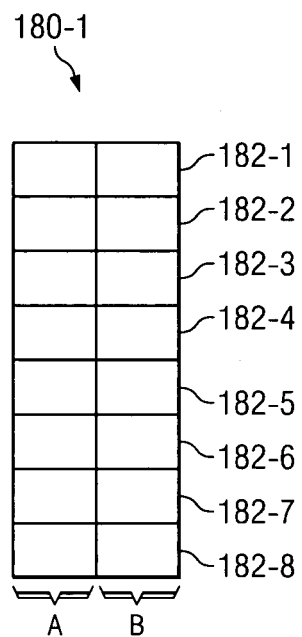
FIGS. 7–9 depict modularized, scalable form factors for housing the signaling server functionality of the present invention.
Figure 8:
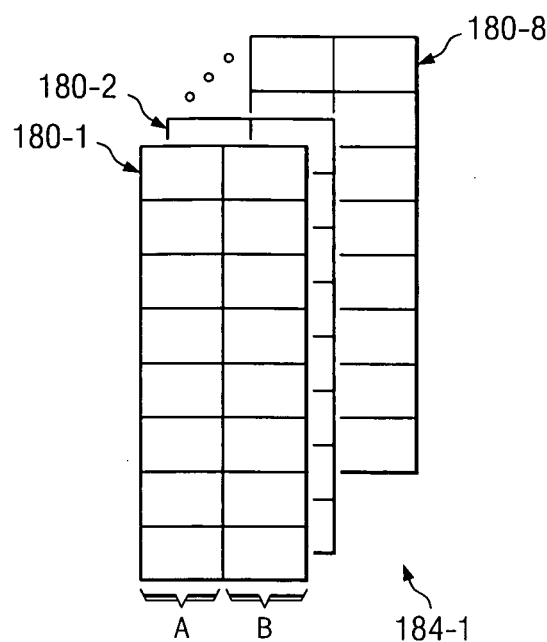
Figure 9:
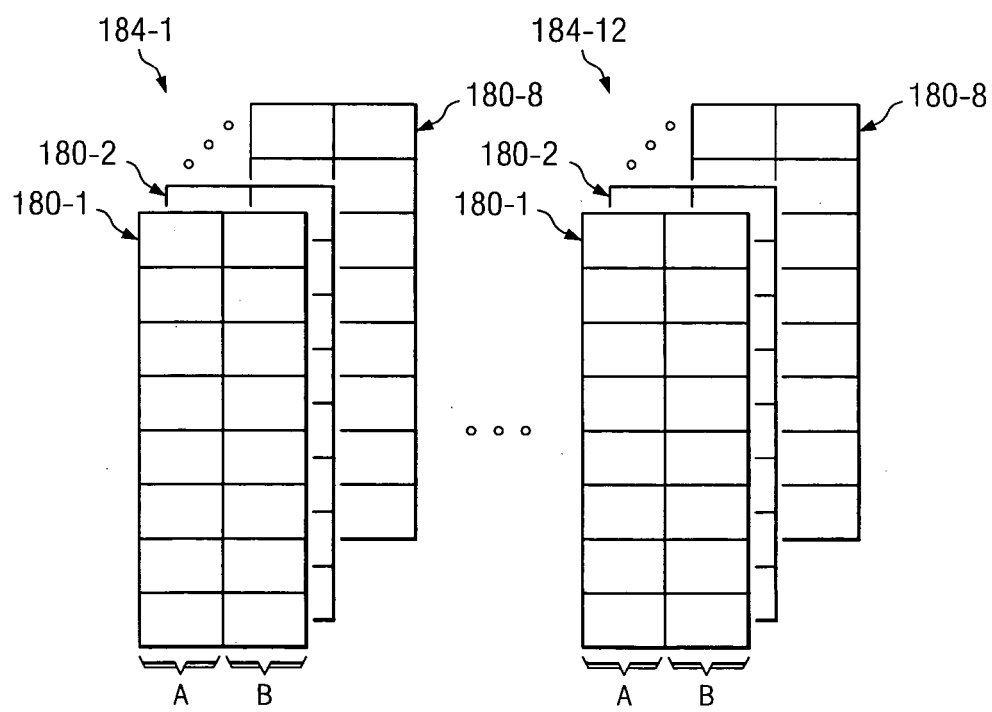

FIGS. 7–9 depict three exemplary hierarchical levels of clustering used for expanding the signaling server's capacity. A single rack 180-1 illustrated in FIG. 7 exemplifies the basic housing frame design of the signaling server. The rack 180-1 is preferably compartmentalized into a plurality of sub-racks or shelves that house various CE components (hereinafter also referred to as CPCI CE components or CPCEs), line/link interface modules (LIMs) such as, e.g., DS-0A interface modules (DIMs), clock distribution components, and numerous associated devices and units, e.g., Power Supply Units (PSUs), fans, TAD boards, etc., all in modularized PBAs disposed on CPCI backplane connectors. In a presently preferred exemplary rack embodiment, eight shelves/sub-racks are provided which are labeled with reference numerals 182-1 through 182-8. In addition, it is envisaged that the signaling server functionality and associated hardware is partitioned among the various shelves such that some of the shelves may have specialized roles. For example, the administrative functionality of the signaling server may be conveniently packaged in the top shelf of the rack and accordingly may be referred to as the ADMIN Shelf. In similar fashion, shelves dedicated to providing the link interface functionality may be referred to as link shelves.

Further, each shelf of the rack 180-1 is segregated into an A-side and a B-side (referred to as half-shelves) to house redundant portions of the allocated hardware in order to increase reliability and interoperability of the system. Each half-shelf contains a CPCI backplane which preferably provides eight 6U/4HP (horizontal pitch) slots fully connectorized through P1 through P5 connectors on the front side as well as the rear panel TM side. A single BCM (or BCTM) card is provided in each half-shelf for distributing the clock signals to the PBAs disposed in the backplane slots. Furthermore, a single pair of CDTM cards which are connected to a pair of CSTGs are provided in the leading shelf (i.e., ADMIN shelf) of the rack 180-1 to provide the clock signals to the eight pairs of the BCTM cards. This pair of CDTMs comprises the lowest level in the multiple levels of the CDTM stage of the clock distribution scheme and are referred to as Rack level distribution CDTM cards or R-CDTM (or CDTM-R) cards.

Referring now to FIG. 8 in particular, a multi-rack configuration or cluster 184-1 is depicted therein. Preferably, the cluster 184-1 comprises eight racks, labeled with reference numerals 180-1 through 180-8, each of which is compartmentalized into A- and B-sides as set forth above with reference to rack 180-1. In addition to a pair of R-CDTM cards in the leading shelf of each rack, the leading rack (e.g., rack 180-1) also contains a second pair of CDTMs to distribute the clock and SFI signals generated by the CSTG pair. This second pair of CDTMs comprises the middle level of the CDTM distribution stage of the clock distribution scheme and are referred to as Lead level distribution CDTM cards or L-CDTM (or CDTM-L) cards. In a presently preferred exemplary embodiment of the clock distribution scheme, the CDTM-L pair accordingly provides a clock fan-out for eight CDTM-R cards.

FIG. 9 depicts a multi-cluster, multi-rack configuration of the signaling server of the present invention which utilizes a third level of CDTMs, called Central Clock distribution level CDTMs or C-CDTMs, for providing a clock fan-out for twelve clusters (reference numerals 184-1 through 184-12) of eight racks each. Accordingly, in a presently preferred exemplary of the present invention, up to 96 racks—each rack containing four shelves (i.e., four pairs of BCTMs)—are provided with appropriate clock signals by utilizing the multi-stage clock distribution scheme. Furthermore, as will be described in greater detail hereinbelow, the cascaded CSTG-CDTM-BCTM chain is also advantageously utilized for collecting and multiplexing alarm/Status signals emanating from individual PBA boards residing in the shelves.

Figure 10A:
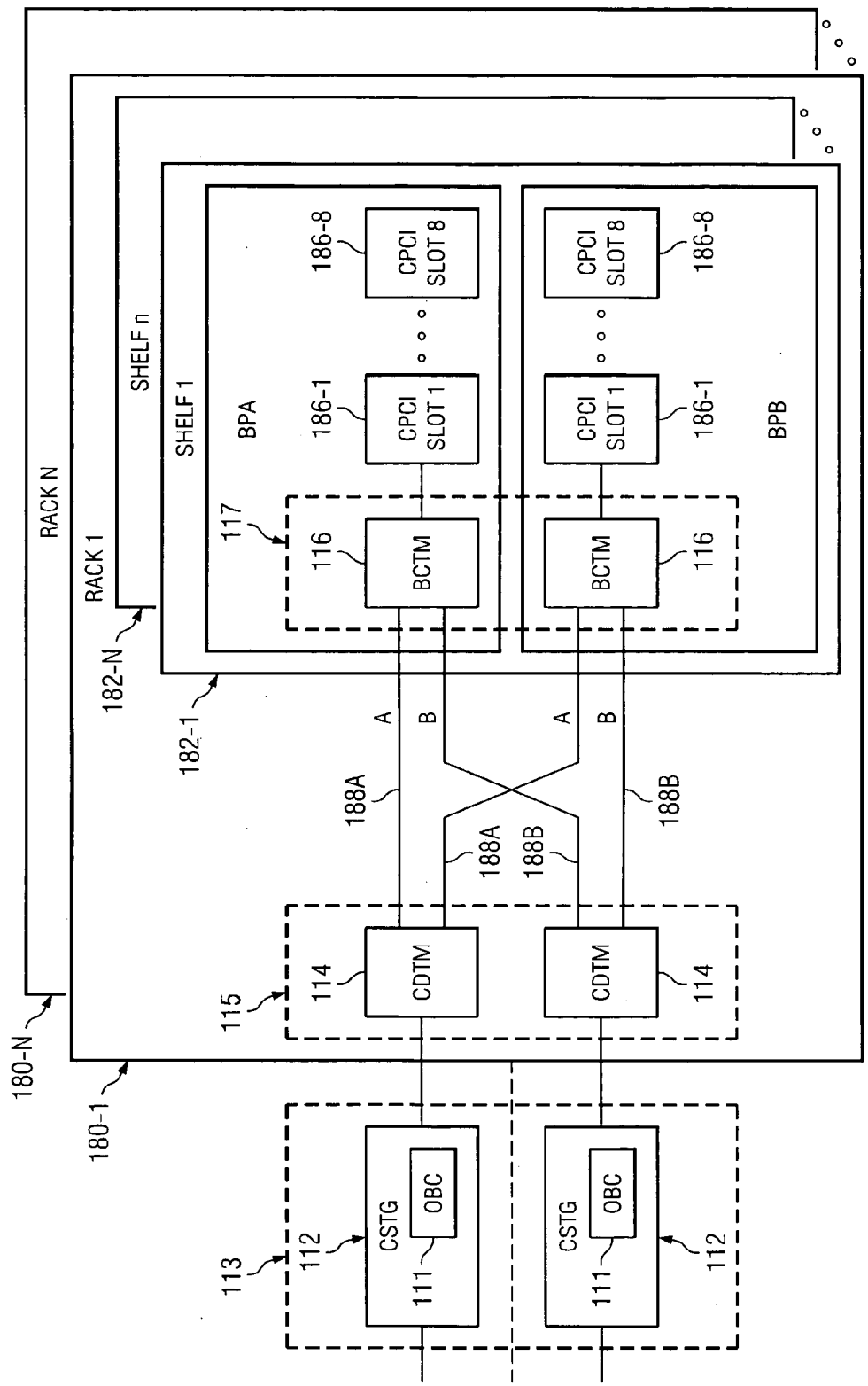
FIG. 10A depicts an exemplary three-stage distribution scheme of the present invention wherein alarms are collected and aggregated at each stage thereof.

Referring now to FIG. 10A, depicted therein is an exemplary embodiment of the three-stage clock distribution scheme set forth above. The CSTG pair 112 (primary and secondary CSTGs) comprises the first stage 113 of the chain which supplies the system clock and SFI signals to the CDTMs 114 forming the second stage 115. As those of ordinary skill will readily recognize, the second stage 115 is provided in this exemplary embodiment as the lowest level CDTMs, i.e., the R-CDTMs, although it may comprise multiple levels depending upon the signaling server's size as explained in the foregoing portion of the Detailed Description. The R-CDTMs are directly connected to the third stage 117 of the clock distribution chain which is comprised of the BCTM cards 116, wherein each BCTM is responsible for local clock distribution with respect to eight CPCI slots 186-1 through 186-8 residing in the half shelf it controls. Further, each BCTM card terminates two redundant timing distribution planes, 188A and 188B, received from the R-CDTMs 114. Additional details regarding the BCTM card architecture and functionality are set forth in the co-pending commonly assigned patent applications which have been cross-referenced hereinabove and are incorporated by reference herein.

Multiple levels of the CDTM cards may be provided in the second stage 115 of the clock distribution scheme as follows:

one rack: one pair of R-CDTM cards installed in the leading shelf;

up to and including eight racks: one pair of L-CDTM cards installed in the leading rack and up to eight pairs of R-CDTMs; and more than eight racks: one pair of C-CDTM cards, up to 12 pairs of L-CDTM cards, and up to 96 pairs of R-CDTMs.

In the subsequent portions of the Detailed Description hereinbelow, the reference numerals for the CDTMs will be accordingly concatenated with "R", "L", or "C" to indicate the particular level of the CDTMs as is deemed necessary and appropriate for the sake of contextual clarity.

Figure 10B:
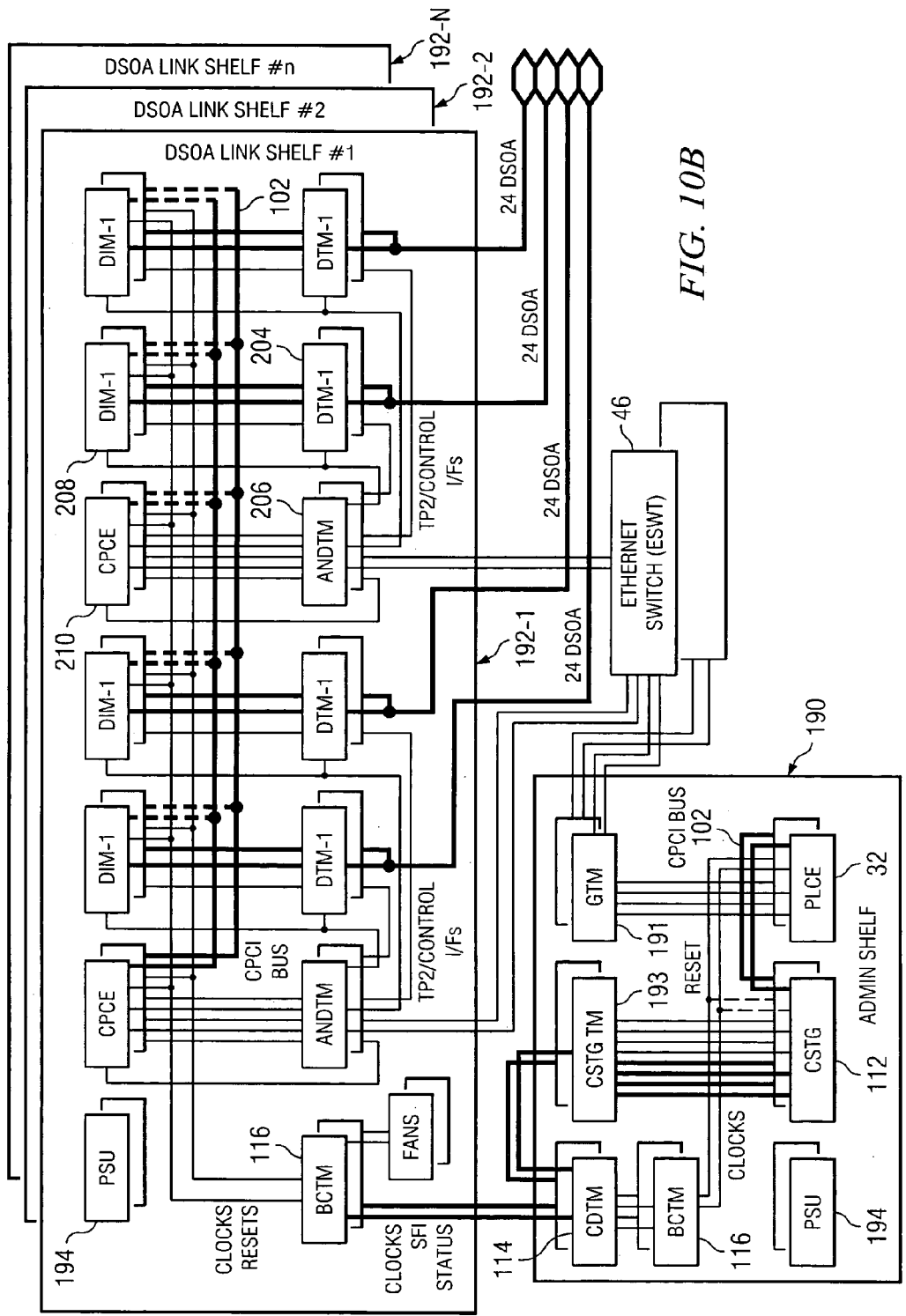
FIG. 10B depicts an exemplary shelf arrangement interconnecting scheme between a link shelf and an administrative shelf of the modularized signaling server's rack wherein the placement of a clock distribution module card and a bus control module card used for the distribution scheme is illustrated.

FIG. 10B depicts an exemplary shelf arrangement interconnecting scheme between a link shelf, e.g., DS-0A link shelf 192-1, and an ADMIN shelf portion 190 of the modularized signaling server's rack wherein the placement of the clock distribution components is illustrated. The PLCE 32 and CSTG 112 disposed in the ADMIN shelf portion 190 as the front panel PBAs are coupled via CPCI bus segment 102. A Generic Transition Module (GTM) 191 is provided as the rear panel I/O board for the PLCE 32 to connect with the Ethernet Switch 46. Similarly, a rear panel TM 193 is provided for the CSTG 112 for coupling to the CDTM 114. Further, the BCTM and CDTM boards are preferably placed behind the PSU board 194 in the ADMIN shelf 190.

The DS-0A link shelf 192-1 comprises a plurality of CPCEs, e.g., reference numeral 210, which are coupled to the Ethernet Switch 46 via suitable Application Node DS-0A Transition Modules (e.g., ANDTM 206). In addition, a plurality of DIMs 208 are provided which are coupled to the DS-0A links via DS-0A Transition Modules (e.g., DTM 204). CPCI bus segment 102 is provided on the backplane of the link shelf for interconnecting the CPCEs, DIMs and their respective TMs.

A link shelf BCTM 116 is coupled to the CDTM 114 of the ADMIN shelf 190 via appropriate bidirectional cabling 195 in accordance with the clock distribution scheme of the present invention. The cascaded clock and SFI signals are accordingly transported downstream from the CDTM 114 to the link shelf BCTM 116, and the alarm/Status signals and reference clocks derived from the telecommunications network signals received at the link shelf 192-1 are transported upstream from the link shelf BCTM 116 to the CDTM 114.

Figure 10C:
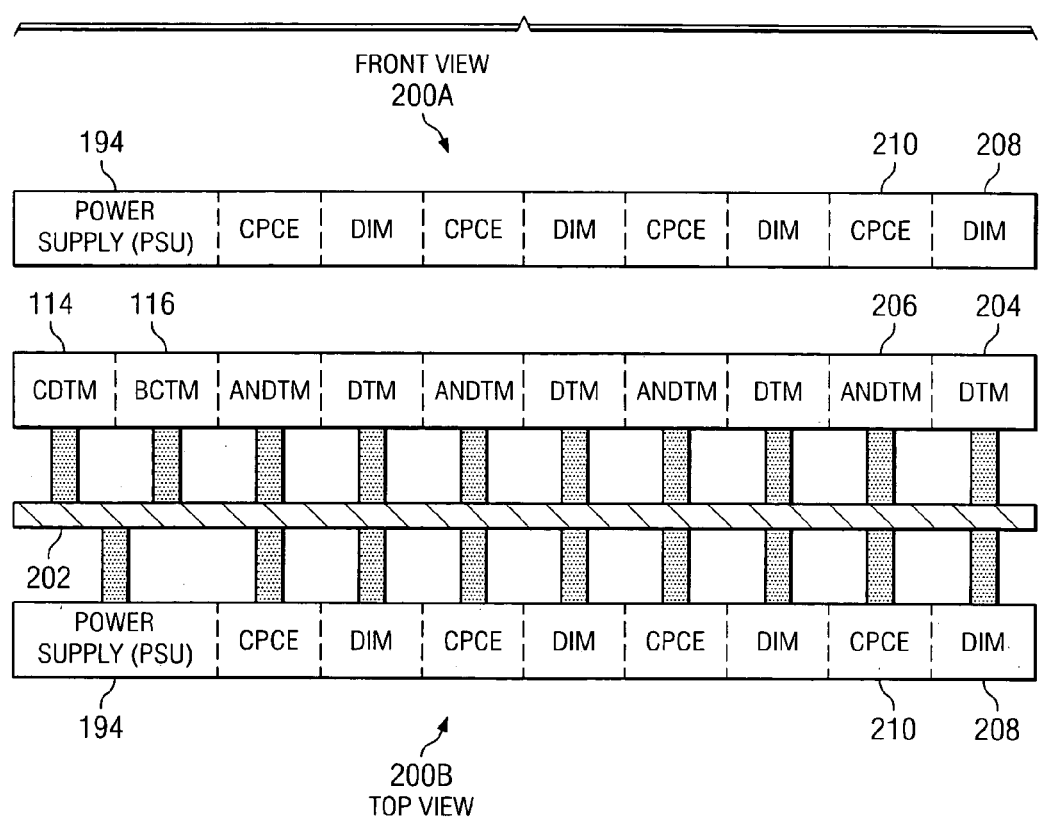
FIG. 10C illustrates a presently preferred exemplary placement scheme for positioning the clock distribution and bus control module cards with respect to a Compact Peripheral Component Interconnect (CPCI) backplane disposed in a half-shelf.

FIG. 10C depicts two views of a sub-rack/shelf design exemplifying a backplane 202 with the various modules disposed thereon. Reference numeral 200A refers to a front view of the shelf backplane with the front panel modules such as, e.g., PSU 194, CPCE 210, DIM 208, etc. Reference numeral 200B refers to a top view of the backplane 202 wherein the rear panel TMs are positioned behind the backplane 202. The CDTM 114 and BCTM 116 are preferably located behind the front panel PSU 194.

Having set forth hereinabove the physical hierarchy of the exemplary three-level, three-stage distribution system used for delivering clock and SFI signals downstream from the STG to the BCTMs, and for aggregating reference clocks and alarm/Status signals upstream to STG from the BCTMs, the various signals used in the practice of the present invention and their cascading schema may now described in greater detail as provided hereinbelow.

Figure 11A:
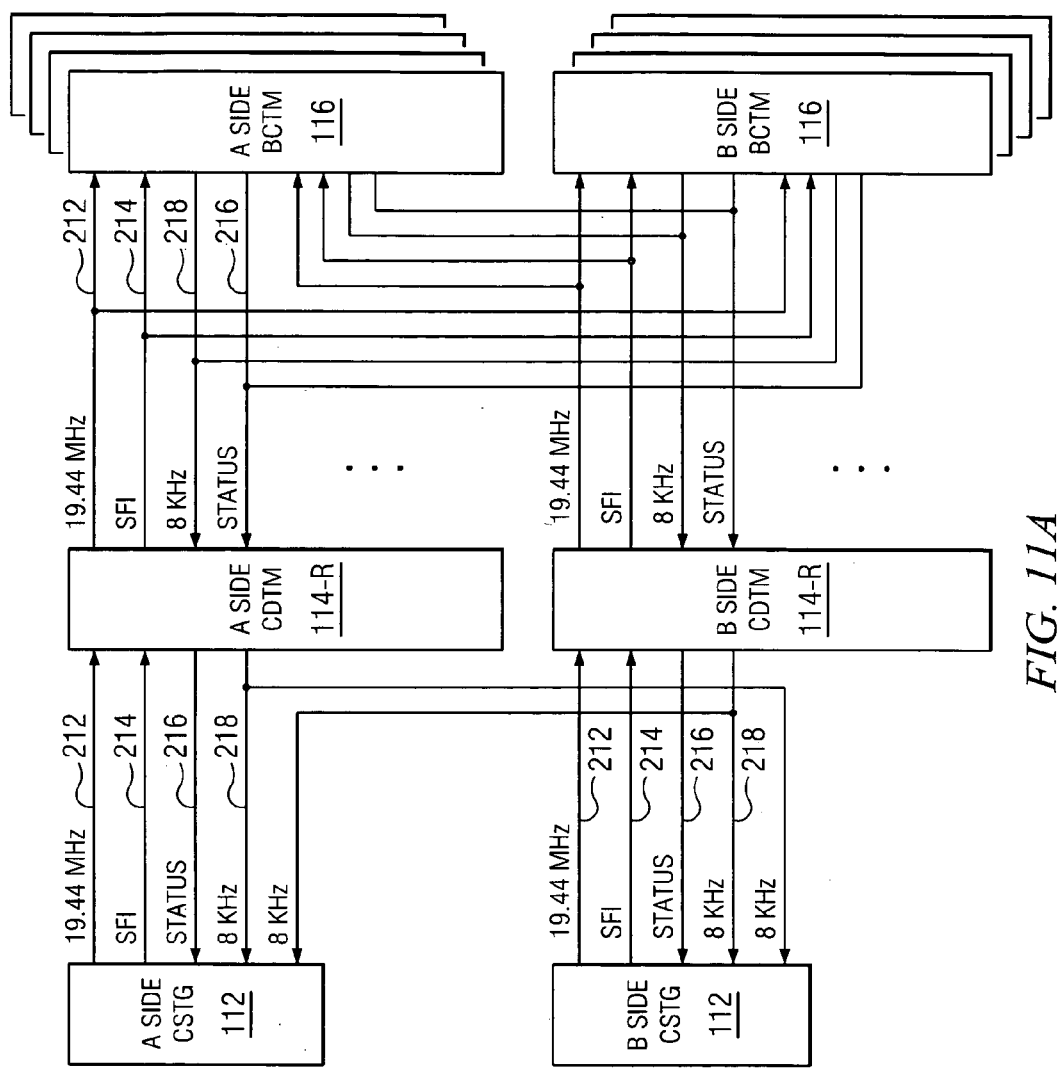
FIGS. 11A–11C depict three scalable, hierarchical levels of the three-stage clock/alarm distribution scheme depending on the number of signaling server racks provided at a network node.
Figure 11B:
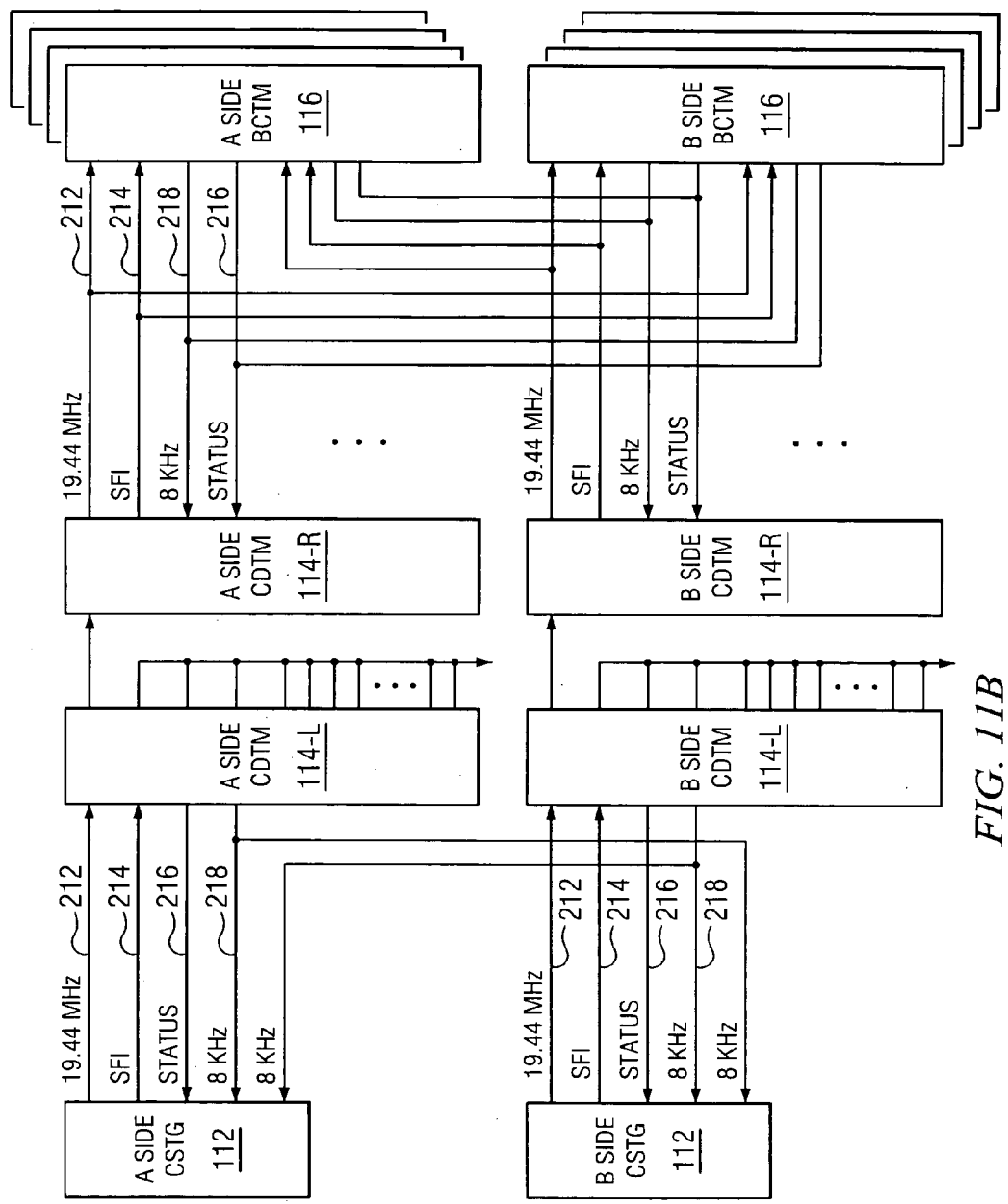
Figure 11C:
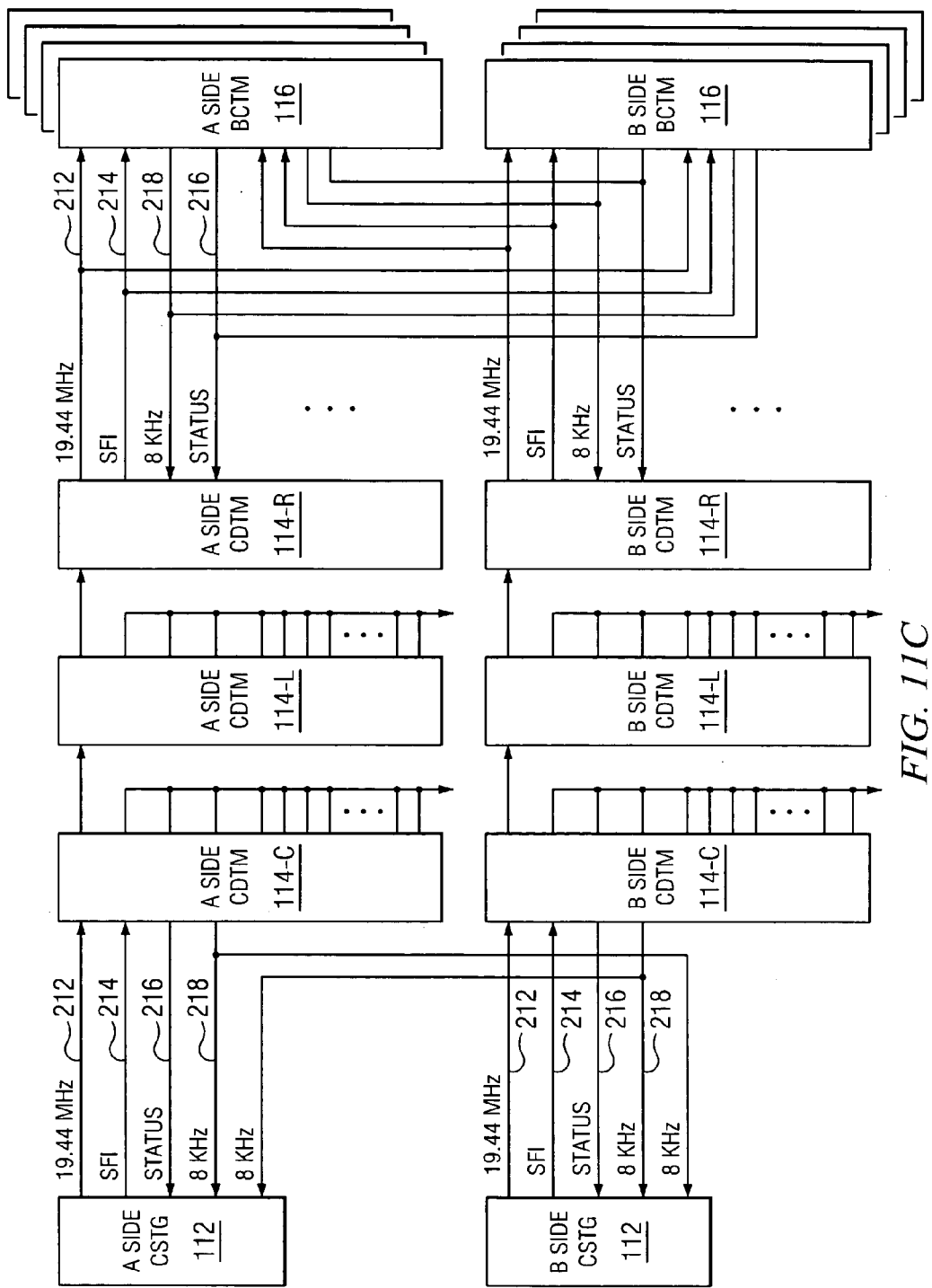

FIGS. 11A–11C depict three signal cascading schema of the present invention based on the number of racks provided in the signaling server. Specifically, FIG. 11A illustrates the signal cascading scheme for use in a single rack signaling server system. Four distinct signals are provided in accordance with the teachings of the present invention: two outbound signals—the internal clock signal 212 and the framed SFI signal 214; and two inbound signals—the reference clock signal 218 and the Status signal 216. The clock signal 212 is the system clock generated by the CSTG 112 based on reference inputs for providing an appropriate time base for the internal operations of the signaling server. Whereas it may be desirable to have a very high rate for the clock 212, it is recommended that it operate at a rate that overcomes the difficulty to distribute it through cables and still meets the jitter requirements at the network interfaces which may use inexpensive Phase Lock Loops (PLLs). In a presently preferred exemplary embodiment of the present invention, the clock 212 preferably runs at around 19.44 MHz.

The SFI signal 214, whose signal protocol is described in greater detail hereinbelow, has a rate preferably equal to the rate of the clock 212 in order to achieve maximum bandwidth. It is a framed signal which transports, inter alia, the following positional information:

the position of the Frame (preferably set at 125 μs) which coincides with the phase of a Composite Clock (CC) when CC is used a reference input by the CSTG 112;

the position of the Superframe for T1 and E1 line signals;

the position of the Extended Superframe which marks the beginning of the Status signal.

The reference clock 218 is a clock signal derived from the network interfaces based on the telecommunications signals received thereat. The nested hierarchy of the BCTM and CDTM cards provides a tree structure which allows system software to select a particular reference clock derived from any network interface signal.

The Status or Extended Alarm Signal (EAS) 216 is a framed signal generated by the BCTM cards 116 and multiplexed up through the multi-stage chain to the CSTG cards 112. In a presently preferred exemplary embodiment of the present invention, the EAS signal 216 runs at a much lower rate than the system clock 212 and transports alarms and other signals collected from the BCTM and CDTM cards. Further, it does not have a clock associated therewith in the exemplary embodiment depicted herein, as each CDTM and BCTM card can synthesize an appropriate reading clock (around 1 MHz) by using the outbound clock and SFI signals.

Continuing to refer to FIG. 11A, both A- and B-sides of the multi-stage distribution scheme are illustrated. The outbound signals generated by the CSTG 112 are provided to the rack level CDTM 114-R on the each side. Each CDTM 114-R then provides a clock fan-out 212 for eight BCTMs 116. Similarly, the SFI signal is also driven to eight BCTMs after the port BCTM port ID information is inserted by the CDTM 114-R. The BCTM ID generation will be described in further detail below. The outbound clock 212 and SFI signal 214 from the A-side are also provided to the B-side BCTM and vice versa for the sake of redundancy. Further, each CDTM-R 114-R receives the inbound EAS signal 216 and reference clock 218 from BCTMs 116 of both A- and B-sides.

FIG. 11B depicts the signal cascading scheme for a system having between two and eight racks. A second level CDTM-L (reference numeral 114-L) is provided in each redundant side of the distribution scheme which provides a fan-out for the clock 212 and SFI 214 signals for up to eight CDTM-R 114-R cards each of which, in turn, drives eight BCTM cards 116 appropriately as set forth above. The encoding of the SFI 214 with respect to uniquely identifying the lower level CDTM-R cards 114-R and the BCTM cards 116 will be provided in further detail hereinbelow.

FIG. 11C depicts the signal cascading scheme for a signaling server having between 9 and 96 racks in total. A pair of CDTM-C cards 114-C are coupled to the CSTG cards 112, which drive up to twelve mid-level CDTM-L cards 114-L. Again, each CDTM-L card 114-L drives eight rack-level CDTM-R cards 114-R as described above. The framed SFI signal 212 generated by the CSTG 112 is appropriately encoded by the various level of CDTMs as it is cascaded downstream towards the BCTMs. Further, the various alarm and Status signals generated by the BCTMs 116 are multiplexed by the CDTMs into the EAS signal 216 as they are propagated upstream towards the CSTG 112 for appropriate treatment by the system. The intermediary CDTMs also write their own alarm/Status information into the EAS signal 216 in the process.

Figure 12A:
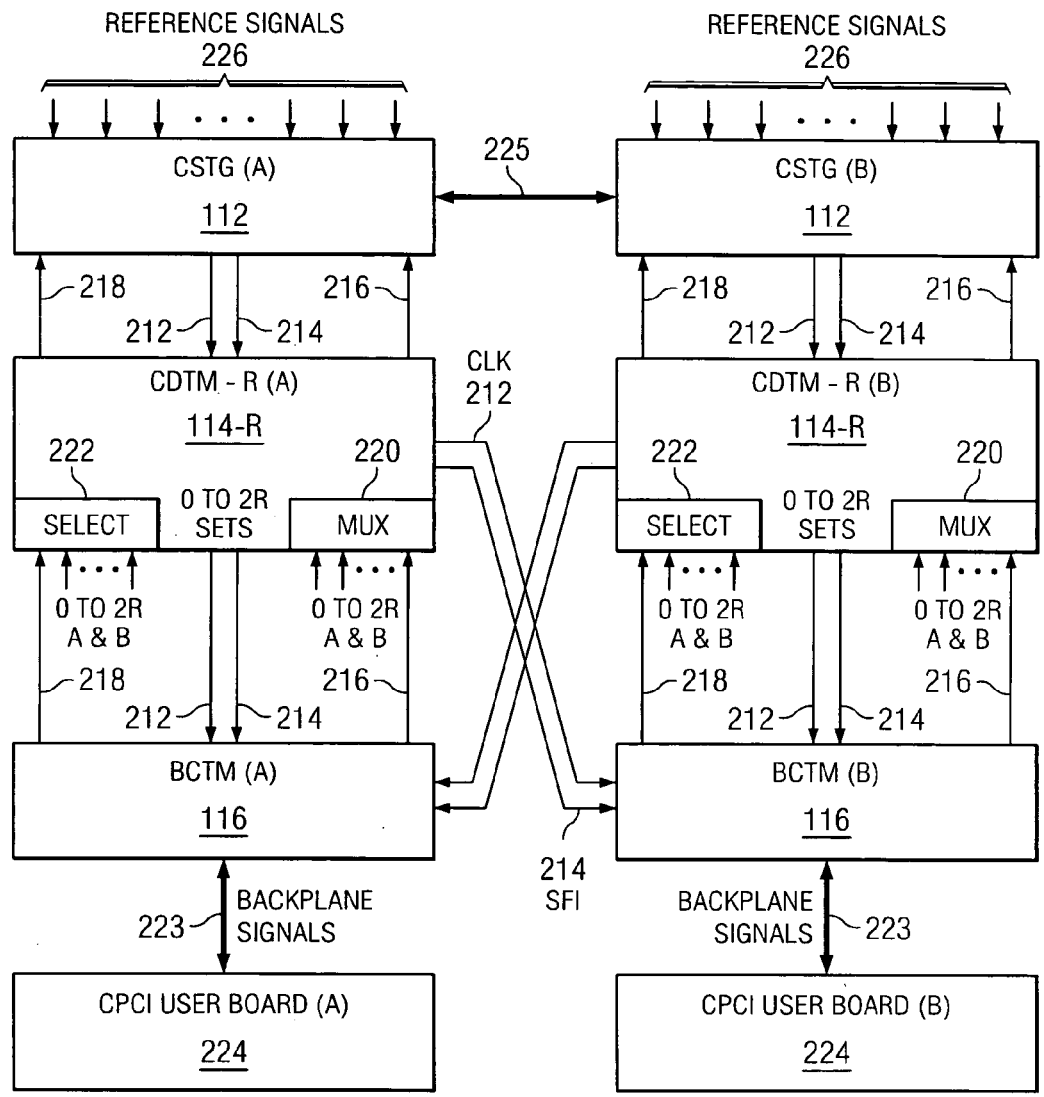
FIGS. 12A–12C depict another view of the three-level, three-stage clock/alarm distribution scheme illustrating the cascaded clock, control and Status signals in a redundant architecture.
Figure 12B:
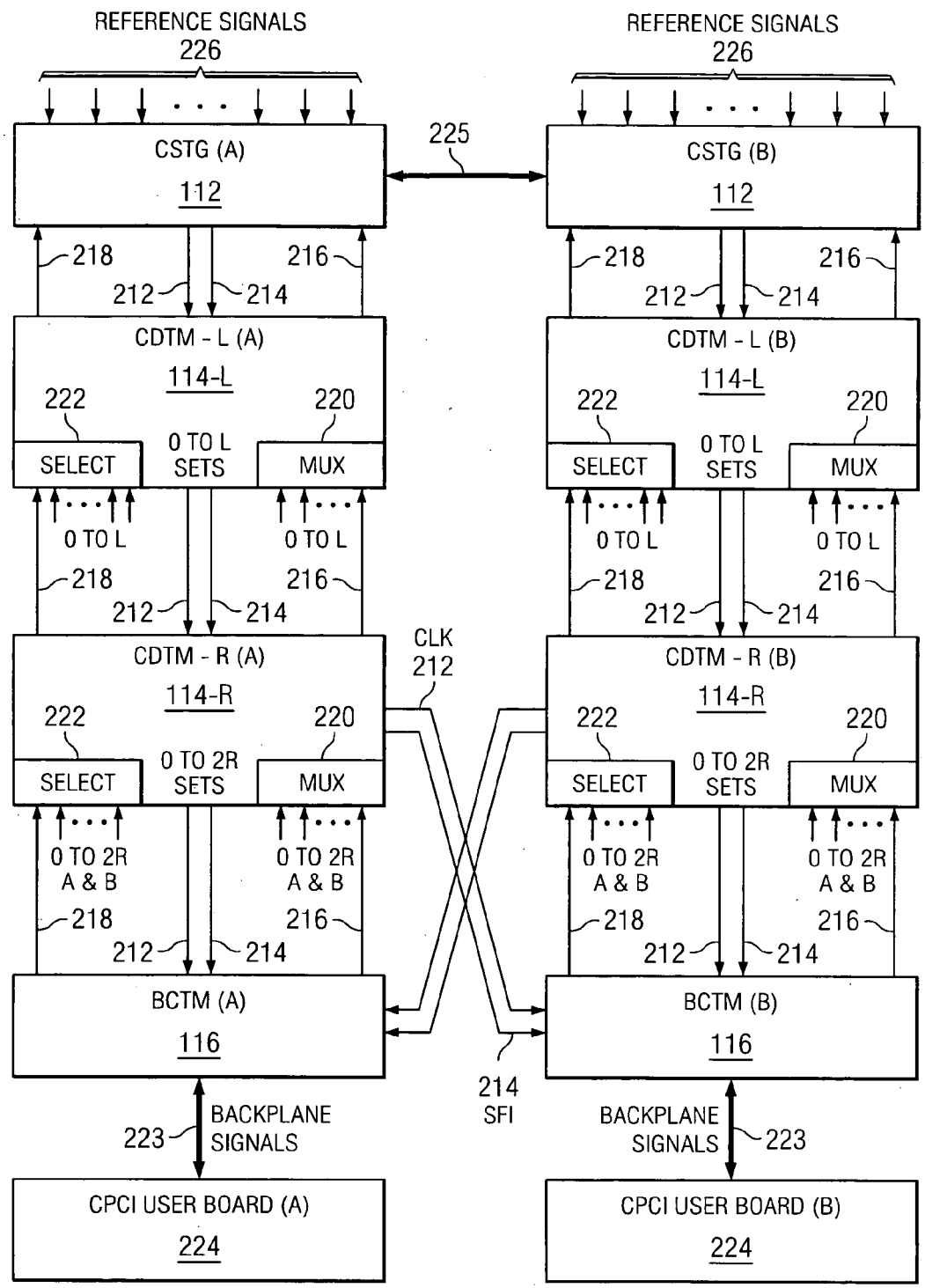
Figure 12C:
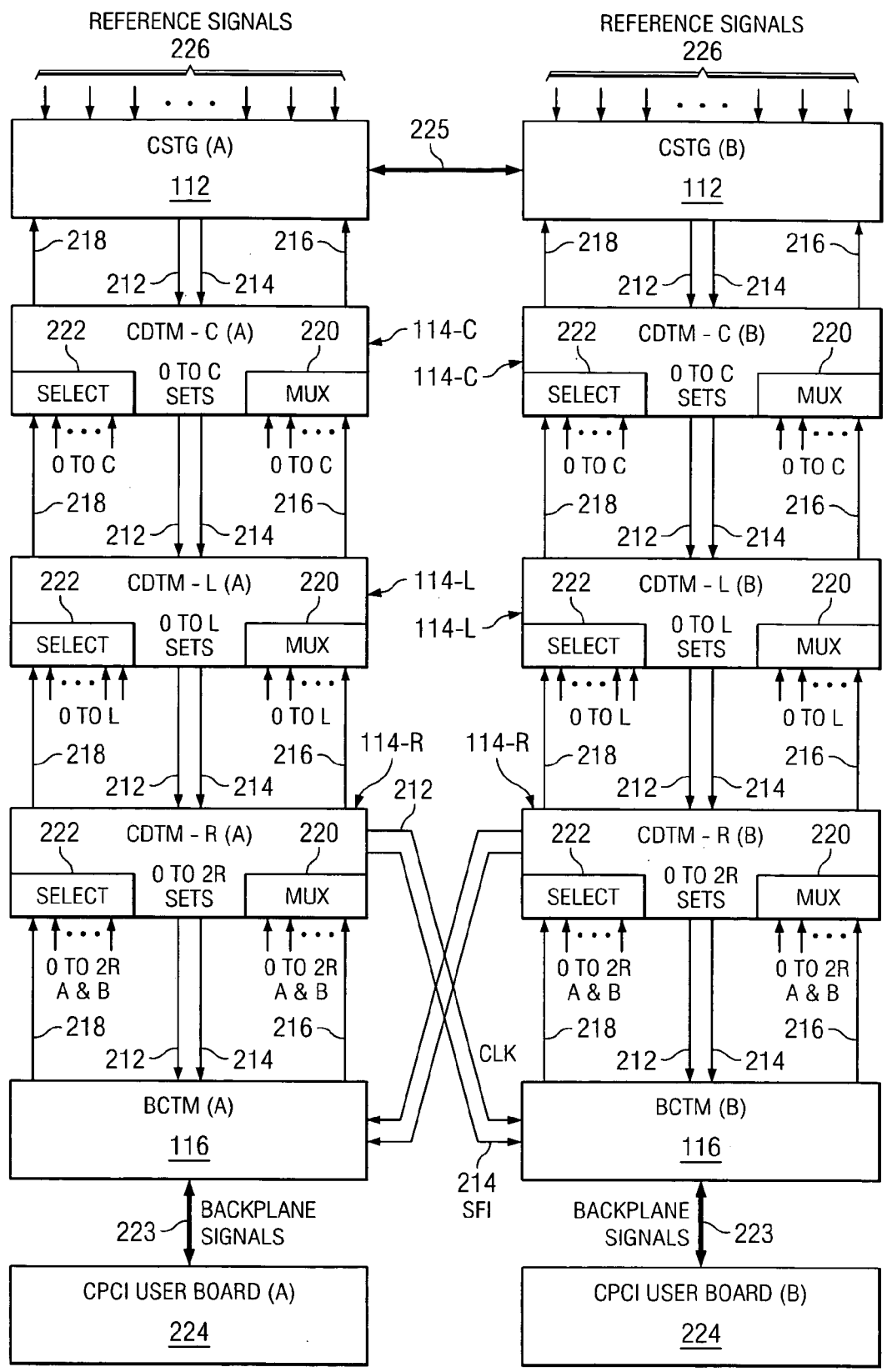

FIGS. 12A–12C depict another view of the three signal cascading schemes described above, particularly exemplifying the signal multiplexing and selecting aspects thereof. Those skilled in the art should readily appreciate that the views depicted in these FIGS. are essentially similar to the views provided in FIGS. 11A–11C and, accordingly, only the salient features thereof are set forth in detail herein.

FIG. 12A corresponds to the single rack situation wherein one pair of CDTM-R cards 114-R are used. Reference input signals 226 are provided to the CSTG pair 112 which communicate with each other via a mate signal path 225. This pair of CSTG cards is preferably configured to operate in a master-slave mode in order to minimize the skew between the corresponding timing signals generated by each card. The outbound signals, SFI 214 and the system clock signal 212, are cascaded via the CDTM-R cards 114-R to the BCTMs 116 which control the PBAs or CPCI user boards 224 in their respective half shelves through the backplane signals 223. Each CDTM-R card 114-R comprises a multiplexer 220 for muxing the R pairs (wherein R=1 to 8) of the EAS signals received from the BCTMs 116. Similarly, the CDTM-R card 114-R includes a selector 222 for selecting a particular reference clock derived from the network signal interfaces depending upon the information received via the framed SFI signal from the CSTG 112.

FIGS. 12B and 12C correspond to the other two hierarchical signal cascading schema wherein each additional level of the CDTM stage in the three-stage distribution scheme also includes appropriate multiplexers for muxing the EAS signals and selectors for selecting a particular reference clock received from the level immediately prior to it. Accordingly, the CDTM-L cards 114-L comprise a multiplexer 220 for muxing up to eight EAS signals received from the CDTM-R cards 114-R and the CDTM-C cards 114-C comprise a multiplexer 220 for muxing up to twelve EAS signals received from the CDTM-L cards 114-L. Similarly, the selectors 222 are hierarchically disposed for selecting from up to eight reference clocks from the CDTM-R cards and from up to twelve reference clocks from the CDTM-L cards.

Figure 13A:
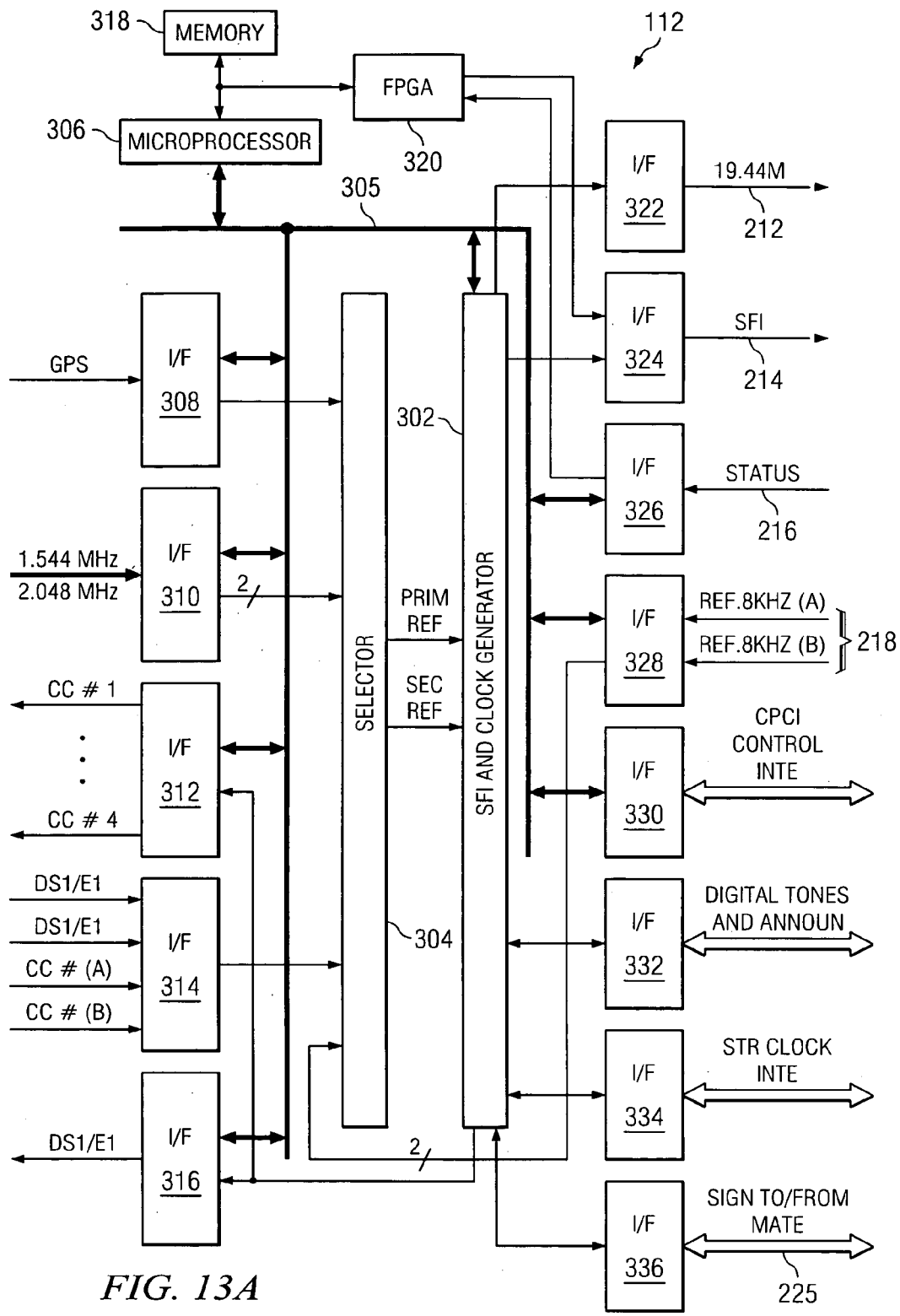
FIG. 13A depicts a functional block diagram of a system timing generator for use in the three-stage clock/alarm distribution scheme of the present invention.

Referring now to FIG. 13A, depicted therein is a functional block diagram of a presently preferred exemplary STG (e.g., CSTG 112) for use in the three-stage clock/alarm distribution system of the present invention. The following are provided as inputs to the CSTG 112:

a reference pair (A and B) of DS1/E1 signals via interface 314;

a reference pair (A and B) of Composite Clock (CC) from a Building Integrated Timing Source (BITS) via interface 314;

up to four 1.544 MHz/2.048 MHz signals via interface 310;

a reference pair (A and B) of 8 KHz signals 218 derived from the network interface signals via interface 328;

a GPS-provided synchronization and Time of Day (TOD) via GPS interface port 308;

framed EAS signal (as a Time-Division Multiplexed serial bitstream) 216 via interface 326 for the entire clock/alarm distribution system of the signaling server; and Time Stamp, EAS marker, clock signals from its mate CSTG (of the master/slave pair) via interface 225.

The CSTG 112 provides the following as outputs:

one system clock 212, preferably at 19.44 MHz, generated from the SFI/clock generator block 302 which is described in more detail hereinbelow with respect to FIG. 13B;

framed SFI signal (preferably at 19.44 Mbps) via interface 214 which includes embedded therein the positioning of Time Stamp, Fast Time Stamp, the position of EAS signal, Superframe, and other messages;

four CC signals via interface 312 which are locked on the system clock;

control interface 330 for coupling with the CPCI bus;

Stratum clock interface 334 for coupling with an external clock reference of a particular Stratum stability; and a DS1/E1 signal via interface 316 which is locked on a derived reference clock or a Stratum clock used in the SFI/clock generator block 302.

A bus 305 is included for interconnecting the various interfaces and the SFI/clock generator block 302. A selector 304 is provided for selecting any of the external or internal reference clocks to be supplied as primary or secondary inputs to the SFI/clock generator block 302. A microprocessor 306, memory 318 and a Field-Programmable Gate Array (FPGA) 320 are provided for processing the information received in the framed EAS signal 216 and appropriately encoding particular blocks of the SFI signal 214 in response thereto. For instance, a state machine executed in the FPGA 320 evaluates known bit parity schemes (e.g., Bit Interleaved Parity or BIP) for the incoming EAS signal frames and asserts appropriate bits in the SFI fields if an error is detected. The positioning of the asserted bits is preferably encoded based on the level of the CDTMs and whether the A-side BCTM or B-side BCTM is responsible for the frame error. The SFI frame is also preferably encoded with a reset signal, PBA power up and power down signals, 8 KHz reference clock selection, A or B redundancy plane selection for each distribution card in the multi-stage distribution chain, Synchronization Status Messages (SSM), and alarm control information.

Figure 13B:
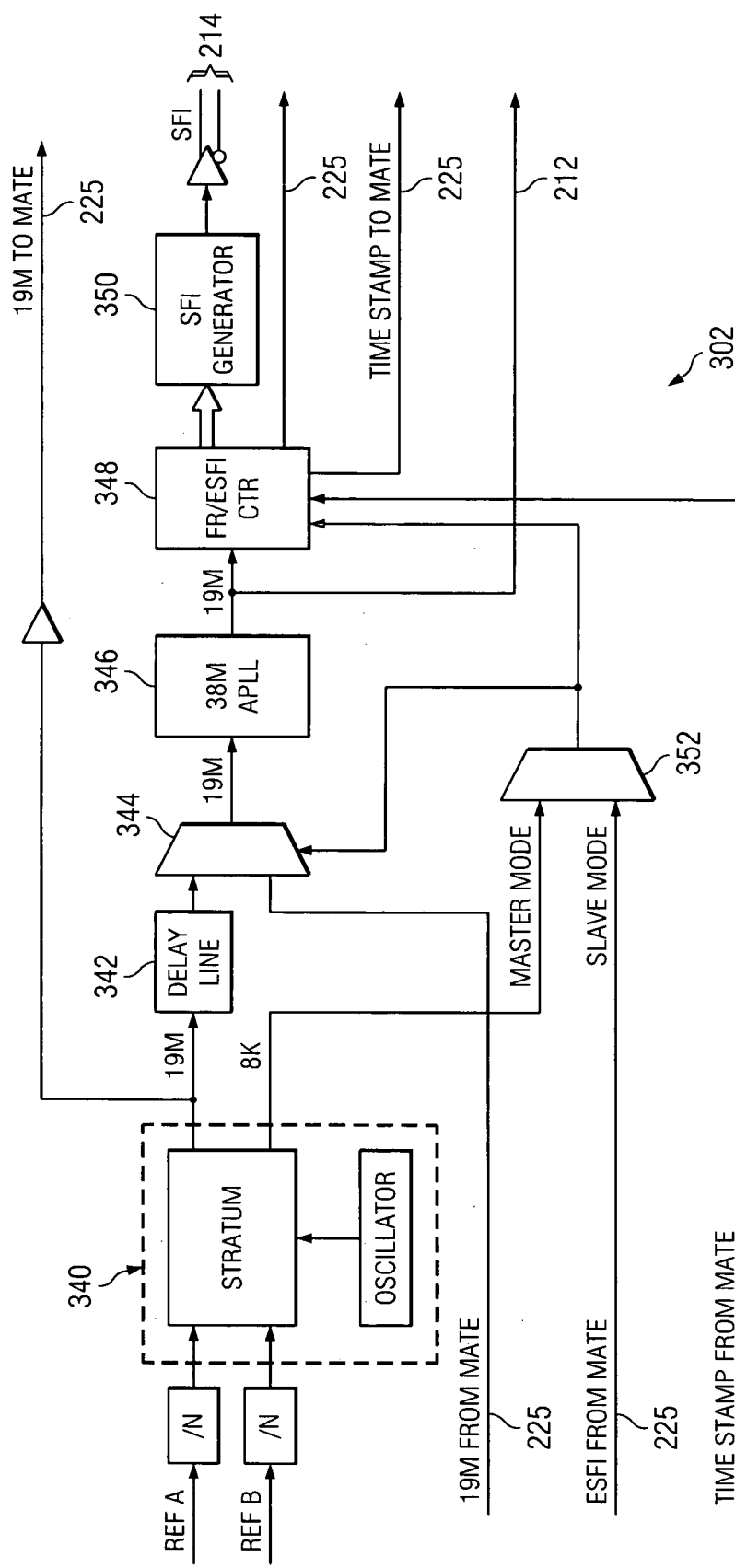
FIG. 13B depicts a functional block diagram of a Super Frame Indicator (SFI) and clock generator used in the system timing generator.

FIG. 13B depicts a functional block diagram of the SFI/clock generator 302 used in the CSTG 122. Using the primary and secondary reference inputs supplied from the selector 304 (shown in FIG. 13A), a clock source 340 (with a predetermined Stratum stability) generates 19.44 MHz and 8 KHz signals. A copy of the 19.44 MHz signal is provided to the mate CSTG as part of the mate signal 225. After a delay line 342 to minimize skew between the CSTGs, the native 19.44 MHz signal is provided to a multiplexer 344. A 19.44 MHz signal from the mate CSTG is also provided to the multiplexer 344 which selects either clock input based on the master/slave selector 352. The selected clock is then provided to an analog PLL (APLL) 346 to generate a phase-locked 19.44 MHz signal which is supplied as the system clock signal 212 to CDTMs of the multi-stage distribution system. Further, a copy of the phase-locked 19.44 MHz signal is provided as an input to a Frame/Extended Superframe Indicator counter 348 for counting the frames used in the SFI and EAS signal protocols. The counter 348 also receives the master/slave selector signal from 352 and a Time Stamp from the mate as mate signal 225. The output from the counter 348 is provided to the SFI generator 350 which produces the framed signal 214 in accordance with the SFI signal protocol set forth below. The counter output is also provided to the mate as part of the mate signal(s) 225.

Figure 14:
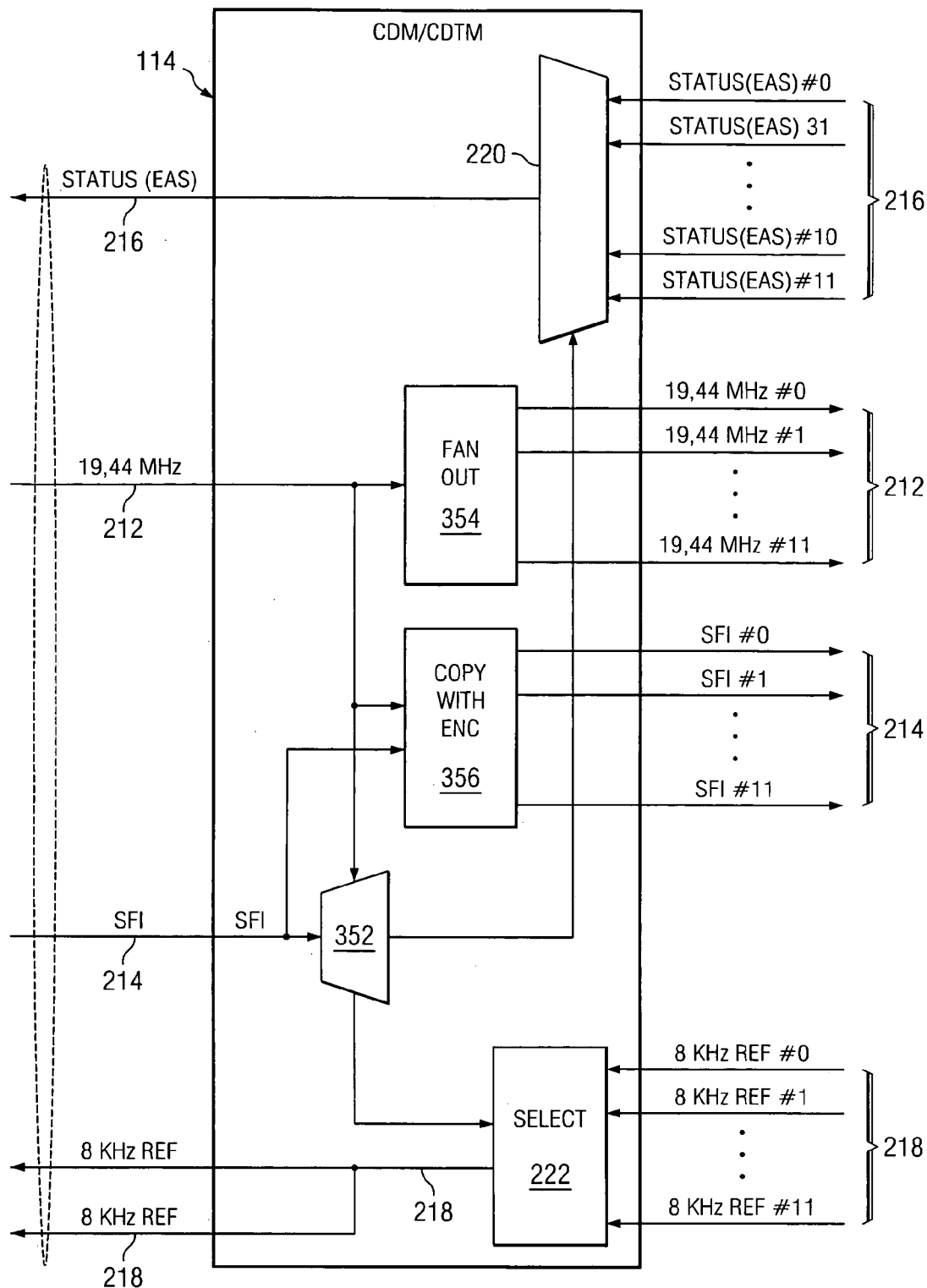
FIG. 14 depicts a functional block diagram of the clock distribution module of the three-stage clock/alarm distribution scheme of the present invention.

Referring now to FIG. 14, a simplified functional block diagram of an exemplary CDM (e.g., CDTM 114) of the multi-stage clock/alarm distribution scheme of the present invention. Up to twelve ports are supported by the CDTM functionality, depending upon the level of the CDTM in the signal cascading chain. Of the twelve ports, the lowest rack-level CDTM uses eight ports to drive the BCTM modules in the sub-racks and one of the remaining four ports is used for connecting to a system alarm card.

The inbound SFI signal 214 is provided to a de-multiplexer module 352 whose output is provided to an encoding block 356 which copies the SFI signal for the output ports and inserts appropriate port ID information therein so as to uniquely identify the next level card in the distribution chain. Similarly, the inbound clock signal 212 is provided to a fan-out block 354 for driving twelve system clock signals to the output ports.

The outbound Status signals 216 received from the lower level CDTM or BCTM cards are multiplexed by the multiplexer 220 utilizing a TDM serial line wherein the current CDTM's own Status/alarm information is inserted for upstream transmission. In addition, selector 222 selects one of the 8 KHz reference clocks based on the information obtained from the de-multiplexed SFI bitstream. It should be appreciated that the framed SFI signal cascading through the multi-stage distribution chain controls such items as port ID, alarms, selection of reference clocks and Status, among others. As will be seen hereinbelow, the bitstream integrity of the SFI signal is preferably guaranteed through bit parity and two-bit violation checking.

The overall functionality of the CDTM 114 may be succinctly captured as set forth in the following:

upon receiving the SFI signal from an upstream source (i.e., a higher level CDTM or the CSTG), it checks the SFI bitstream integrity and updates the outbound EAS signal accordingly;

performs the alignment between the SFI and system clock if needed;

automatically detects its status (Level ID) in the distribution hierarchy and sets lower Level IDs as will be described hereinbelow;

receives an individual 8 KHz reference clock and Status signal for each of up to twelve ports;

extracts configuration parameters from the SFI signal to control its own operation;

checks for Loss of Signal (LOS) on the inputs for the 19.44 MHz clock 212 and the SFI signal 214 and, if LOS is detected, the CDTM drives the Status (i.e., EAS) and the ports high;

receives EAS signals from up to twelve sources, and detects and updates hierarchical Level ID information as will be described below;

checks EAS input for misalignment and, if detected, disables the appropriate shelf ID of the particular SFI output port;

if Loss of Alignment (LOA), Loss of Clock (LOC), or LOS are detected, updates the CDTM's Status field;

activates all alarms upon receiving the Forced Alarm bit in the SFI signal;

updates CDTM fields as required, calculates BIP and transmits aligned Status;

interfaces with System Alarm Assembly (SAA) card to provide control of audible as well as visual alarms;

performs the reference clock selection based on the code received in the SFI and if one of the reference clock inputs is selected and that clock is lost (LOC), it reports back to the CSTG on the Status line; and generates two copies of selected 8 KHz references for the A-side and B-side CSTG pair at the highest level in the hierarchy.

As may now be appreciated by those skilled in the art, the functionality of the CDTM 144 is preferably entirely controlled by the serial SFI bitstream which is decoded by the block 352. An FPGA may preferably be provided for operating a CDTM state machine to accomplish various SFI-dependent functions such as:

decoding the inbound SFI bitstream;

defining the individual IDs for the outbound SFI ports;

at the appropriate time, transmitting TDM data from the incoming Status serial bitstream port as well as the current condition of the CDTM and errors, if any;

verifying the integrity of the system by checking the data for two-bit violations, BIP-4 and BIP-8, LOA, LOC, and LOS errors; and determining CDTM Level in the multi-stage distribution chain.

Figure 15:
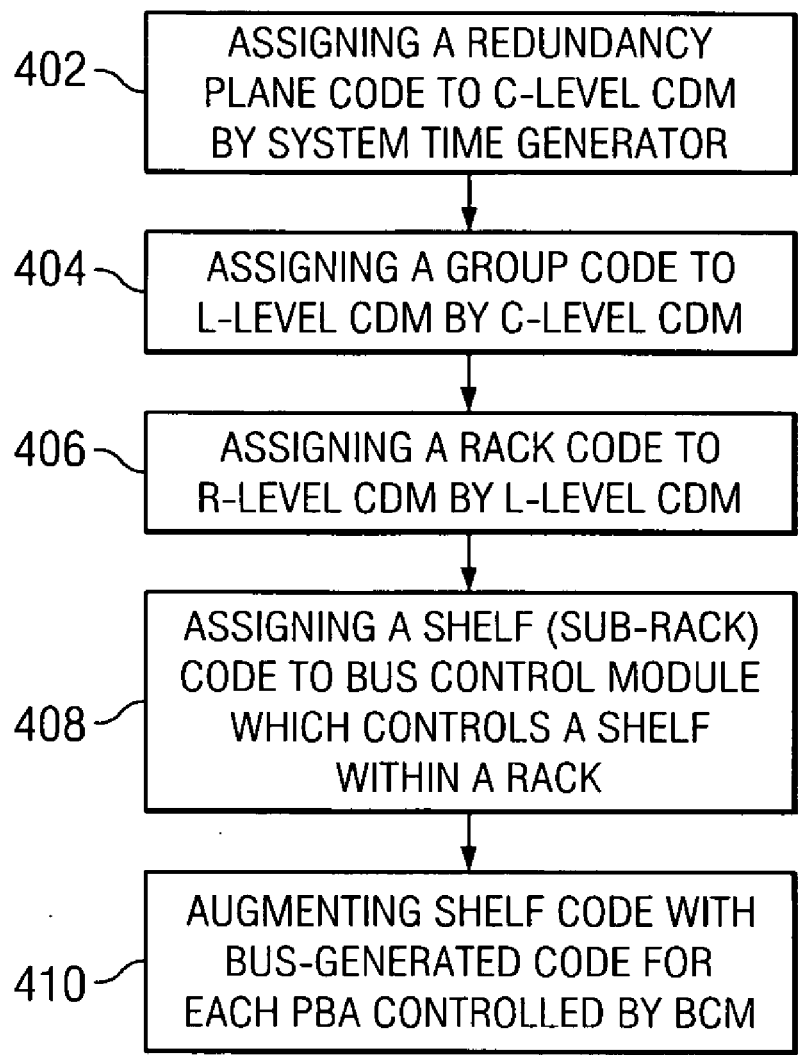
FIG. 15 is a flow chart of the steps involved in a shelf identification encoding scheme for identifying shelves (subracks) and Printed Board Assemblies (PBAs) therein.

Referring now to FIG. 15, a flow chart of the steps involved in a shelf ID encoding scheme for assigning a unique ID code to each shelve in accordance with the teachings of the present invention. Preferably, the shelf ID encoding scheme of the present invention does not involve the hardwired strapping solutions found in the state-of-the-art.

The CSTG uses a selected field in the SFI signal to first assign a redundancy Plane (i.e., A-side or B-side) code to the C-Level CDTM (i.e., CDTM-C 114-C) (step 402). Upon receiving and decoding the SFI data, the CDTM-C assigns unique Group codes to the L-Level CDTMs (CDTM-L 114-L) by writing appropriate binary numbers into its SFI output ports (step 404) each of which is connected to a corresponding CDTM-L. Each binary number preferably represents the position assigned to the corresponding port and, accordingly, the position of the CDTM-L coupled thereto. Thereafter, upon receiving and decoding their respective SFI signals, the L-Level CDTMs write a unique Rack code into each of the SFI output ports. Accordingly, each R-Level CDTM (CDTM-R) coupled to the CDTM-L is assigned a code within the Group code associated with the CDTM-L (step 406). Subsequently, the CDTM-R writes a unique Shelf code into each of its SFI output ports so as to uniquely identify the individual shelves and BCTMs associated therewith within a particular rack (step 408). A BCTM's code accordingly comprises a concatenation of the binary number codes assigned by the various CDTMs along the distribution chain. To further uniquely identify each PBA within the shelf, codes generated by the CPCI bus segment for the PBAs during their initialization are concatenated to the unique code assigned to the BCTM controlling that particular backplane.

Figure 16:
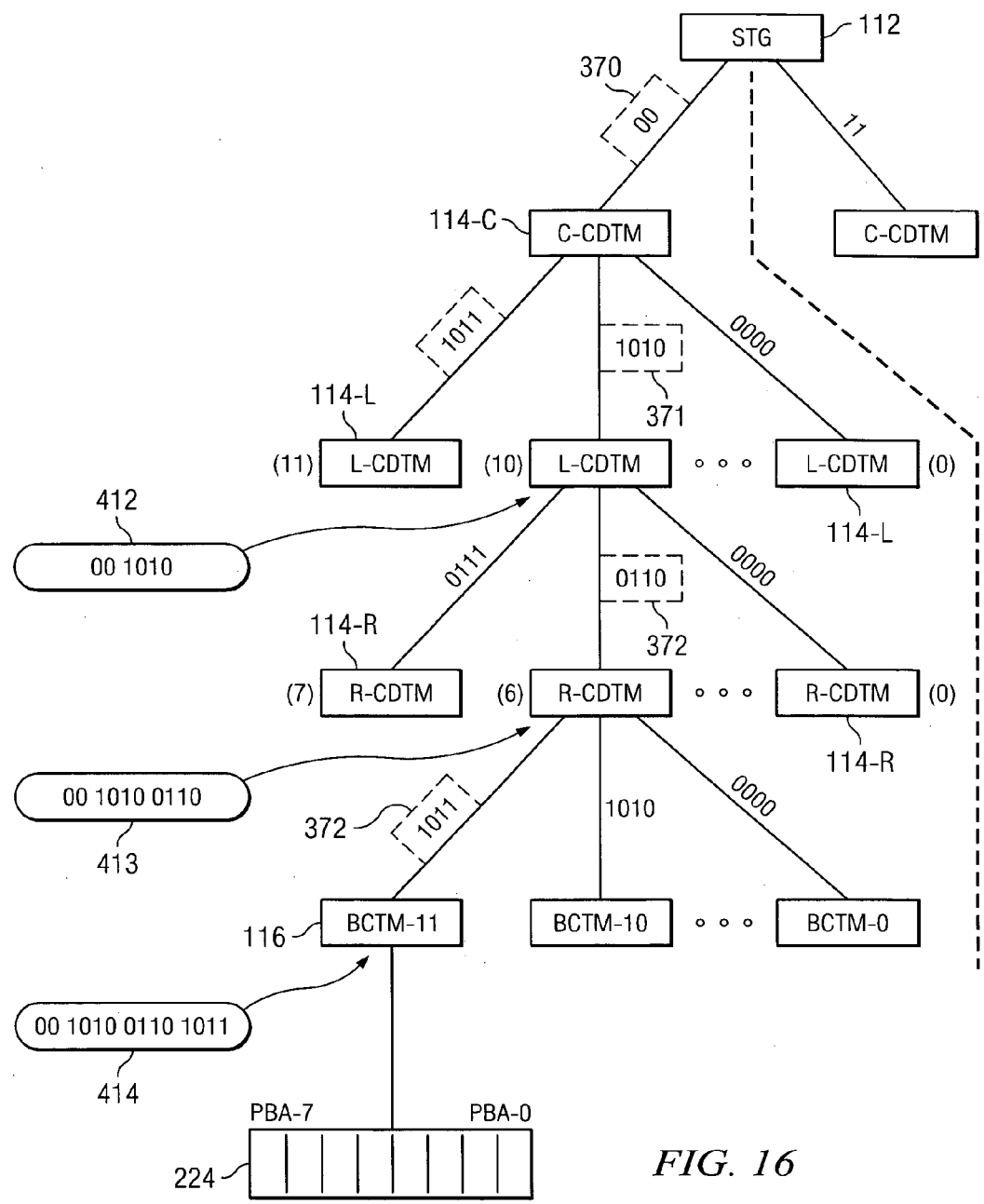
FIG. 16 is a tree diagram illustrating an exemplary shelf identification encoding scenario.

FIG. 16 depicts a tree diagram illustrating an exemplary shelf ID encoding scenario provided in accordance with the foregoing. By writing a Plane code 370 comprising two bits, the STG assigns a particular redundancy plane (A-side or B-side). Accordingly, the unique code for the CDTM-C 114-C also comprises the selected Plane code, i.e., 00, in this example. The CDTM-C 114-C thereafter assigns four-bit Group codes 0000 to 1011 to the twelve ports and, accordingly, the binary code 412 for the exemplary CDTM-L code is 001010, corresponding to the 11$^{th}$ CDTM-L coupled to the CDTM-C and having the Group code 371.

The Rack codes are then assigned as set forth above to the individual racks in the Groups. By writing the four-bit Rack code 372, corresponding to the 7$^{th}$ rack in the 11$^{th}$ Group, the binary code for the exemplary CDTM-R 114-R is obtained as: 00 1010 0110. Further, the four-bit Shelf code 372 of 1011 identifies the twelfth output port of the exemplary R-CDTM. Although in a presently preferred exemplary embodiment, only ports 0–7 are used for coupling with the BCTMs, this shelf ID encoding example assumes that a BCTM is present at port 11 and, accordingly, the binary code 414 therefor is obtained as: 00 1010 0110 1011. Each shelf, accordingly, has a unique code assigned within the signaling server system with a 12-bit code per Plane. A PBA code generated by the CPCI bus system may thereafter be further concatenated to the BCTM code so as to uniquely identify the individual boards, e.g., PBA-0 224, within the shelf.

Figure 17A:
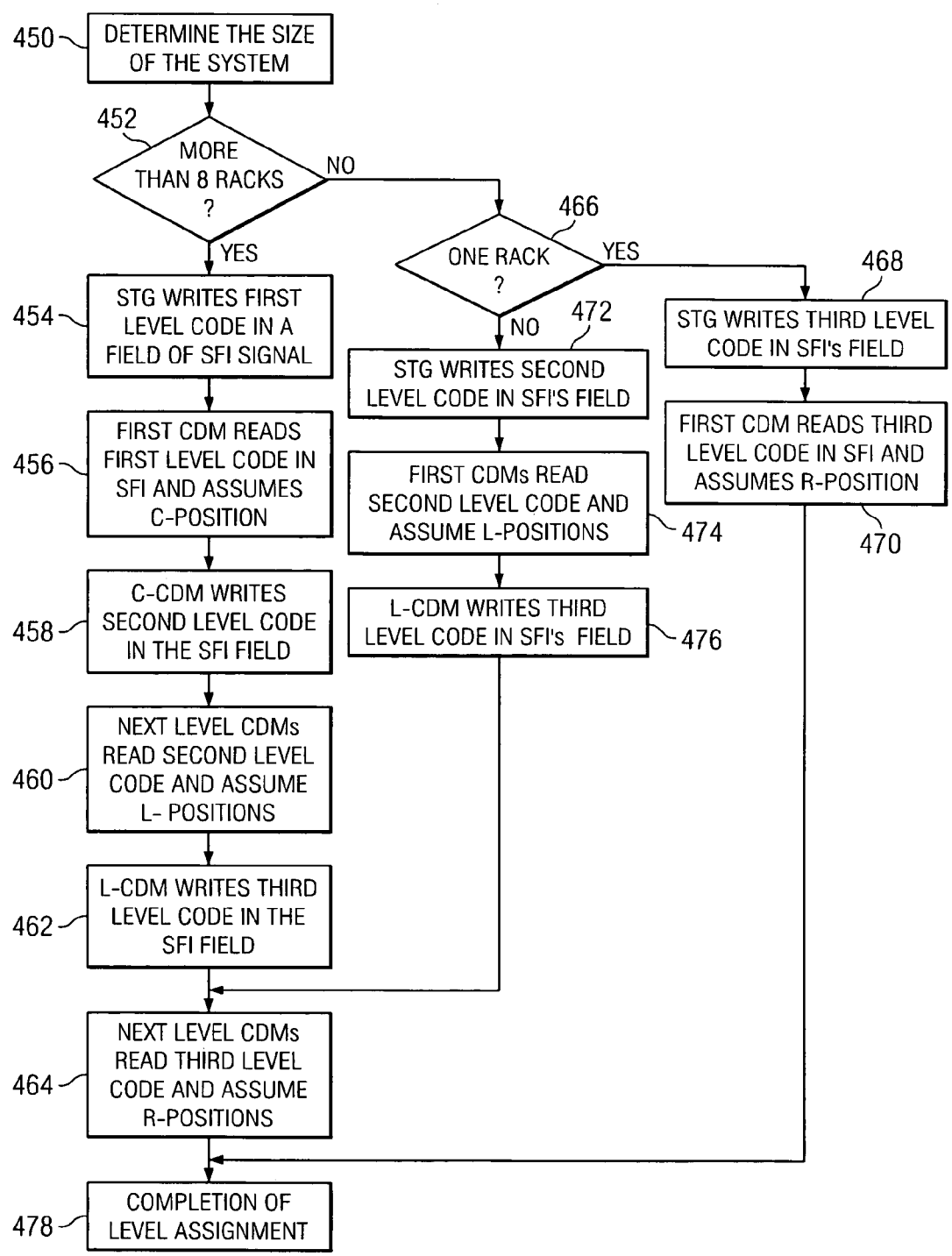
FIG. 17A is a flow chart of an exemplary embodiment of a method for assigning levels in an multi-level distribution scheme based on the number of the signaling server racks.

FIG. 17A is flow chart of an exemplary embodiment of a method for automatically assigning levels to the CDTMs in the multi-level clock/alarm distribution scheme based upon the scalable size of a signaling server in accordance with the teachings of the present invention.

After determining the size of the system (i.e., the number of racks), the CSTG uses a particular field in the SFI signal to encode the size (step 450). First, a determination is made if the system comprises more than eight racks (decision block 452) and, if so, the CSTG writes a first level or C-Level code into the assigned field in the SFI bitstream (step 454). The first CDTM card connected to the CSTG's SFI port reads the C-Level code in the appropriate field and assumes the C-Level position (step 456). Subsequently, it writes a second level or L-Level code into the same field and appropriately provides the encoded SFI signals to its SFI output ports (step 458). The CDTMs connected to these SFI ports read the SFI field by decoding the serial bitstream and assume the L-Level positions (step 460). Thereafter, the L-Level CDTMs write over the assigned field in the SFI signal a third-level or R-Level code (step 462), whereby the next level CDTMs assume the R-Level positions upon decoding the SFI data (step 464). The flow control of the level assignment method is appropriately terminated thereafter (step 478).

If the system does not comprise more than eight racks as determined by the decision block 452, a further determination is made if the system comprises only a single rack (decision block 466). If so, the CSTG writes the R-Level code in the appropriate SFI field (step 468) such that the CDTMs connected to the CSTG's SFI ports assume the R-Level position (step 470). The process flow thereafter is suitably terminated (step 478).

On the other hand, if the system includes between two and eight racks, the CSTG writes the L-Level code in the SFI field (step 472). The CDTMs coupled to the CSTG assume the L-Level position upon decoding the SFI bitstream (step 474) and write the R-Level code in the SFI field (step 476). Thereafter, the CDTMs coupled to the L-CDTMs decode the SFI field and assume the R-Level position (step 464). The level assignment is thereafter completed (step 478).

In the exemplary level assignment embodiment set forth above, the codes for levels are generated by the CSTG and the process is cascaded downstream through the hierarchical levels of the distribution chain. In a presently preferred exemplary embodiment, these level codes are encoded into a four-bit field and comprise the following:

0000 for systems with a single rack;

0011 for systems up to eight racks; and 1100 for systems larger than eight racks.

Referring now to FIG. 17B, depicted therein is a flow chart of another exemplary embodiment of the method for assigning CDTM levels in the multi-stage distribution scheme of the present invention. In this exemplary embodiment, code generation is propagated from the BCTMs to the CSTG using the EAS signal. The BCTM writes a select code in a particular field of a select frame of the framed EAS signal (step 502). Each CDTM connected to the BCTMs, i.e., lowest level CDTMs, reads this field in the EAS signal and if the majority of EAS signals corresponding to the installed ports have the same select code, the CDTMs write a second select code into that position of the following EAS frame (step 504). The higher level CDTMs reads the same field of the EAS frames emanating from the lower CDTMs and if the majority of the frames corresponding the lower CDTMs have the same code, the higher level CDTMs write a third select code into that position of the following EAS frame (step 506) and transmit the signal upstream to the next higher level of CDTMs. The highest level CDTMs read the appropriate field in the EAS frames corresponding to the installed ports and if the majority have the same code, a third select code written into the same field of the next EAS frame (step 508).

In accordance with the teachings of the present invention, each CDTM card assumes the appropriate level if the level code is repeated three times consecutively (step 510). When the CSTG reads the level field in the EAS frame from the CDTMs connected to it, it decodes the field to determine the size of the system accordingly. In this exemplary embodiment, the following level field codes are utilized:

0101 when only R-Level CDTMs are installed;
1100 when both L-Level and R-Level CDTMs are installed; and
1111 when C-Level, L-Level, and R-Level CDTMs are installed.

In a presently preferred exemplary embodiment, if a CDTM detects a tie in the codes received at the EAS input ports (i.e., half of the ports have one valid code and the remaining half have another valid code), the CDTM may not change the level field of the incoming EAS frames. Furthermore, if some of the installed ports present another code than the one adopted by the CDTM, an LOA is preferably inserted into the appropriate field of the EAS corresponding to that port.

It should now be apparent to those skilled in the art that the present invention advantageously automatically determines based on the size of the signaling server the levels of the CDTM modules present in the multi-stage distribution scheme set forth hereinabove. Further, the level assignment process of the present invention yields a nested hierarchy of the CDTMs whose "dimension" (i.e., single-level, double-level, or triple-level) is also accordingly dependent on the signaling server's scalable size.

Construction of the multiplexed EAS signal used for the alarm collection process in a multi-stage distribution system having a nested CDTM hierarchy may now be provided as set forth below.

An EAS signal is defined with 768 frames (described in greater detail with reference to FIGS. 20A–20U hereinbelow), wherein 8 frames are assigned for each rack in the system (i.e., one frame per sub-rack). The EAS (Status) signal, generated by the BCTM and CDTM cards in the multi-stage distribution system, is operated at a rate equal to 19.44 MHz/20 so that the requirement for the maximum loop delay in the multi-stage distribution system can be met (this is so because there is no transmitted clock associated with the Status line as alluded to in the foregoing). The clock on each board is derived from the outbound 19.44 MHz and is synchronized at the beginning of each frame. If the Status signals undergo a delay of some deterministic number of cycles, each card in the system is preferably provided with the capability to adjust the frame synchronization phase, depending on its Level in the hierarchical distribution.

Preferably half of the available field is allocated for shelf A and is protected by a BIP-4 and the other half is for shelf B and protected by a BIP-4 as well. 12 Status lines are Time Division Multiplexed by the CDTMs in the lowest level (i.e., R-Level). 8 Status lines are Time Division Multiplexed by the CDTMs in the middle level (i.e., L-Level) and 12 Status lines are Time Division Multiplexed by the CDTMs in the highest level (i.e., C-Level). All unused fields in the EAS frames generated by the cards are filled with zeros in the presently preferred exemplary embodiment.

Each CDTM card in the nested hierarchy knows based its position (i.e., Level) when to open the TDM slot window for each Status input port. The CDTM generates a Status signal aligned with the EAS indicator embedded into the SFI provided by the CSTG. A phase adjustment is preferably provided because each CDTM Level introduces certain delay on the Status signal. The clock is re-synchronized at the beginning of each frame. Once the Status frame is built, the CDTM starts multiplexing 12 (or 8, as the case may be) inbound Status signals. The FPGA provided with the CDTM knows when to read the information from each input port based on the CDTM's ID. Preferably, before reading the data, the CDTM may identify if there are LOAs detected on the inbound Status signals. The fields corresponding to ports in LOA are filled with all 1's.

The R-Level CDTM ignores the field corresponding to first frame from the rack. It writes its own data into the second frame in the corresponding fields. After that it starts reading in order, from port-0 to port-11, data present in the corresponding fields.

The L-Level CDTM multiplexes 8 ports wherein each of which receives information from a rack. Based on its ID, the CDTM identifies the group (of 8 racks) from which it is assigned to take data. Each port conveys 8 frames and the CDTM writes its data into the second frame of the rack of that particular group. After that it starts multiplexing data from port-0 to port-7. Again, fields corresponding to ports in LOA condition are filled with all 1's.

The C-Level CDTM multiplexes 12 ports wherein each port receives information from a group of 8 racks. The CDTM writes its own data into the first frame of the leading rack of the leading group. It ignores the second frame and then it starts multiplexing data in order from port-0 to port-11. Fields corresponding to ports in LOA are filled with all 1's.

FIG. 18 depicts a flow chart of a presently preferred exemplary embodiment of the alarm collection and routing method of the present invention. CDTM Levels are first assigned based on the size of the system, preferably in accordance with one of the methods described hereinabove. If multiple levels are present, a nested hierarchy of the CDTMs is thus obtained (step 520). Shelves in the signaling server system are then assigned unique ID codes based on the CDTM and BCTM ID codes as per the port ID information provided in the SFI signal provided by the CSTG (step 522). Each BCTM generates a Status signal, encoding it with pertinent PBA information and alarm data (step 524). Each R-Level CDTM card receives a plurality of Status/EAS signals generated by the BCTMs (step 524) in the multi-stage distribution chain. Upon validating the EAS signals on the ports, it multiplexes the received EAS signals and its own alarm/status data into a serial TDM bitstream by opening appropriate time slots as per the ID encoding provided in the SFI (step 528). The multiplexed EAS signal is then forwarded by the R-Level CDTMs to higher levels of CDTMs, if present, in the nested hierarchy (step 530). The higher levels of CDTM cards successively multiplex the received EAS signals from the lower levels into a single EAS bitstream which is ultimately provided to the STG for appropriate action (step 532) under the control of a PLCE in the signaling server.

Figure 19A:
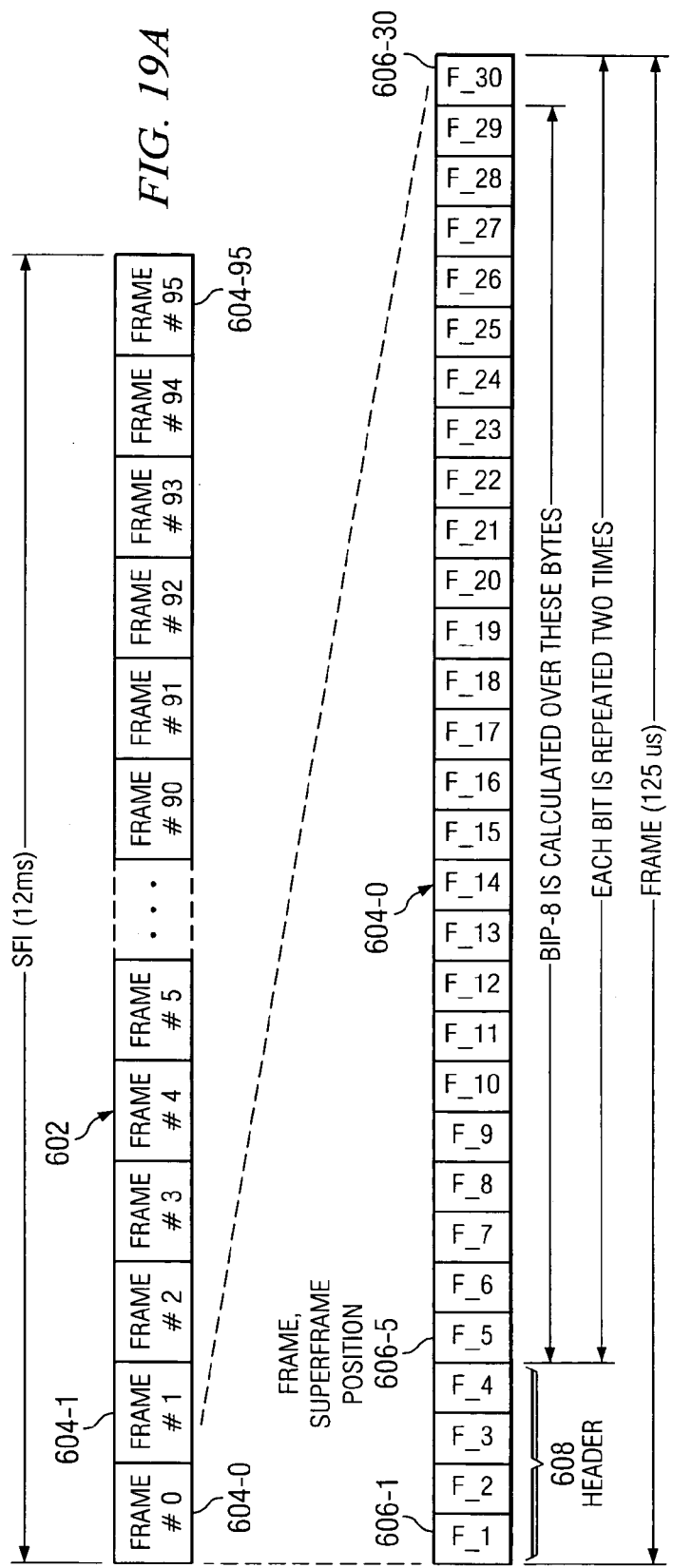

FIG. 19A depicts a presently preferred exemplary embodiment of the signal protocol used for the framed SFI signal in accordance with the teachings of the present invention. A frame format 602 comprising 96 individual frames (reference numerals 604-0 through 604-95) is exemplified for a 96-rack system wherein a frame is assigned for each rack. Each frame preferably occupies a time slot of 125 µs (thus 12 ms for the entire frame format 602) and comprises 30 fields, 606-1 through 606-30. A four-field header 608 contains a six-bit synchronization word (not shown in this FIG.). Bits in the remaining fields 606-5 through 606-30 are repeated twice so that a simple yet robust synchronizer may be designed for this frame signal. Frame, Superframe and Extended Superframe positions are also embedded in the fields of the SFI frame.

FIGS. 19B through 19M depict bit formats for the various fields forming an SFI frame such as, e.g., frame 604-0 shown in FIG. 19A. Those skilled in the art should readily recognize upon reference hereto that these bit formats are self-explanatory and, accordingly, only some the salient features relevant to the teachings of the present invention will be exemplified hereinbelow.

Figure 19B:
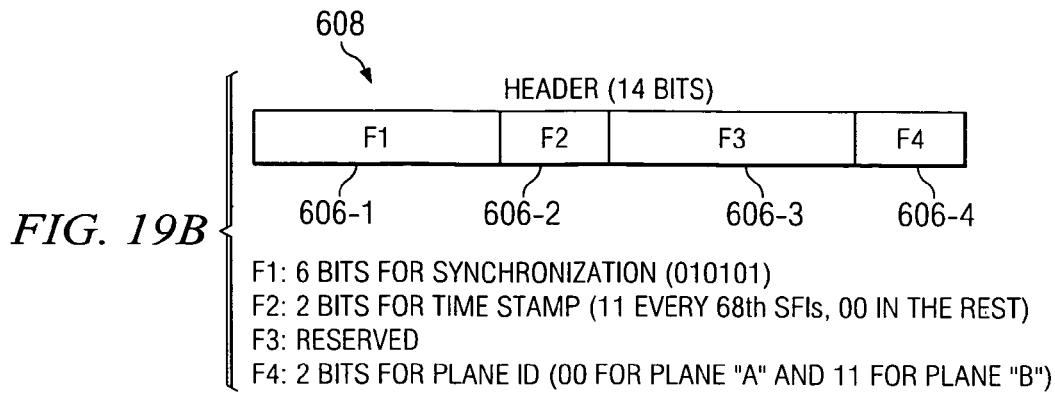
Figure 19C:
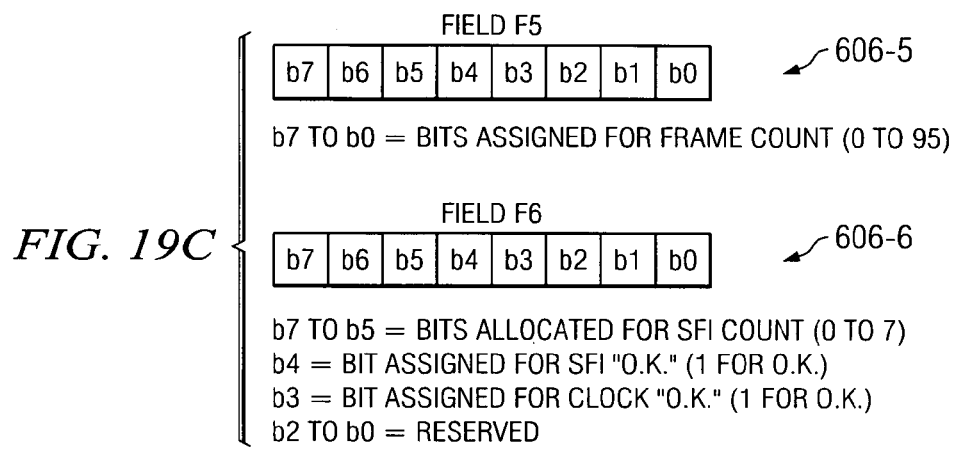
Figure 19D:
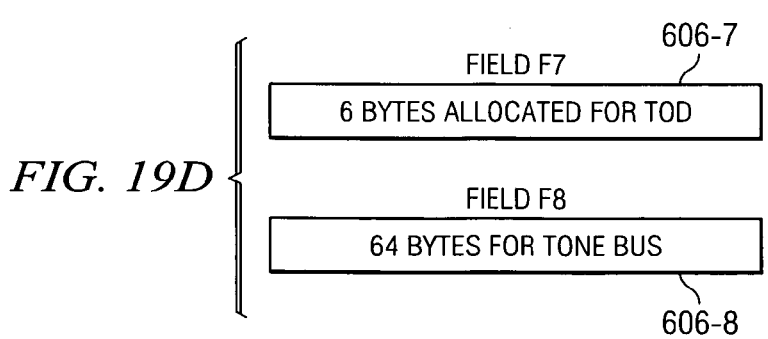
Figure 19E:
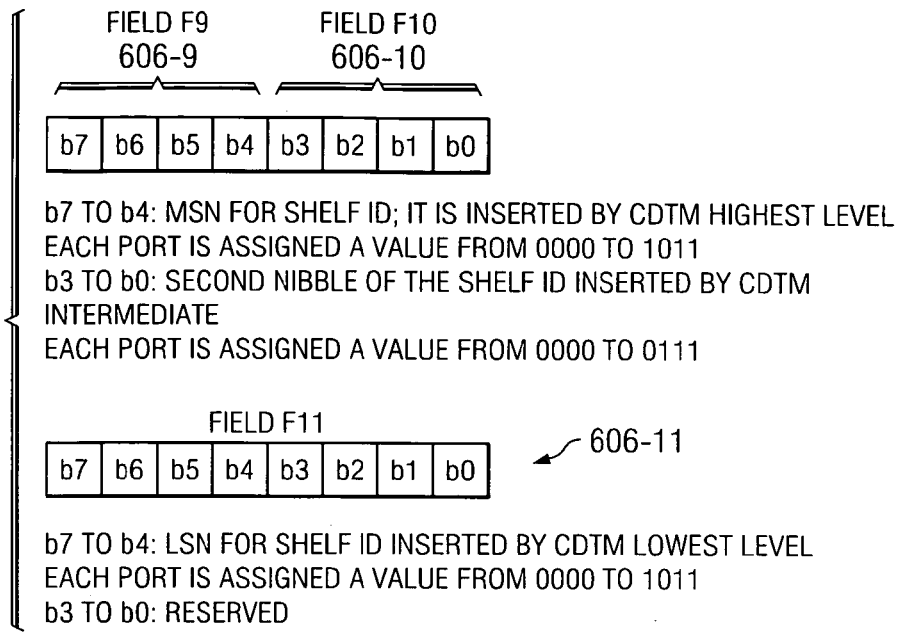
Figure 19F:
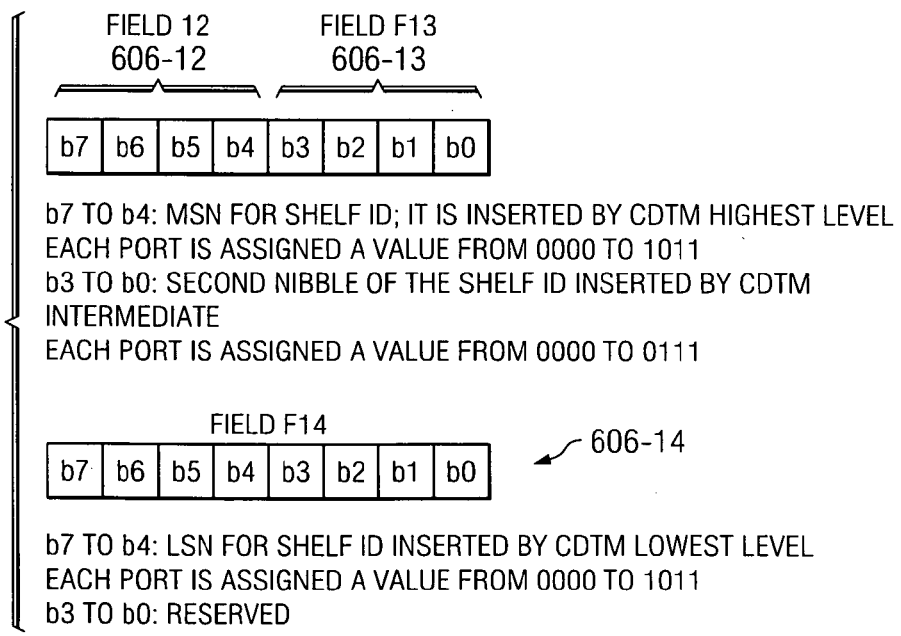

As shown in FIG. 19B, field 4 (reference numeral 606-4) comprises two bits for encoding the Plane ID discussed in the shelf ID scheme of the present invention. Frame Count and Superframe Count are provided in fields 606-5 and 606-6 shown in FIG. 19C. Field 606-7 and field 606-8 depicted in FIG. 19D comprise 6 and 64 bytes, and encode Time of Day (TOD) and digital tones/announcements, respectively. As shown in FIGS. 19E and 19F, fields 9–11 and fields 12–14 carry duplicate information regarding the shelf ID portions inserted by the multiple levels of CDTMs in accordance with the teachings of the present invention. For instance, bits 4–7 of field 606-12 comprise the most significant nibble (MSN) of the shelf ID which is inserted by the CDTM-C. Each port of the CDTM-C is assigned a value ranging from 0000 ($0_{Base10}$) to 1011 ($11_{Base10}$) Field 606-13 is formed from bits 0–3 and comprises the second nibble of the shelf ID inserted by the CDTM-L. Accordingly, each port of the CDTM-L is assigned a value ranging from 0000 ($0_{Base10}$) to 0111 ($7_{Base10}$). Field 606-14 comprises a Reserved For Future Use (RFU) portion (bits 0–3) and the least significant nibble (LSN) for the shelf ID formed from bits 4–7. This nibble is inserted by the CDTM-R wherein each port is assigned a value ranging from 0000 ($0_{Base10}$) to 1011 ($11_{Base10}$).

In FIG. 19G, field 606-15 specifies the selection of a reference clock by the CDTM-C. If bit 7 is 0, no clock is to be selected. On the other hand, if bit 7 is set to 1, one of the 12 clocks is to be selected from the ports coded in bits 3–6 wherein each port is assigned a value ranging from 0000 ($0_{Base10}$) to 1011 ($11_{Base10}$). Further, bit 2 is set in order to force the alarms.

Similarly, in FIG. 19H, field 606-16 specifies the selection of a reference clock by the CDTM-L. Again, if bit 7 is 0, no clock is to be selected. On the other hand, if bit 7 is set to 1, one of the 8 clocks is to be selected from the ports coded in bits 3–6 wherein each port is assigned a value ranging from 0000 ($0_{Base10}$) to 0111 ($7_{Base10}$) Bit 2 is used for forcing the alarms by the CDTM-L. Reference clock selection by the CDTM-R is encoded in field 606-17 as shown in FIG. 19I. Bit 7 is used again for selecting or not selecting a clock. That is, if bit 7 is set to 1, one of the 12 clocks is to be selected from the ports coded in bits 3–6 wherein each port is assigned a value ranging from 0000 ($0_{Base10}$) to 1011 ($11_{Base10}$). Bit 2 is used for forcing the alarms by the CDTM-R.

Figure 19J:
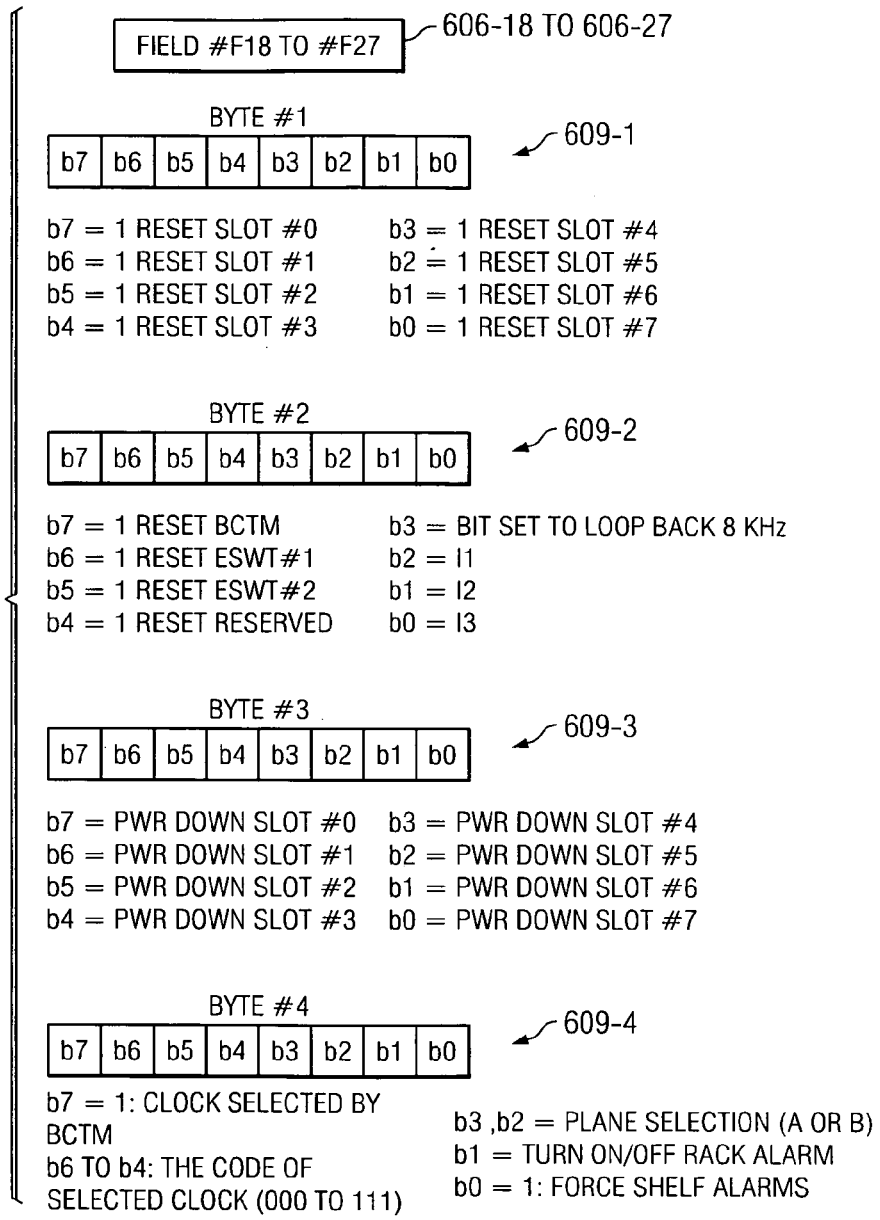
Figure 19K:
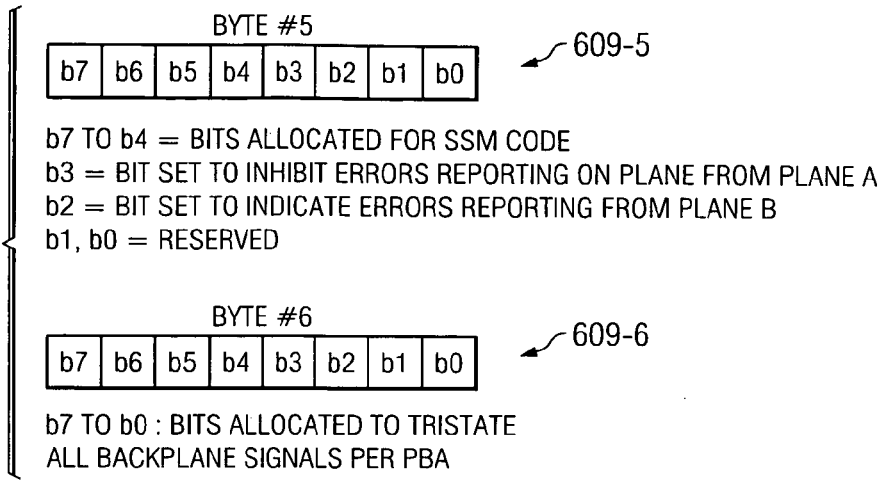

FIGS. 19J and 19K illustrate fields 606-18 through 606-27 corresponding to five pairs of shelves in the rack. Each field comprises six bytes 609-1 through 609-6, wherein individual slot resetting for the corresponding shelf pair is encoded in byte 609-1. BCTM resetting is encoded in bit 7 of byte 609-2 and slot power down is controlled by byte 609-3. Byte 609-4 governs, in part, reference clock selection by the BCTM. The code of the selected clock is provided via bits 4–6 by assigning a value ranging from 000 ($0_{Base10}$) to 111 ($7_{Base10}$). Redundancy Plane selection (i.e., A-side or B-side) is set forth in bits 2–3. Byte 609-5 includes data for SSM codes, bits to inhibit error reporting from a select Plane, etc. Also, bit 1 is used for turning ON or OFF a rack alarm and bit 0 is used for forcing shelf alarms. Byte 609-6 comprises bits allocated to tristate all backplane signals on a per PBA basis depending upon the anomalies encountered thereby.

Figure 19L:
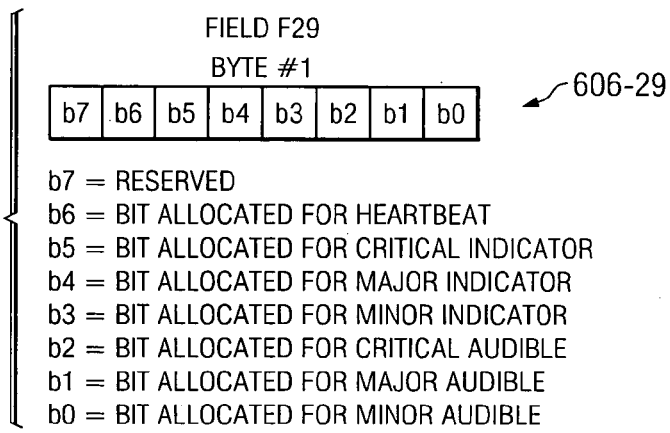
Figure 19M:
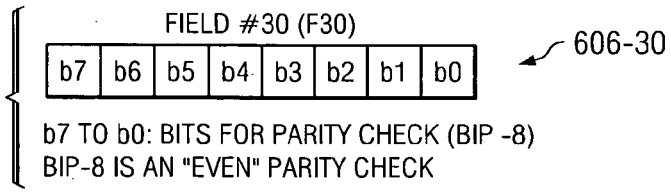

Field 28 of the frame format includes five RFU bytes in the presently preferred exemplary embodiment and thus not shown in a separate FIG. In FIG. 19L, field 606-29 comprises various system alarm card codes used by the multistage clock/alarm distribution scheme of the present invention. Finally, in FIG. 19M, field 606-30 comprises bits for a parity check using BIP-8.

Figure 20A:
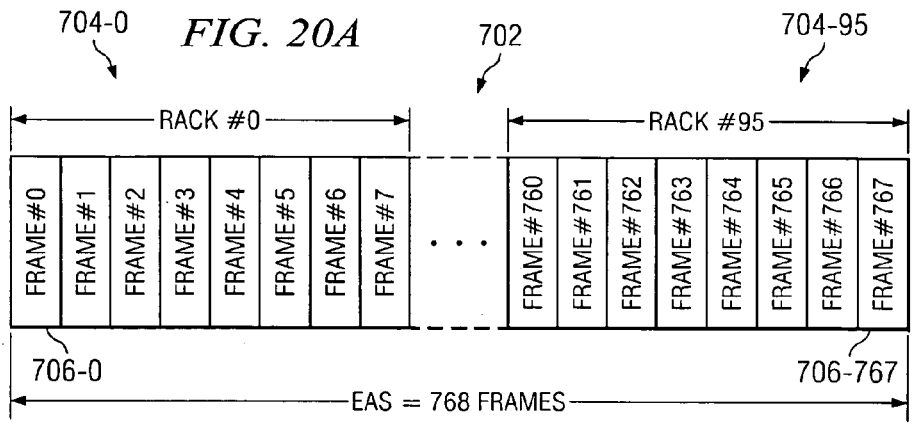
FIGS. 20A–20U depict the signal protocol of the framed Extended Alarms Signal (EAS) or status signal used in the multi-stage distribution scheme of the present invention.

Referring now to FIG. 20A, depicted therein is a presently preferred exemplary embodiment of the signal protocol used for the framed EAS signal in accordance with the teachings of the present invention. An Extend Superframe format 702 comprising 768 individual frames (reference numerals 706-0 through 706–767) is exemplified for a 96-rack system wherein eight frames are assigned for each rack. Accordingly, for example, frame format portion 704-0 corresponds to the first rack, rack-0, of the signaling server system and frame format portion 704-95 corresponds to the $96^{th}$ rack, rack-95.

Each frame preferably occupies a time slot of 125 µs and the first two frames from each frame format portion are reserved for the CDTM cards and the last six frames are allocated for the BCTM, a frame for each pair of BCTM cards.

Each BCTM card based on the shelf ID knows exactly where to write its information bits in the TDM serial bitstream. The Status signal is generated by each BCTM card with one byte header used by the CDTM cards to validate the inbound Status signals. The CDTM card multiplexes all validated Status signals present on the inbound ports and adds its own status/alarm information bits into the assigned frames of the Extended Superframe signal.

As has been pointed out hereinbefore, the Status signal preferably carries alarm information bits, PBA "Health", "Presence" and "Acknowledge" messages after the SFI signal's embedded messages are terminated and decoded. It is preferred that the rate of the Status signal is sufficient enough to possess adequate bandwidth for the data, yet not engender alignment problems due to maximum propagation delay through timing cables.

Figure 20B:
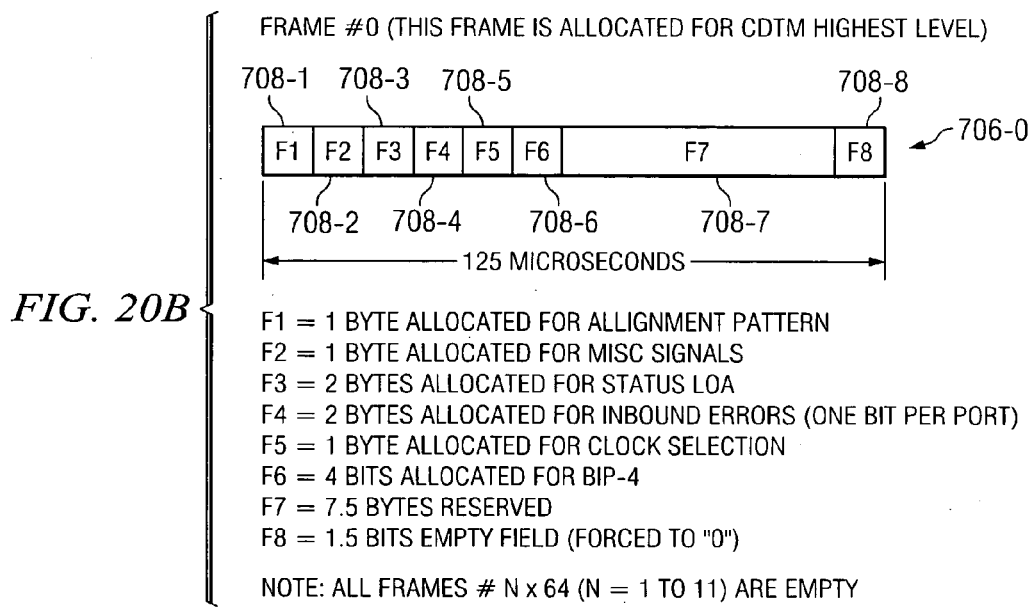
Figure 20G:
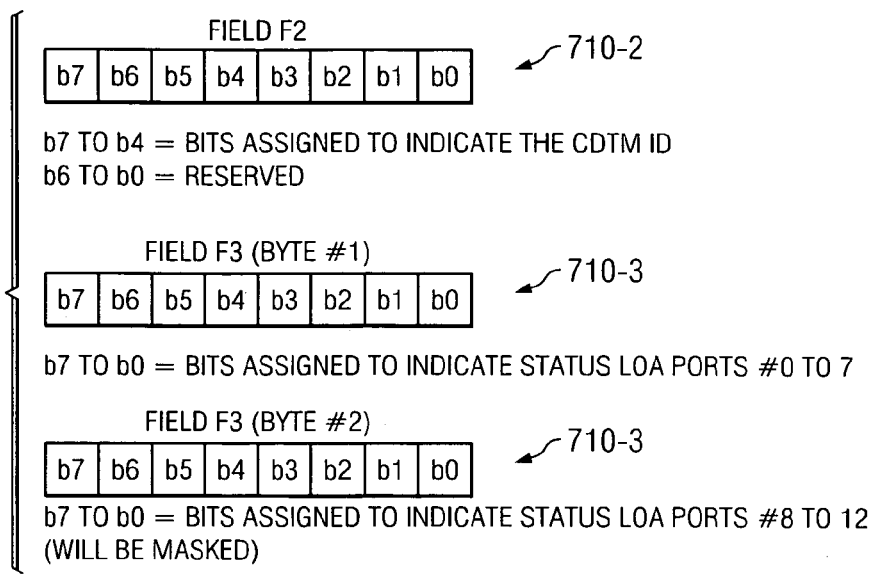
Figure 20H:
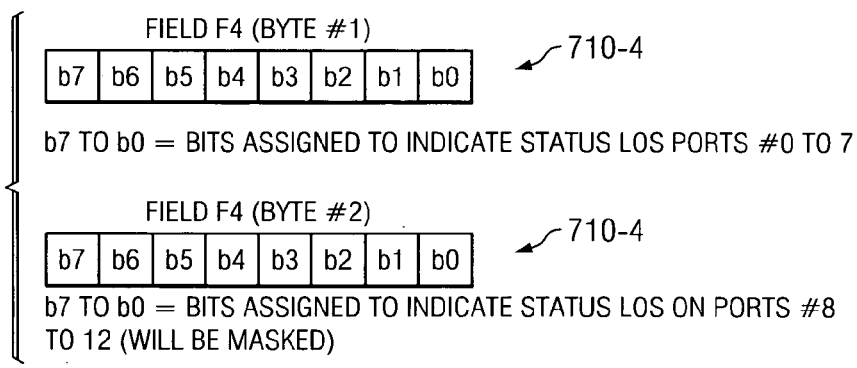
Figure 20I:
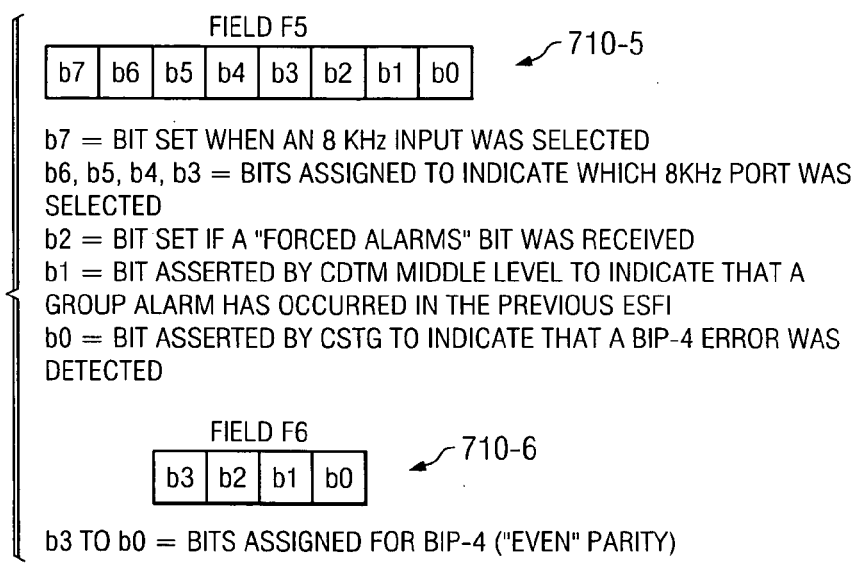
Figure 20L:
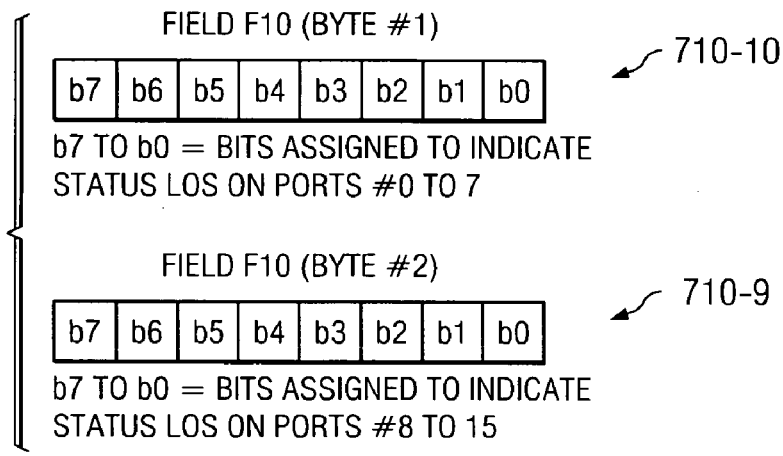
Figure 20M:
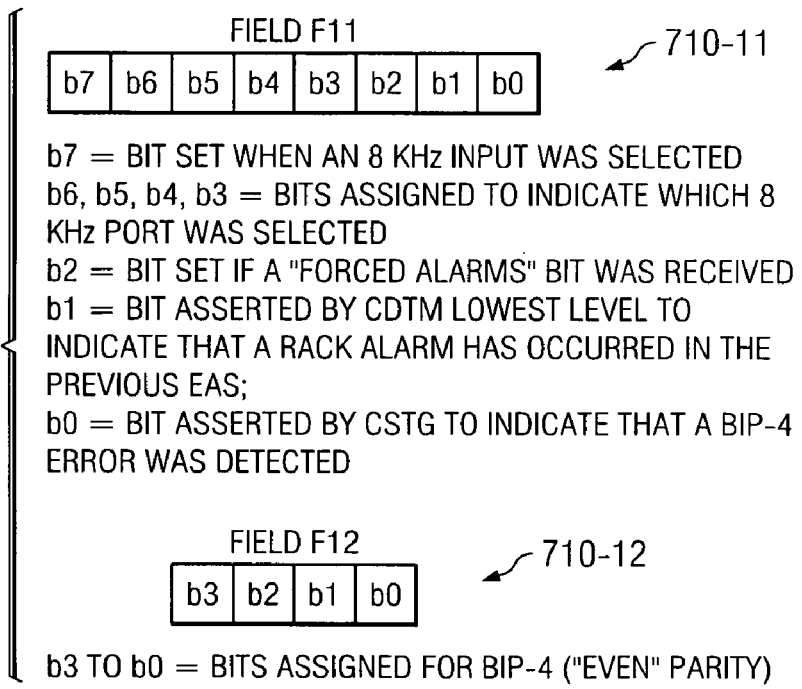
Figure 20N:
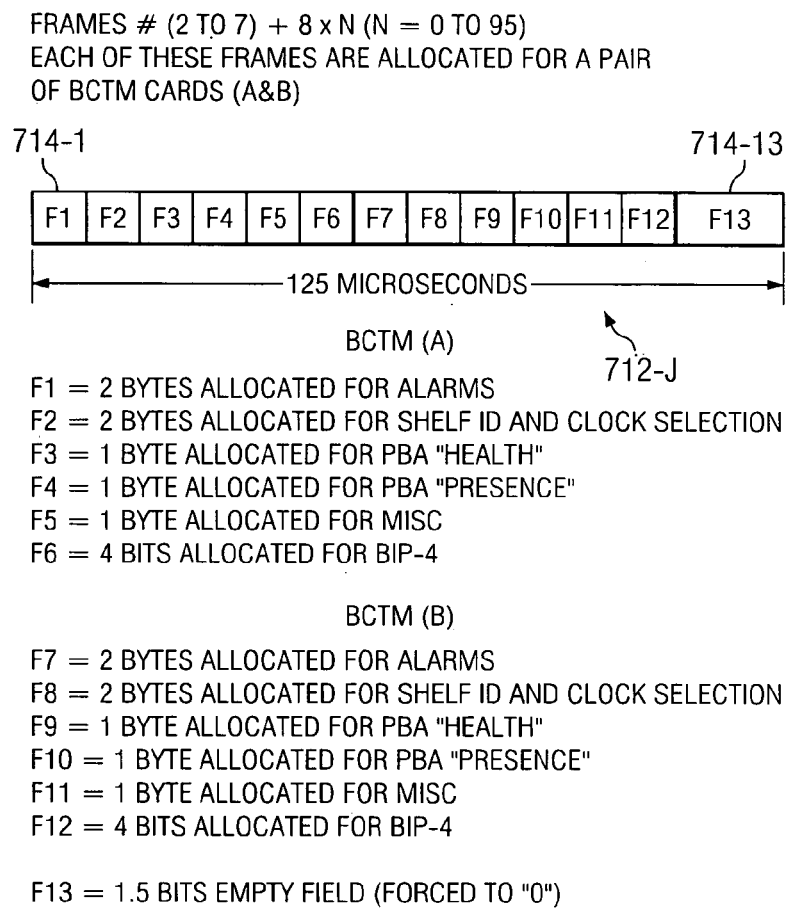
Figure 20T:
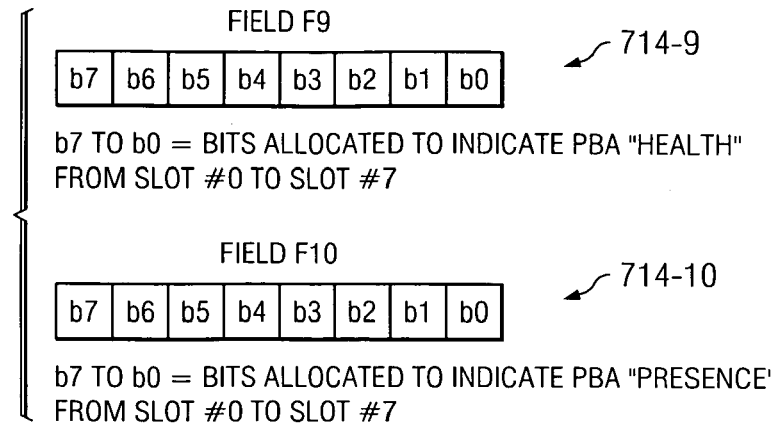
Figure 20U:
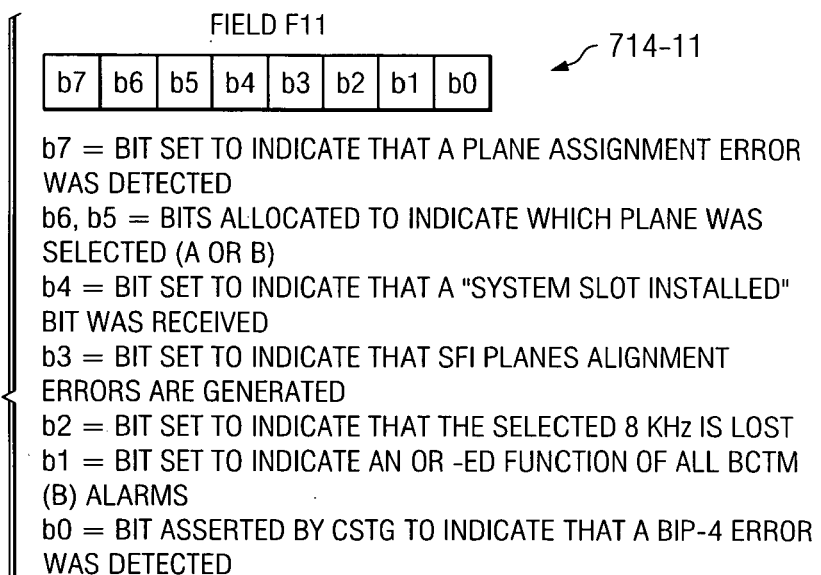

FIGS. 20B through 20U depict presently preferred exemplary bit formats for the various fields forming the frames of the Extended Superframe format 702 shown in FIG. 20A. Once again, it should be recognized upon reference hereto that these bit formats are self-explanatory and, accordingly, only some of the salient features relevant to the teachings of the present invention are provided below.

Referring to FIG. 20B in particular, illustrated therein is the first frame 706-0 of the Extended Superframe signal which is allocated for the highest level CDTM (i.e., CDTM-C). Eight fields are delineated: field 708-1 through 708-8. Fields 708-1 to 708-3 are depicted in FIG. 20C in greater detail. Bit 0 of field 708-2 selects the redundancy Plane of the multi-stage clock/status/alarm distribution scheme of the present invention. Bits 4–7 of the second byte of field 708-3 are used for indicating the CDTM's level assignment as described hereinbefore.

Fields 708-4 to 708-6 of the frame allocated to the CDTM-C are illustrated in FIG. 20D. The LOS indication with respect to the EAS/Status signal on different ports of the CDTM-C is encoded in the two bytes allocated for field 708-4. Bit 7 of field 708-5 is set to 1 to indicate when a reference clock is selected. The port from which the clock is selected is encoded in bits 3–6.

FIG. 20E illustrates the common structure of the frames allocated to the L-Level CDTMs and R-Level CDTMs. Frames 1+64×N (where N=0 to 11) are allocated for the L-Level CDTMs and frames 1+8×N (where N=0 to 95) are allocated for the R-Level CDTMs. Each of these frames comprise 13 fields having reference numerals 710-1 to 710-13. FIGS. 20F–20I depict fields 710-1 to 710-6 pertaining to the CDTM-L frames. Bit 0 of the field 710-1 is assigned to indicate the redundancy Plane selection and bits 1–2 indicate the level of the CDTM as shown in FIG. 20F. In FIG. 20G, bits 4–7 of field 710-2 are assigned to indicate the CDTM ID code. LOA and LOS conditions with respect to the Status signals on the incoming ports are encoded in fields 710-3 and 710-4 (shown in FIG. 20H). Bit 7 of field 710-5 depicted in FIG. 20I indicates when a reference clock is selected. Bit 1 is asserted by the CDTM-L to indicate that a group alarm occurred in the previous ESFI. Also, bits 3–6 of the same field are assigned to indicate the port from which the 8 KHz clock is selected.

FIGS. 20J–20M illustrate the fields 710-7 to 710-12 pertaining to the CDTM-R frames which are indicated by frames 1+8×N (where N 0 to 95). Bit 0 of field 710-7 shown in FIG. 20J codes the redundancy Plane selection for the CDTM-R cards. Bit 5 is set when outbound SFI errors are detected. Fields 710-8 and 710-9 are illustrated in FIG. 20K, wherein the bits in field 710-8 are assigned for the CDTM-R ID code. LOA and LOS conditions with respect to the Status signals on the incoming ports are encoded in fields 710-9 and 710-10 (shown in FIG. 20L). Bit 7 of field 710-11 depicted in FIG. 20M indicates when a reference clock is selected. Bit 1 is asserted by the CDTM-R to indicate that a rack alarm occurred in the previous EAS. Also, bits 3–6 of the same field are assigned to indicate the port from which the 8 KHz clock is selected.

FIG. 20N illustrates the common structure of the frames allocated to the BCTM cards indicated by frames (I)+8×N, wherein I=2 to 7 and N=0 to 95. Each of these frames, comprising 13 fields (reference numerals 714-1 to 714-13), is allocated for a pair of redundant BCTM cards (i.e., A-side and B-side cards). Fields 714-1 to 714-6 are allocated to the A-side BCTM cards. Field 714-1, comprising 2 bytes, is allocated for various alarms (e.g., PSU, fan, Temperature Control, etc.), as shown in FIG. 20O. Fields 714-2 and 714-3 are illustrated in FIG. 20P, wherein the BCTM ID is coded in byte 1 and MSN of byte 2 of field 714-2. The LSN of byte 2 codes for the reference clock selection and the PBA's ID from where the clock is obtained. The bits in field 714-3 are assigned to indicate PBA's "Heath" status from slots 0–7. Fields 714-4 to 714-6 are depicted in FIG. 20Q. The PBA "Presence" signals are coded in field 714-4. Fields 714-5 and 714-6 code for various errors, alarms, and BIP check.

Fields 714-7 to 714-12 are allocated for the B-side BCTM cards and are depicted in FIGS. 20R to 20U. Field 13, which is an empty field forced to zero, is not illustrated. Field 714-7, comprising two bytes, codes for PSU, fan, ESWT power alarms, and LOC, LOS, etc. signals, as illustrated in FIG. 20R. In FIG. 20S, the reference clock selection and BCTM ID are coded in field 714-8 which includes two bytes. PBA "Health" and "Presence" signals from the PBAs on the B-side BCTM cards are coded in field 714-9 (shown in FIG. 20T). Miscellaneous conditions and BIP are coded in fields 714-11 and 714-12, respectively, as illustrated in FIG. 20U.

Based upon the foregoing Detailed Description, it should be readily apparent that the present invention provides an effective and robust multi-stage distribution scheme for transporting telecom clocks, and aggregating status/alarm conditions in a signaling server node that is provided with a scalable and redundant architecture for interoperability, upgradeability, and high availability. The clock distribution scheme of the present invention overcomes the shortcomings and deficiencies of the state-of-the-art solutions by not having to hard-code the individual boards and/or the shelves that house them. Accordingly, board replacement is not only efficient, it is also very maintenance-friendly because service technicians need not memorize the exact locations/addresses and levels of the boards and the shelves/sub-racks in a rather complex piece of equipment such as a Signaling Transfer Point platform.

Furthermore, by multiplexing the various alarm/status signals in an TDM bitstream in accordance with the teachings of the present invention, there no need to run separate cables from other cards/PBAs or shelves to the system controller and, accordingly, cabling becomes significantly more manageable and reliable. In addition, the overall aesthetics of the server platform are also enhanced thereby.

It is believed that the operation and construction of the present invention will be apparent from the foregoing Detailed Description. While the method and apparatus shown and described have been characterized as being preferred, it should be readily understood that various changes and modifications could be made therein without departing from the scope of the present invention as set forth in the following claims. For example, each EAS frame in the Extended Superframe format may be provided with a header for checking alignment, parity, line integrity (i.e., whether the line is broken or not), etc. If the header contains one or several errors, there is no need to further analyze the entire signal to determine that it has been compromised in some aspect.

Also, those skilled in the art should readily recognize that whereas a three-level, three-stage cascading tree has been described in particular detail for distributing clocks, status information, alarms, etc., other intermediate levels and/or stages may be provided in certain implementations. In addition, while the CPCI bus and its form factor has been exemplified, the present invention is not limited in any way to such bus and form factor. Accordingly, the plurality of the cards used in the distribution scheme of the present invention may adhere to other form factors and bus standards.

Moreover, the encoding schemes used in the SFI and EAS signals are illustrative rather than restrictive. The board and shelf IDs, port IDs, alarm indicia, etc. may therefore comprise bit fields of any length in the TDM frames of the respective signals. Furthermore, although a signaling server platform has been described in detail to provide a suitable application framework for the present invention, it should be firmly understood that the teachings of the present invention may be practiced in any industrial application, including other telecommunications network nodes. Accordingly, all these numerous modifications, substitutions, additions, combinations, extensions, etc. are considered to be within the ambit of the present invention whose scope is limited solely by the following claims.

What is claimed is:

1. An apparatus for collecting alarm signals in a signaling server disposed in a telecommunications network, comprising:
a system timing generator including circuitry for producing a serial control signal;
a plurality of clock distribution modules organized into at least one level in a nested hierarchy coupled to said system timing generator;
a plurality of bus control modules coupled to said at least one level of clock distribution modules in said nested hierarchy, each bus control module interfacing with a plurality of printed board assembly (PBA) cards disposed on a bus segment, wherein each bus control module generates a status signal encoded with alarm data towards said at least one level of clock distribution modules; and
multiplexing circuitry in each clock distribution module to multiplex status signals received from one of a lower level in said nested hierarchy and said plurality of bus control modules into a serial bitstream having multiple frames by assigning predetermined time slots to said alarm data based on control information provided in said serial control signal.

2. The apparatus for collecting alarm signals in a signaling server disposed in a telecommunications network as set forth in claim 1, further comprising means in each clock distribution module for inserting its own alarm data into said serial bitstream based on said control information provided in said serial control signal.

3. The apparatus for collecting alarm signals in a signaling server disposed in a telecommunications network as set forth in claim 2, wherein said system timing generator comprises clock circuitry to produce a system time clock based on a reference input of a predetermined frequency.

4. The apparatus for collecting alarm signals in a signaling server disposed in a telecommunications network as set forth in claim 3, wherein said bus segment comprises a Contact Peripheral Component Interconnect (CPCI) bus segment.

5. The apparatus for collecting alarm signals in a signaling server disposed in a telecommunications network as set forth in claim 3, wherein said reference input comprises a derived clock signal generated from a telecommunications signal received at one of said PBA cards.

6. The apparatus for collecting alarm signals in a signaling server disposed in a telecommunications network as set forth in claim 3, wherein said serial control signal comprises a framed bitstream.

7. An alarm collection method using a multi-stage clock distribution system in a signaling server organized in a plurality of racks, each rack including a plurality of shelves, said clock distribution system having a system timing generator, at least one clock distribution module, and a plurality of bus control modules, each bus control module interfacing with at least a portion of line car disposed in a shelf, said method comprising the steps of:

determining the size of said signaling server by ascertaining the number of racks and assigning levels to said clock distribution modules in a nested hierarchy based on said determination;
assigning unique IDs to said shelves;
generating, by said system timing generator, a framed serial control signal containing unique shelf ID information and clock distribution module level information;
generating, by each bus control module, a status signal encoded with alarm data; and
successively multiplexing said status signal towards said system timing generator through said nested hierarchy of clock distribution modules into a serial bitstream having multiple frames by assigning predetermined time slots to said alarm data by each clock distribution module based on control and ID information provided in said framed serial control signal.

8. The alarm collection method using a multi-stage clock distribution system in a signaling server as set forth in claim 7, wherein said step of assigning levels to said clock distribution modules comprises the steps of:
if said signaling server includes more than 8 racks, writing a first level code into a select field of said framed serial control signal by said system timing generator;
transmitting said framed serial control signal to a clock distribution module coupled to said system timing generator;
upon reading said first level code, assuming a Central Level by said clock distribution module coupled to said system timing generator and thereby becoming a C-Level clock distribution module;
changing said fist level code into a second level code by said C-Level clock distribution module in said select field of said framed serial control signal;
transmitting said framed serial control signal to a clock distribution module coupled to said C-Level clock distribution module;
upon reaching said second level code, assuming a Lead Level by said clock distribution module coupled to said C-Level clock distribution module and thereby becoming an L-Level clock distribution module;
changing said second level code into a third level code by said L-Level clock distribution module in said select field of said framed serial control signal;
transmitting said framed serial control signal to a clock distribution module coupled to said L-Level clock distribution module;
upon reading said third level code, assuming a Rack Level by said clock distribution module coupled to said L-Level clock distribution module and thereby becoming an R-Level clock distribution module;
if said signaling serve includes between 2 and 8 racks, inclusive, writing said second level code into said select field of said framed serial control signal by said system timing generator;
transmitting said framed serial control signal to said clock distribution module coupled to said system timing generator;
upon reading said second level code, assuming said Lead Level by said clock distribution module coupled to said system timing generator and thereby becoming said L-Level clock distribution module;
changing said second level code into said third level code by said L-Level clock distribution module in said select field of said framed serial control signal;

transmitting said framed serial control signal to a clock distribution module coupled to said L-Level clock distribution module;

upon reading said third level code, assuming a Rack Level by said clock distribution module coupled to said L-Level clock distribution module and thereby becoming an R-Level clock distribution module;

if said signaling server includes a single rack, writing third level code into said select field of said framed serial control signal by said system timing generator;

transmitting said framed serial control signal to said clock distribution module coupled to said system timing generator; and upon reading said third level code, assuming Rack Level by said clock distribution module coupled to said system timing generator and thereby becoming said R-Level clock distribution module.

9. The alarm collection method using a multi-stage clock distribution system in a signaling server as set forth in claim 8, wherein said step of assigning unique IDs to said shelves comprises the steps of:

assigning, by said system timing generator, a redundancy Plane code to said C-Level clock distribution modules in said nested hierarchy;

assigning, by said C-level clock distribution modules, a Group code to said L-Level clock distribution modules in said nested hierarchy;

assigning, by said L-Level clock distribution modules, a Rack code to said R-Level clock distribution modules in said nested hierarchy; and assigning, by said R-Level clock distribution modules, a Shelf code to said shelves.

10. The alarm collection method using a multi-stage clock distribution system in a signaling server as set forth in claim 9, wherein said redundancy Plane code comprises a two-bit field in said framed serial control signal.

11. The alarm collection method using a multi-stage clock distribution system in a signaling server as set forth in claim 10, wherein each of said Group, Rack, and Shelf codes comprises a separate four-bit field in said framed serial control signal.

12. A method of routing alarm signals in a signaling server disposed in a telecommunications network and organized in a plurality of racks, each rack including a plurality of shelves, said server including a plurality of cards organized into multiple stages having a tree configuration, comprising the steps of:

generating alarm data by cards disposed at a select stage in said tree configuration;

transmitting, by bus control modules interfacing with said cards at said select stage, said alarm data to distribution module cards disposed at a subsequent stage in said tree configuration;

determining the number of said racks and assigning levels to said distribution modules in a hierarchy based on said determination, multiplexing, by said distribution module cards, said alarm data into a serial bitstream having multiple frames, by allotting predetermined time slots;

inserting into said serial bitstream, any alarm data pertaining to cards disposed at said subsequent stage;

forwarding serial bitstreams, by said distribution module cards, through said tree configuration for successively multiplexing said serial bitstreams into a single multiplexed bitstream; and providing said single multiplexed bitstream to a controller controlling said tree configuration.

13. The method of routing alarm signals in a signaling serving disposed in a telecommunications network as set forth in claim 12, further including the step of assigning unique IDs to said shelves.

14. The method of routing alarm signals in a signaling server disposed in a telecommunications network as set forth in claim 13, further including the step of generating a framed serial control signal containing unique shelf ID information and distribution module level information.

\* \* \* \* \*